US007738711B2

(12) United States Patent
Kondo et al.

(10) Patent No.: US 7,738,711 B2
(45) Date of Patent: *Jun. 15, 2010

(54) CODING APPARATUS AND METHOD, DECODING APPARATUS AND METHOD, DATA PROCESSING SYSTEM, STORAGE MEDIUM, AND SIGNAL

(75) Inventors: Tetsujiro Kondo, Tokyo (JP); Yoshinori Watanabe, Kanagawa (JP); Kenji Tanaka, Chiba (JP)

(73) Assignee: Sony Corporation, Tokyo (JP)

( * ) Notice: Subject to any disclaimer, the term of this patent is extended or adjusted under 35 U.S.C. 154(b) by 1426 days.

This patent is subject to a terminal disclaimer.

(21) Appl. No.: 11/134,737

(22) Filed: May 20, 2005

(65) Prior Publication Data
US 2005/0265443 A1 Dec. 1, 2005

Related U.S. Application Data

(63) Continuation of application No. 09/636,138, filed on Aug. 10, 2000, now Pat. No. 6,965,697, which is a continuation-in-part of application No. 09/352,241, filed on Jul. 13, 1999, now Pat. No. 6,690,831, and a continuation-in-part of application No. 09/366,872, filed on Aug. 4, 1999, now Pat. No. 6,567,531, and a continuation-in-part of application No. 09/413,134, filed on Oct. 6, 1999, now Pat. No. 6,804,372.

(30) Foreign Application Priority Data

| Jul. 15, 1998 | (JP) | ................................ 10-200093 |
| Aug. 6, 1998 | (JP) | ................................ 10-222951 |
| Oct. 7, 1998 | (JP) | ................................ 10-285308 |
| Oct. 5, 1999 | (JP) | ................................ 11-284200 |

(51) Int. Cl.
*G06K 9/36* (2006.01)

(52) U.S. Cl. ........................ 382/232; 382/233; 382/248

(58) Field of Classification Search ................. 382/232, 382/100, 233, 248; 380/201, 54, 278, 201.54; 709/219, 224, 217; 713/176, 153, 179, 193; 375/E7.255, E7.265, 254, 285; 726/23, 22; 348/436.1, 400.1; 704/200.1, 268, 269
See application file for complete search history.

(56) References Cited

U.S. PATENT DOCUMENTS 3,752,585 A   8/1973   Elliott ......................... 356/310

(Continued)

FOREIGN PATENT DOCUMENTS

EP              0 635 828              1/1995

(Continued)

OTHER PUBLICATIONS

Chung et al., "Digital Watermarking for Copyright Protection of MPEG2 Compressed Video", IEEE, vol. 44, No. 3, Aug. 1998, pp. 895-901.*

(Continued)

*Primary Examiner*—Anh Hong Do
(74) *Attorney, Agent, or Firm*—Frommer Lawrence & Haug LLP; William S. Frommer; Thomas F. Presson

(57) ABSTRACT

A coding apparatus for embedding second data into first data without deteriorating the first data includes a memory for storing at least partial data of the first data. An embedding coder embeds the second data into the first data by rearranging, according to the second data, at least partial data of the first data stored in the memory. A decoding apparatus for decoding coded data in to the original first data and the original second data without deteriorating the quality of the data includes a relation calculating unit for calculating a relation between first partial data and second partial data of the coded data. A decoder decodes the coded data into the original first data by moving the first partial data and the second partial data of the coded data based on the relation calculated by the relation calculating unit, and decodes the second data that is embedded in the coded data according to the movement.

9 Claims, 38 Drawing Sheets

U.S. PATENT DOCUMENTS

| | | | |
|---|---|---|---|
| 3,875,419 A | 4/1975 | Harms, Jr. | 235/462.3 |
| 3,896,266 A | 7/1975 | Waterbury | 379/114.19 |
| 5,049,748 A | 9/1991 | Ito et al. | 250/584 |
| 5,077,794 A | 12/1991 | Taylor | 380/261 |
| 5,144,663 A | 9/1992 | Kudelski et al. | 380/230 |
| 5,179,642 A | 1/1993 | Komatsu | 345/634 |
| 5,388,194 A | 2/1995 | Vogel | 715/235 |
| 5,402,499 A | 3/1995 | Robinson et al. | 381/119 |
| 5,583,657 A | 12/1996 | Jeong | 382/248 |
| 5,694,447 A | 12/1997 | Ito | 378/62 |
| 5,717,821 A | 2/1998 | Tsutsui et al. | 704/200.1 |
| 5,721,788 A | 2/1998 | Powell et al. | 382/100 |
| 5,727,092 A | 3/1998 | Sandford, II et al. | 382/251 |
| 5,751,809 A | 5/1998 | Davis et al. | 713/176 |
| 5,765,126 A * | 6/1998 | Tsutsui et al. | 704/200.1 |
| 5,778,102 A | 7/1998 | Sandford, II et al. | 382/251 |
| 5,819,289 A | 10/1998 | Sandford, II et al. | 707/104.1 |
| 5,838,963 A | 11/1998 | Griffiths | 707/6 |
| 5,848,155 A | 12/1998 | Cox | 382/191 |
| 5,850,482 A | 12/1998 | Meany et al. | 382/232 |
| 5,875,249 A | 2/1999 | Mintzer et al. | 380/54 |
| 5,915,027 A | 6/1999 | Cox et al. | 380/54 |
| 5,946,414 A | 8/1999 | Cass et al. | 382/183 |
| 5,970,140 A | 10/1999 | Sandford, II et al. | 380/205 |
| 6,005,643 A | 12/1999 | Morimoto et al. | 375/240.26 |
| 6,005,936 A | 12/1999 | Shimizu et al. | 713/176 |
| 6,016,356 A | 1/2000 | Ito et al. | 382/132 |
| 6,034,766 A | 3/2000 | Sugiura et al. | 356/239.1 |
| 6,055,321 A | 4/2000 | Numao et al. | 382/100 |
| 6,111,506 A | 8/2000 | Yap et al. | 340/572.1 |
| 6,122,403 A | 9/2000 | Rhoads | 382/233 |
| 6,148,333 A | 11/2000 | Guedalia et al. | 709/219 |
| 6,192,138 B1 | 2/2001 | Yamadaji | 382/100 |
| 6,209,092 B1 | 3/2001 | Linnartz | 713/176 |
| 6,334,187 B1 | 12/2001 | Kadono | 713/176 |
| 6,411,725 B1 | 6/2002 | Rhoads | 382/100 |
| 6,542,620 B1 | 4/2003 | Rhoads | 382/100 |
| 6,546,139 B1 | 4/2003 | Kondo et al. | 382/232 |
| 6,567,531 B1 | 5/2003 | Kondo et al. | 382/100 |
| 6,690,831 B1 | 2/2004 | Kondo | 382/232 |
| 6,738,492 B1 | 5/2004 | Kondo et al. | 382/100 |
| 6,804,372 B1 | 10/2004 | Kondo et al. | 382/100 |

FOREIGN PATENT DOCUMENTS

| | | |
|---|---|---|
| EP | 0 762 764 | 3/1997 |
| EP | 0 838 785 | 4/1998 |
| EP | 0 845 757 | 6/1998 |
| EP | 0 859 337 | 8/1998 |
| FR | 2 631 192 | 11/1989 |
| JP | 2 266390 | 10/1990 |
| JP | 7 37255 | 2/1995 |
| JP | 8 289298 | 11/1996 |
| JP | 9 179494 | 7/1997 |
| JP | 9 186603 | 7/1997 |
| JP | 9 204537 | 8/1997 |
| JP | 10 69215 | 3/1998 |
| JP | 10 79860 | 3/1998 |
| JP | 10 124673 | 5/1998 |
| JP | 10 155151 | 6/1998 |
| JP | 11 69133 | 3/1999 |
| WO | WO 97/44757 | 11/1997 |
| WO | WO 97/48056 | 12/1997 |
| WO | WO 99 10837 | 3/1999 |

OTHER PUBLICATIONS

Chung et al., "Digital Watermarking for Copyright Protection of MPEG2 Compressed Video", IEEE, Jun. 1998, pp. 336-337.*

"Frequency analysis" Retrieved from the Internet: URL:http://en.wikipedia.org/wik/Frequency_analysis> retrieved on Sep. 7, 2006.

Schyndel Van R G et al: Key Independent Watermark Detection Proceedings of the International Conference on Multimedia Computing and Systems, Jun. 1999, XP000937727.

Swanson M.D. et al.: "Multiresolution Scene-Based Video Watermarking Using Perceptual Models" IEEE Journal on Selected Areas in Communications, IEEE Inc. New York, US, vol. 16, No. 4, May 1, 1998, pp. 540-550, XP000765114.

Swanson M.D. et al: "Multiresolution Video Watermarking Using Perceptual Models and Scene Segmentation" Proceedings of the International Conference on Image Processing, US, Los Alamitos, CA: IEEE Computer Society, Oct. 1997, pp. 558-561, XP00066944.

Swanson M.D. et al: "Robust Audio Watermarking Using Perceptual Masking" Signal Processing. European Journal Devoted to the Methods and Applications of Signal Processing, Elsevier Science Publishers B.V. Amsterdam, NL, vol. 66, No. 3, May 28, 1998, pp. 337-355, XP004124956.

Boney L., Twefik A., Hamdy K.: "Digital Watermarks for Audio Signals" Multimedia Computing and Systems, 1996, Proceedings of the Third IEEE International Conference, Jun. 17-23, 1996, pp. 473-480, XP002160496.

Nikolaidis N et al: "Robust Image Watermarking in the Spatial Domain" Signal Processing European Journal Devoted to the Methods and Applications of Signal Processing vol. 66, No. 3, May 28, 1998, pp. 385-403, XP004124959.

* cited by examiner

EMBEDDED CODING/DECODING

FIG. 6

PIXEL

| p(1,1) | p(2,1) | p(3,1) | p(4,1) | p(5,1) | p(6,1) | p(7,1) | p(8,1) | p(9,1) |
|---|---|---|---|---|---|---|---|---|
| p(1,2) | p(2,2) | p(3,2) | p(4,2) | p(5,2) | p(6,2) | p(7,2) | p(8,2) | p(9,2) |
| p(1,3) | p(2,3) | p(3,3) | p(4,3) | p(5,3) | p(6,3) | p(7,3) | p(8,3) | p(9,3) |
| p(1,4) | p(2,4) | p(3,4) | p(4,4) | p(5,4) | p(6,4) | p(7,4) | p(8,4) | p(9,4) |
| p(1,5) | p(2,5) | p(3,5) | p(4,5) | p(5,5) | p(6,5) | p(7,5) | p(8,5) | p(9,5) |
| p(1,6) | p(2,6) | p(3,6) | p(4,6) | p(5,6) | p(6,6) | p(7,6) | p(8,6) | p(9,6) |
| p(1,7) | p(2,7) | p(3,7) | p(4,7) | p(5,7) | p(6,7) | p(7,7) | p(8,7) | p(9,7) |
| p(1,8) | p(2,8) | p(3,8) | p(4,8) | p(5,8) | p(6,8) | p(7,8) | p(8,8) | p(9,8) |
| p(1,9) | p(2,9) | p(3,9) | p(4,9) | p(5,9) | p(6,9) | p(7,9) | p(8,9) | p(9,9) |
| p(1,10) | p(2,10) | p(3,10) | p(4,10) | p(5,10) | p(6,10) | p(7,10) | p(8,10) | p(9,10) |

FIG.10

PIXEL

| p(1,1) | p(2,1) | p(3,1) | p(4,1) | p(5,1) | p(6,1) | p(7,1) | p(8,1) | p(9,1) |
|--------|--------|--------|--------|--------|--------|--------|--------|--------|
| p(1,2) | p(2,2) | p(3,2) | p(4,2) | p(5,2) | p(6,2) | p(7,2) | p(8,2) | p(9,2) |
| p(1,3) | p(2,3) | p(3,3) | p(4,3) | p(5,3) | p(6,3) | p(7,3) | p(8,3) | p(9,3) |
| (p(1,4)) | p(2,4) | p(3,4) | p(4,4) | (p(5,4)) | p(6,4) | p(7,4) | p(8,4) | p(9,4) |
| p(1,5) | p(2,5) | p(3,5) | p(4,5) | p(5,5) | p(6,5) | p(7,5) | p(8,5) | p(9,5) |
| p(1,6) | p(2,6) | p(3,6) | p(4,6) | p(5,6) | p(6,6) | p(7,6) | p(8,6) | p(9,6) |
| p(1,7) | p(2,7) | p(3,7) | p(4,7) | p(5,7) | p(6,7) | p(7,7) | p(8,7) | p(9,7) |
| (p(1,8)) | p(2,8) | p(3,8) | p(4,8) | (p(5,8)) | p(6,8) | p(7,8) | p(8,8) | p(9,8) |
| p(1,9) | p(2,9) | p(3,9) | p(4,9) | p(5,9) | p(6,9) | p(7,9) | p(8,9) | p(9,9) |
| p(1,10) | p(2,10) | p(3,10) | p(4,10) | p(5,10) | p(6,10) | p(7,10) | p(8,10) | p(9,10) |

UTILIZATION OF CONTINUITY

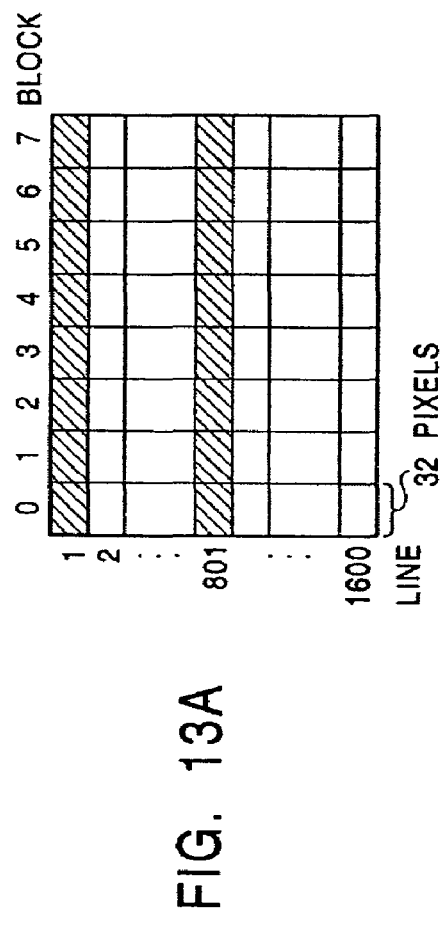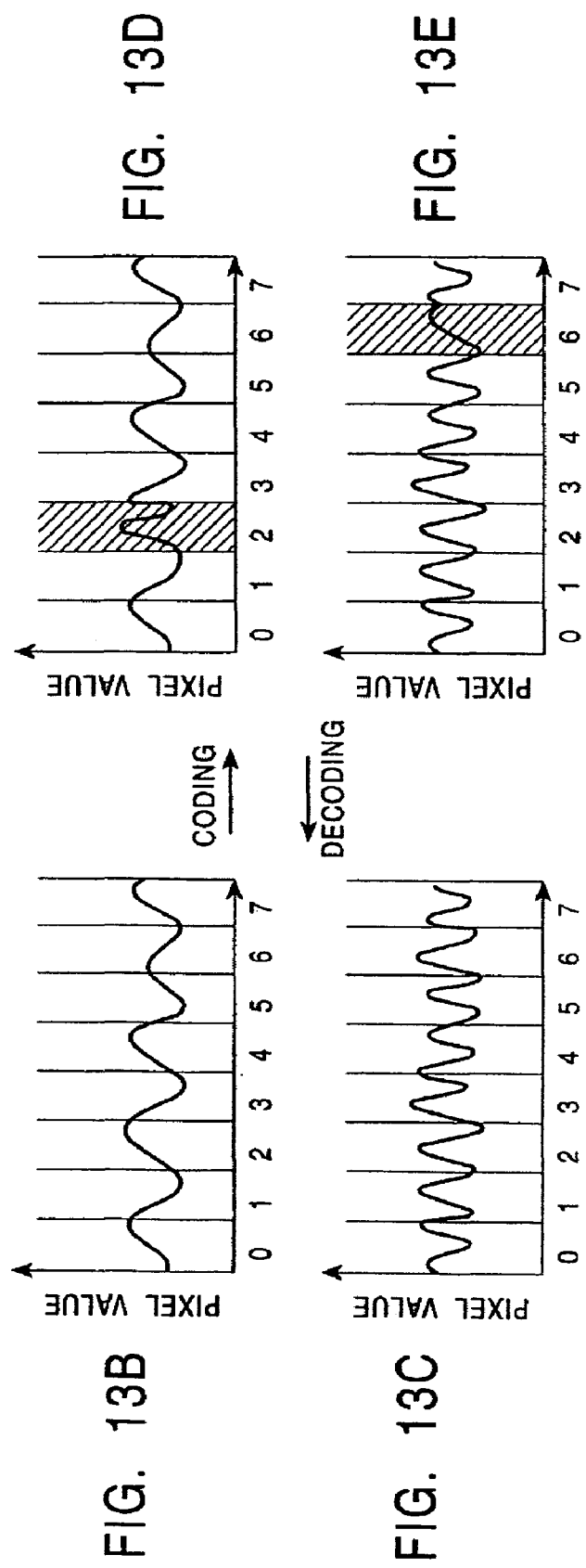

UTILIZATION OF SIMILARITY

FIG. 33

| (1, 1) | (1, 2) | (1, 3) | (1, 4) | (1, 5) | (1, 6) | | (1, N) |
|---|---|---|---|---|---|---|---|
| (2, 1) | (2, 2) | (2, 3) | (2, 4) | (2, 5) | (2, 6) | | (2, N) |
| (3, 1) | (3, 2) | (3, 3) | (3, 4) | (3, 5) | (3, 6) | ………… | (3, N) |
| (4, 1) | (4, 2) | (4, 3) | (4, 4) | (4, 5) | (4, 6) | | (4, N) |
| (5, 1) | (5, 2) | (5, 3) | (5, 4) | (5, 5) | (5, 6) | | (5, N) |
| | | | ⋮ | | | | |
| (M, 1) | (M, 2) | (M, 3) | (M, 4) | (M, 5) | (M, 6) | | (M, N) |

PIXEL

FIG. 34A

| | | | | | | | PIXEL |
|---|---|---|---|---|---|---|---|
| (1, 3) | (1, 4) | (1, 6) | (1, 5) | (1, 1) | (1, N) | | (1, 2) |
| (2, 3) | (2, 4) | (2, 6) | (2, 5) | (2, 1) | (2, N) | | (2, 2) |
| (3, 3) | (3, 4) | (3, 6) | (3, 5) | (3, 1) | (3, N) | ………… | (3, 2) |
| (4, 3) | (4, 4) | (4, 6) | (4, 5) | (4, 1) | (4, N) | | (4, 2) |
| (5, 3) | (5, 4) | (5, 6) | (5, 5) | (5, 1) | (5, N) | | (5, 2) |
| (M, 3) | (M, 4) | (M, 6) | (M, 5) | (M, 4) | (M, N) | | (M, 2) |

FIG. 34B

| | | | | | | | PIXEL |
|---|---|---|---|---|---|---|---|
| (5, 3) | (5, 4) | (5, 6) | (5, 5) | (5, 1) | (5, N) | | (5, 2) |
| (3, 3) | (3, 4) | (3, 6) | (3, 5) | (3, 1) | (3, N) | | (3, 2) |
| (1, 3) | (1, 4) | (1, 6) | (1, 5) | (1, 1) | (1, N) | ………… | (1, 2) |
| (M, 3) | (M, 4) | (M, 6) | (M, 5) | (M, 1) | (M, N) | | (M, 2) |
| (2, 3) | (2, 4) | (2, 6) | (2, 5) | (2, 1) | (2, N) | | (2, 2) |
| (4, 3) | (4, 4) | (4, 6) | (4, 5) | (4, 1) | (4, N) | | (4, 2) |

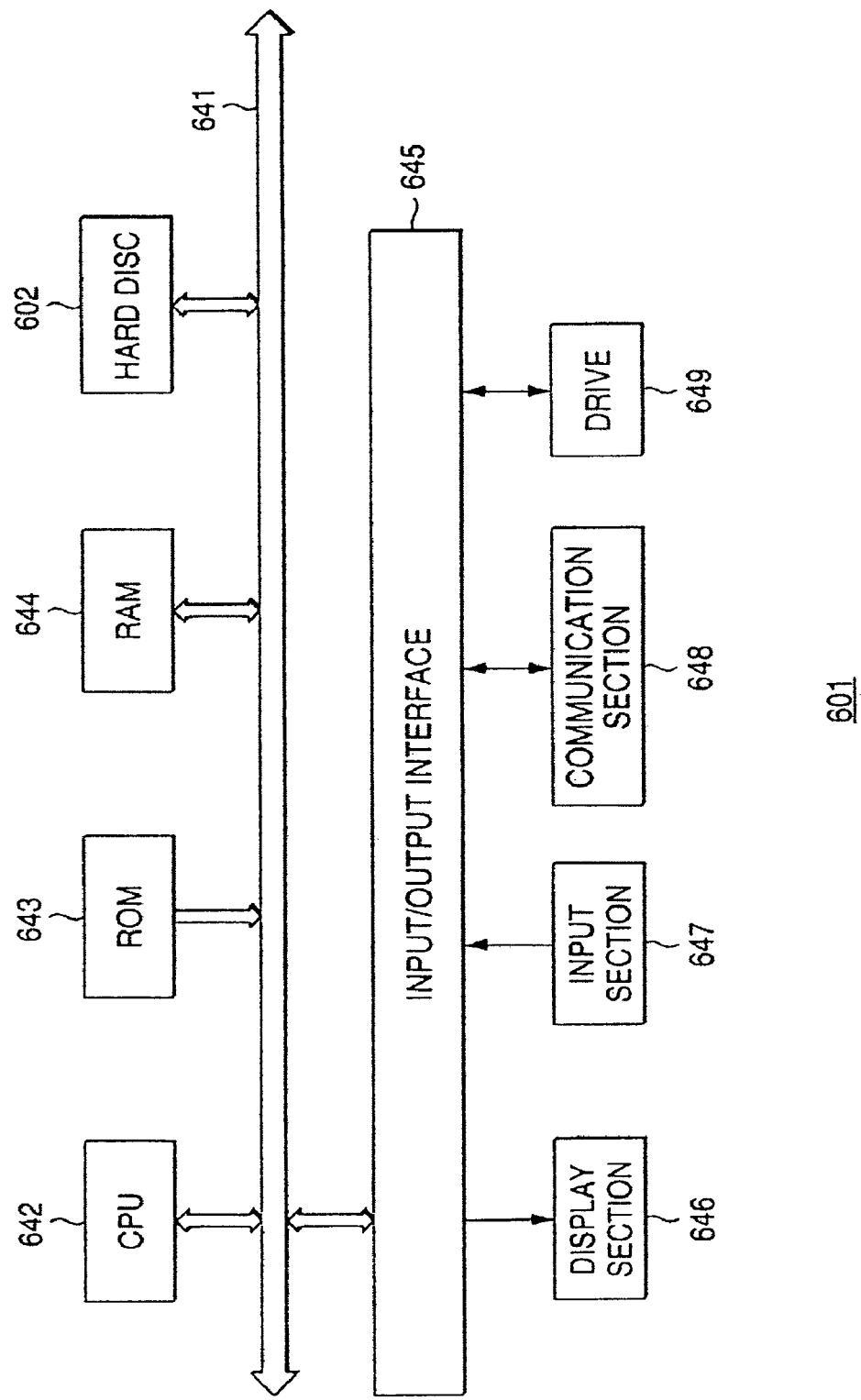

CODING APPARATUS AND METHOD, DECODING APPARATUS AND METHOD, DATA PROCESSING SYSTEM, STORAGE MEDIUM, AND SIGNAL

This application is a continuation of U.S. patent application Ser. No. 09/636,138 filed Aug. 10, 2000 now U.S. Pat. No. 6,965,697 which is a continuation in part of Ser. No. 09/352,241 filed Jul. 13, 1999, U.S. Pat. No. 6,690,831 and a continuation in part of Ser. No. 09/366,872 filed Aug. 4, 1999 now U.S Pat. No. 6,567,531 and a continuation in part of Ser. No. 09/413,134 filed Oct. 6, 1999, now U.S. Pat. No. 6,804,372 the entirety of which is hereby incorporated by reference.

BACKGROUND OF THE INVENTION

1. Field of the Invention

The present invention relates to a coding apparatus and method, a decoding apparatus and method, a data processing system, a storage medium, and a signal. In particular, the invention relates to a coding apparatus and method, a decoding apparatus and method, a data processing system, a storage medium, and a signal which allow information to be embedded into data without deterioration in decoded data and without increase in data amount.

2. Description of the Related Art

One of the techniques of embedding information without increasing the amount of data is to convert the least significant bit (LSB) or the lower two bits of, for example, digital audio data into information to be embedded. In this technique, the lower bits of digital audio data, which do not significantly influence the sound quality, are simply substituted for the information to be embedded. Accordingly, when the digital audio data is reproduced, it is output as it is without restoring the lower bits into the original state. More specifically, since it is difficult to restore the lower bits embedded with information into the original state, and also, since the lower bits do not significantly influence the sound quality, the digital audio data is output while containing information embedded therein.

According to the above-described technique, however, a signal different from the original signal is disadvantageously output, which affects the sound quality if the signal is audio data, or influences the image quality if the signal is video data.

SUMMARY OF THE INVENTION

In order to solve the above-described problems, according to one aspect of the present invention, there is provided a coding device for coding first information according to second information. The coding device includes a receiving unit for receiving the first information and the second information, and a coding unit for coding the first information according to the second information so that decoding is performed by utilizing an energy distribution possessed by the first information.

According to another aspect of the present invention, there is provided a coding method for coding first information according to second information. The coding method includes the steps of receiving the first information and the second information, and coding the first information according to the second information so that decoding is performed by utilizing an energy distribution possessed by the first information.

According to still another aspect of the present invention, there is provided a decoding device for decoding coded data obtained by coding first information according to second information. The decoding device includes a receiving unit for receiving the coded data, and a decoding unit for decoding the coded data into the first information and the second information by utilizing an energy distribution possessed by the first information.

According to a further aspect of the present invention, there is provided a decoding method for decoding coded data obtained by coding first information according to second information, including the steps of: receiving the coded data, and, decoding the coded data into the first and the second information by utilizing an energy distribution possessed by the first information.

According to a yet further aspect of the present invention, there is provided an information processing apparatus including a coding device for coding first information according to second information and for outputting coded data and a decoding device for decoding the coded data. The information processing apparatus includes: a coding unit for coding the first information according to the second information and for outputting the coded data so that decoding is performed by utilizing an energy distribution possessed by the first information; and a decoding unit for decoding the coded data into the first information and the second information by utilizing the energy distribution possessed by the first information.

According to a further aspect of the present invention, there is provided an information processing method for an information processing apparatus which includes a coding device for coding first information according to second information and for outputting coded data, and a decoding device for decoding the coded data. The information processing method includes the steps of:

coding the first information according to the second information by the coding device so that decoding is performed by utilizing an energy distribution possessed by the first information and outputting the coded data from the coding device, and decoding the coded data, by the decoding device, into the first information and the second information by utilizing the energy distribution possessed by the first information.

According to a further aspect of the present invention, there is provided a storage medium for storing coded data obtained by coding first information according to second information so that decoding is performed by utilizing an energy distribution of the first information.

According to a further aspect of the present invention, there is provided an image processing apparatus for performing processing for embedding information in an image. The apparatus includes a selection unit for selecting a pixel of the image, and a processing unit for performing processing on the pixel selected by the selection unit according to the information so that the pixel is reproducible by utilizing a correlation of the image, thereby embedding the information in the pixel.

According to a further aspect of the present invention, there is provided an image processing method for performing processing for embedding information in an image. The image processing method includes a selection step of selecting a pixel of the image, and a processing step of performing processing on the pixel selected in the selection step according to the information so that the pixel is reproducible by utilizing a correlation of the image, thereby embedding the information in the pixel.

According to a further aspect of the present invention, there is provided a storage medium for storing a computer program for enabling a computer to perform processing for embedding information in an image. The computer program includes a selection step of selecting a pixel of the image, and a processing step of performing processing on the pixel selected in the selection step according to the information so that the pixel is reproducible by utilizing a correlation of the image, thereby embedding the information in the pixel.

According to a further aspect of the present invention, there is provided a storage medium for storing an information-embedded image in which information is embedded, the information-embedded image being obtained by embedding the information in the image by selecting a pixel of the image, and by performing processing on the selected pixel according to the information so that the pixel is reproducible by utilizing a correlation of the image.

According to a further aspect of the present invention, there is provided an image processing apparatus for performing processing for decoding an information embedded image into an original image and original information. The image processing apparatus includes: a selection unit for selecting a pixel of the image-embedded information; a processing unit for performing predetermined processing on the pixel selected by the selection unit; a correlation calculation unit for calculating a first correlation between the pixel selected by the selection unit and a peripheral pixel around the selected pixel, and for calculating a second correlation between the pixel selected by the selection unit and processed by the processing unit and the peripheral pixel around the pixel; a comparison unit for comparing the first correlation and the second correlation; and a decoding unit for decoding the pixel selected by the selection unit and the information embedded in the pixel based on a result obtained by the comparison unit.

According to a further aspect of the present invention, there is provided an image processing method for performing processing for decoding information-embedded image into an original image and original information. The image processing method includes: a selection step of selecting a pixel of the information-embedded image; a processing step of performing predetermined processing on the pixel selected in the selection step; a correlation calculation step of calculating a first correlation between the pixel selected in the selection step and a peripheral pixel around the selected pixel, and calculating a second correlation between the pixel selected in the selection step and processed in the processing step and the peripheral pixel around the pixel; a comparison step of comparing the first correlation and the second correlation; and a decoding step of decoding the pixel selected in the selection step and the information embedded in the pixel based on a result obtained in the comparison step.

According to a further aspect, of the present invention, there is provided a storage medium for storing a computer program for enabling a computer to perform processing for decoding information-embedded image into an original image and original information. The computer program includes: a selection step of selecting a pixel of the information-embedded image; a processing step of performing predetermined processing on the pixel selected in the selection step; a correlation calculation step of calculating a first correlation between the pixel selected in the selection step and a peripheral pixel around the selected pixel, and calculating a second correlation between the pixel selected in the selection step and processed in the processing step and the peripheral pixel around the pixel; a comparison step of comparing the first correlation and the second correlation; and a decoding step of decoding the pixel selected in the selection step and the information embedded in the pixel based on a result obtained in the comparison step.

According to a further aspect of the present invention, there is provided an image processing apparatus including a transmitter for transmitting an information-embedded image obtained by embedding information and a receiver for receiving the information-embedded image from the transmitter and for decoding the image. The transmitter includes: a first selection unit for selecting a pixel of the image; and a first processing unit for performing processing on the pixel selected by the first selection unit according to the information so that the pixel is reproducible by utilizing a correlation of the image, thereby embedding the information in the pixel and outputting the information-embedded image. The receiver includes: a second selection unit for selecting a pixel of the information-embedded image; a second processing unit for performing predetermined processing on the pixel selected by the second selection unit; a correlation calculation unit for calculating a first correlation between the pixel selected by the second selection unit and a peripheral pixel around the selected pixel, and for calculating a second correlation between the pixel selected by the second selection unit and processed by the second processing unit and the peripheral pixel around the pixel; a comparison unit for comparing the first correlation and the second correlation; and a decoding unit for decoding the pixel selected by the second selection unit and the information embedded in the pixel based on a result obtained by the comparison unit.

According to a further aspect of the present invention, there is provided an image processing method for use in an image processing apparatus including a transmitter for transmitting an information-embedded image obtained by embedding information and a receiver for receiving the information-embedded image from the transmitter and for decoding the image. The image processing method includes the steps of: selecting a pixel of the image by the transmitter; performing processing by the transmitter on the selected pixel according to the information so that the pixel is reproducible by utilizing a correlation of the image, thereby embedding the information in the pixel and outputting the information-embedded image; selecting the pixel of the information-embedded image by the receiver; performing predetermined processing by the receiver on the selected pixel; calculating by the receiver a first correlation between the pixel selected from the information-embedded image and a peripheral pixel around the selected pixel, and calculating a second correlation between the pixel selected from the information-embedded image and undergone the predetermined processing and the peripheral pixel around the pixel; comparing the first correlation and the second correlation by the receiver; and decoding the pixel selected from the information-embedded image and the information embedded in the pixel by the receiver based on a result of comparison.

According to a further aspect of the present invention, there is provided a coding apparatus for coding first data according to second data. The coding apparatus includes a storing unit for storing at least partial data of the first data, and a coding unit for embedding data relating to the second data into the first data by rearranging, according to the second data, at least partial data of the first data stored in the storing unit.

According to a further aspect of the present invention, there is provided a coding method for coding first data according to second data. The coding method includes a storing step of storing at least partial data of the first data, and a coding step of embedding data relating to the second data into the first data by rearranging at least partial data of the first data stored in the storing step according to the second data.

According to a further aspect of the present invention, there is provided a decoding apparatus for decoding coded data obtained by coding first data according to second data. The decoding apparatus includes: a relation calculating unit for calculating a relation between first partial data and second partial data of the coded data; and a decoding unit for decoding the coded data into the original first data by moving the first partial data and the second partial data of the coded data based on the relation calculated by the relation calculating unit and for decoding the second data that is embedded in the coded data according to the movement.

According to a further aspect of the present invention, there is provided a decoding method for decoding coded data obtained by coding first data according to second data. The decoding method includes: a relation calculating step of calculating a relation between first partial data and second partial data of the coded data; and a decoding step of decoding the coded data into the original first data by moving the first partial data and the second partial data of the coded data based on the relation calculated in the relation calculating step, and for decoding the second data that is embedded in the coded data according to the movement.

According to a further aspect of the present invention, there is provided a data processing system for coding first data into coded data according to second data, and for decoding the coded data. The data processing system includes: a storing unit for storing at least partial data of the first data; a coding means for embedding data relating to the second data into the first data by rearranging, according to the second data, at least partial data of the first data stored in the storing unit; a relation calculating unit for calculating a relation between first partial data and second partial data of the coded data; and a decoding unit for decoding the coded data into the original first data by moving the first partial data and the second partial data of the coded data based on the relation calculated by the relation calculating unit, and for decoding the second data that is embedded in the coded data according to the movement.

According to a further aspect of the present invention, there is provided a storage medium for storing a program, which is controllable by a computer, for coding first data according to second data. The program includes: a storing step of storing at least partial data of the first data; and a coding step of embedding data relating to the second data into the first data by rearranging at least partial data of the first data stored in the storing step according to the second data.

According to a further aspect of the present invention, there is provided a storage medium storing a program, which is controllable by a computer, for decoding coded data obtained by coding first data according to second data The program includes: a relation calculating step of calculating a relation between first partial data and second partial data of the coded: data; and a decoding step of decoding the coded data into the original first data by moving the first partial data and the second partial data of the coded data based on the relation calculated in the relation calculating step, and for decoding the second data that is embedded in the coded data according to the movement.

According to a further aspect of the present invention, there is provided a signal having a program, which is controllable by a computer, for coding first data according to second data. The program includes: a storing step of storing at least partial data of the first data; and a coding step of embedding data relating to the second data into the first data by rearranging at least partial data of the first data stored in the storing step according to the second data.

According to a further aspect of the present invention, there is provided a signal having a program, which is controllable by a computer, for decoding coded data obtained by coding first data according to second data. The program includes: a relation calculating step of calculating a relation between first partial data and second partial data of the coded data; and a decoding step of decoding the coded data into the original first data by moving the first partial data and the second partial data of the coded data based on the relation calculated in the relation calculating step, and for decoding the second data that is embedded in the coded data according to the movement.

According to a further aspect of the present invention, there is provided a signal having first data that is coded according to second data by using a program which is controllable by a computer. The program includes: a storing step of storing at least partial data of the first data; and a coding step of embedding data relating to the second data into the first data by rearranging at least partial data of the first data stored in the storing step according to the second data.

BRIEF DESCRIPTION OF THE DRAWINGS

FIG. 6 illustrates the processing in step S1 of FIG. 5;

FIG. 10 illustrates the processing for embedding one-bit information in four pixels;

FIG. 13A illustrates original image data before the embedded coding processing shown in FIG. 12 is performed or after a decoding operation is performed;

FIG. 13B is a diagram illustrating the pixel value of the first line of the original image data shown in FIG. 13A;

FIG. 13C is a diagram illustrating the pixel value of the 801st line of the original image data shown in FIG. 13A;

FIG. 13D is a diagram illustrating the pixel value of the first line of the image data after additional information is embedded according to the embedded coding processing shown in FIG. 12;

FIG. 13E is a diagram illustrating the pixel value of the 801st line of the image data after additional information is embedded according to the embedded coding processing shown in FIG. 12;

FIG. 33 illustrates image data before being swapped in the column and row directions;

FIG. 34A illustrates the swapping operation in the column direction;

FIG. 34B illustrates the swapping operation in the row direction;

FIG. 39 is a block diagram illustrating an example of a computer in which a program executing the processing of the present invention is to be installed.

DESCRIPTION OF THE PREFERRED EMBODIMENTS

A coding apparatus and method, a decoding apparatus and method, a digital processing system, a storage medium, and a signal according to the present invention will be hereinafter described with reference to the accompanying drawings.

Figure 1:
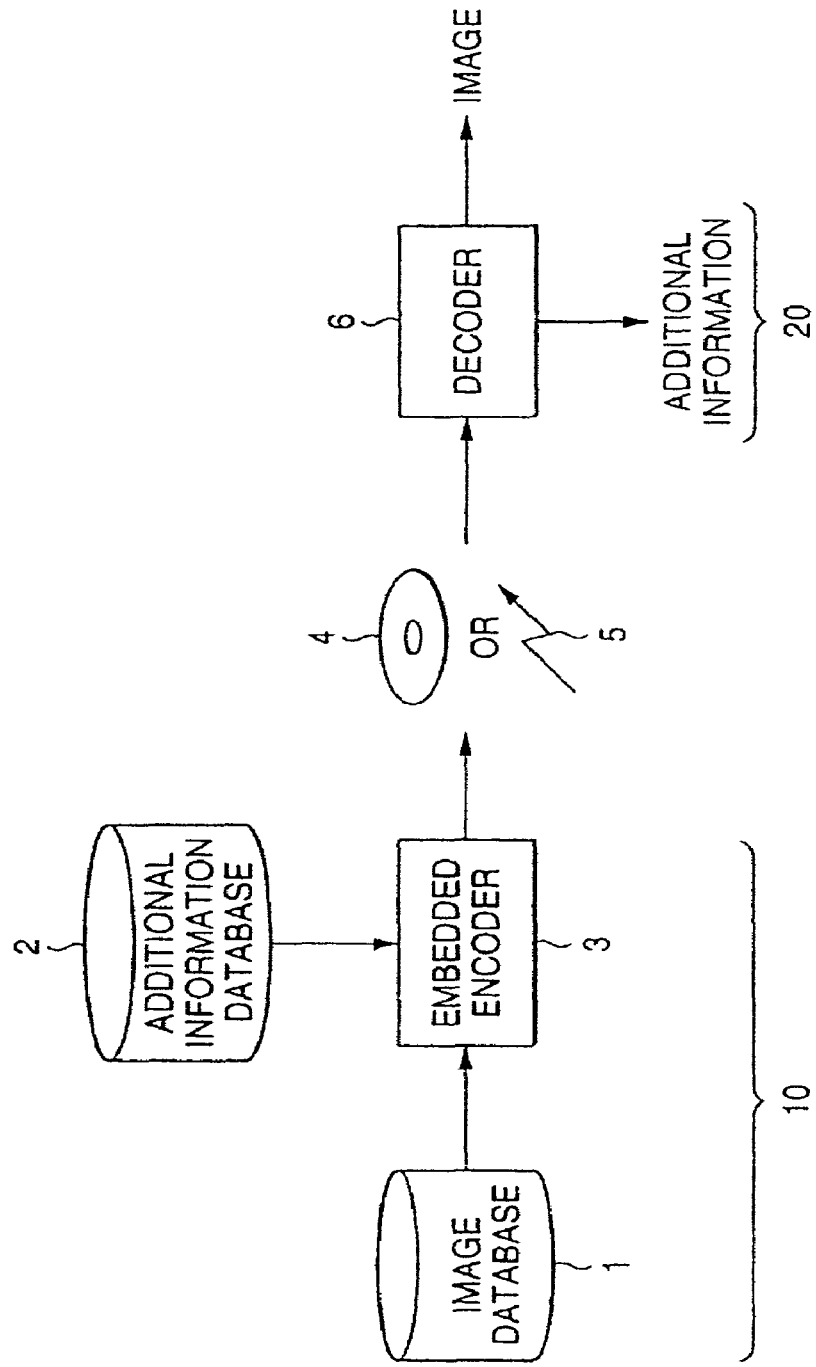
FIG. 1 is a block diagram illustrating an embodiment of an image transmitting system incorporating the present invention.

FIG. 1 is a schematic diagram illustrating an image transmission system incorporating the present invention. In this specification, a "system" may be a unit logically formed of a plurality of apparatuses, and it is not necessary that the apparatuses be contained in the same housing.

Referring to FIG. 1, the image transmission system is formed of a coding unit 10 and a decoding unit 20. The coding unit 10 codes an object, for example, an image, and outputs the coded data. The decoding unit 20 reproduces coded data into the original image.

More specifically, an image database 1 stores images to be coded, for example, digital images, and an image is read from the image database 1 and is supplied to an embedding coder 3. An additional-information database 2 stores additional information, for example, digital data as information to be embedded in the image to be coded. The additional information is read from the additional-information database 2 and is supplied to the embedding coder 3.

Upon receiving the image from the image database 1 and the additional information from the additional-information database 2, the embedding coder 3 codes the image in accordance with the additional information supplied from the additional-information database 2 so that the coded image can be decoded by utilizing the energy distribution of the image supplied from the image database 1. The embedding coder 3 codes the image by embedding the additional information in the image so that the coded image can be decoded by utilizing the energy distribution of the image, and outputs the coded data. The coded data may then be recorded in a recording medium 4, such as a semiconductor memory, a magneto-optical disk, a magnetic disk, an optical disc, a magnetic tape, or a PD disk. Alternatively, the coded data may be transmitted as a signal to the decoding unit 20 via a transmission medium 5, such as a terrestrial broadcast signal, a satellite broadcast signal, a cable television (CATV) network, the Internet, or a public network.

The decoding unit 20 is formed of a decoder 6 in which the coded data provided via the recording medium 4 or the transmission medium 5 is received. The decoder 6 further decodes the coded data into the original image and into the additional information by utilizing the energy distribution of the image. The decoded image is then supplied to a monitor (not shown)

and is displayed. The decoded additional information includes, for example, text data, audio data; and reduced images related to the images.

The principle of the embedded coding operation performed by the embedding coder 3 and the decoding operation performed by the decoder 6 is described below.

Generally, what is called "information" possesses an energy or entropy distribution, which is identified as valuable information. More specifically, for example, an image obtained by photographing a landscape can be identified by a person as an image of the landscape. This is because the image, for example, the values of the pixels forming the image, possesses an energy distribution corresponding to the landscape. An image without an energy distribution is merely noises and is useless as information.

Consequently, even if the energy distribution possessed by a piece of valuable information is destroyed by performing a certain operation, the valuable information can be reproduced by restoring the destroyed energy distribution to the original state. That is, the coded data obtained by coding the information can be decoded into the original information by utilizing the energy distribution inherent in the information.

The energy distribution of information can be represented by, for example, correlation, continuity, and similarity.

The correlation of information is the correlation between the elements of the information, for example, if the information is an image, the pixels or the lines forming the image, i.e., the self-correlation or the distance between the elements forming the information. As an example of correlation, the correlation between lines of an image is represented by the sum of squares of the differences between the corresponding pixel values.

Figure 2:
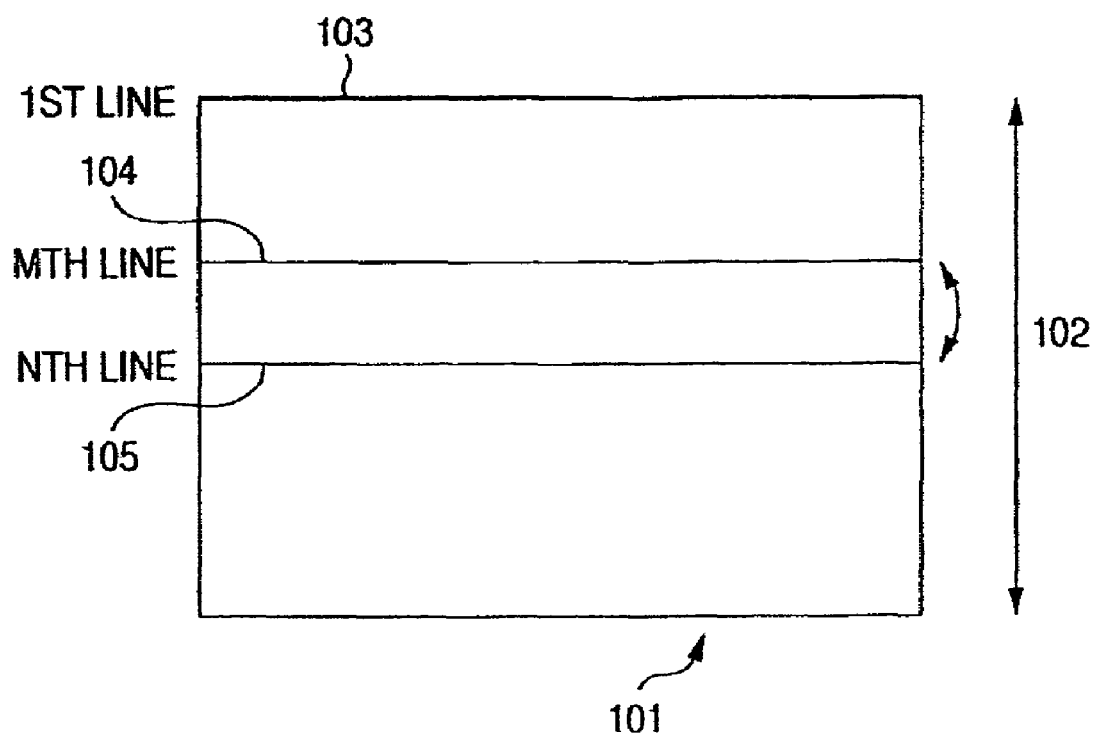
FIG. 2 illustrates an image to be coded.
Figure 3A:
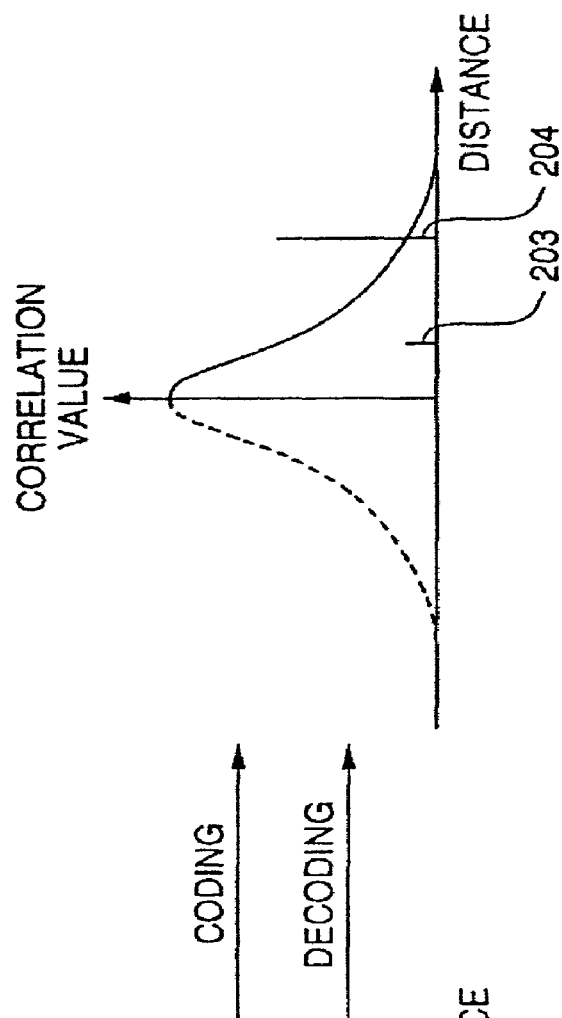
FIG. 3A is a schematic diagram illustrating an image before it is coded or after it is coded by utilizing the correlation according to an embodiment of the present invention.

An image 101 formed of H lines, such as that shown in FIG. 2, is taken as an example. Concerning the correlation between the first line 103 and another line, as illustrated in FIG. 3A, the correlation of the first line 103 to a line located closer to the first line 103, i.e., an upper line of the image 101 shown in FIG. 2, is greater, as indicated by the correlation value 201 between the first line 103 and the M-th line 104. Conversely, the correlation of the first line 103 to a line positioned farther from the first line 103, i.e., a lower line of the image 101 shown in FIG. 2, is smaller, as indicated by the correlation value 202 between the first line 103 and the N-th line 105. In other words, the image 101 shown in FIG. 2 has a deviation of correlation in which a line closer to the first line 103 has a greater level of correlation, and a line farther from the first line 103 has a smaller level of correlation.

Figure 3B:
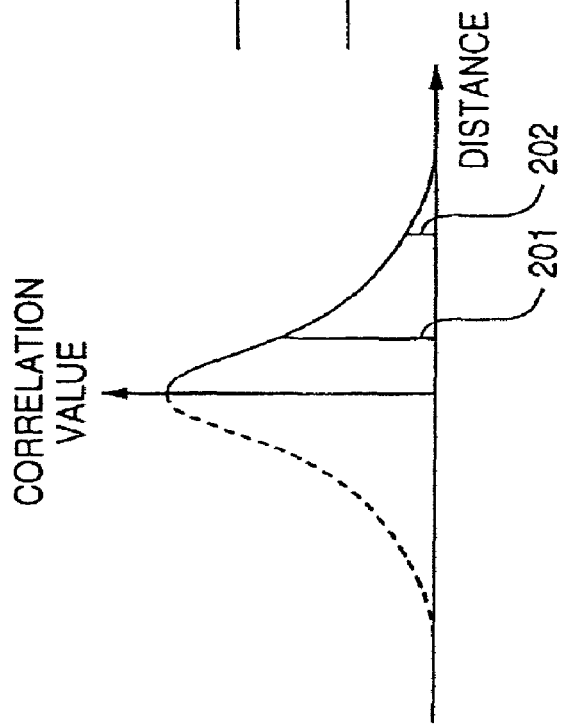
FIG. 3B is a schematic diagram illustrating an image after it is coded by utilizing the correlation according to an embodiment of the present invention.

In the image 101 shown in FIG. 2, the pixel values of the M-th line 104 relatively close to the first line 103 and the pixel values of the N-th line 105 relatively far from the first line 103 are swapped, and after calculating the correlation between the first line and each of the M-th line and the N-th line, the resultant image may be indicated, as shown in FIG. 3B. That is, in the image 101 in which the M-th line 104 and the N-th line 105 have been swapped, the correlation of the first line 103 to the M-th line 104 closer to the first line 103 becomes smaller, as represented by the correlation value 203 with the M-th line 104, while the correlation of the first line 103 to the N-th line 105 farther from the first line 103 becomes greater, as represented by the correlation value 204 with the N-th line 105.

Thus, the original deviation of correlation is destroyed in the correlation shown in FIG. 3B. Generally, however, concerning images, the destroyed deviation of correlation can be restored to the original state by utilizing the original deviation of correlation. That is, the deviation of correlation shown in FIG. 3B is unnatural in terms of the original deviation of correlation possessed by the image 101, and by swapping the M-th line 104 and the N-th line 105, the original deviation of correlation can be obtained. Thus, the unnatural deviation of correlation can be restored to the correct deviation of correlation shown in FIG. 3A, so that the original image 101 can be decoded.

According to the example shown in FIGS. 2, 3A, and 3B, the image 101 is coded by exchanging the lines. In this case, the embedding coder 3 determines which lines should be moved and swapped according to the additional information. Meanwhile, the decoder 6 returns the swapped lines to the original positions by utilizing the correlation, i.e., replaces the coded image by the original image, thereby restoring the original image 101. During the decoding operation, the decoder 6 detects which lines have been moved and swapped so as to decode the additional information embedded in the image 101.

Figure 4:
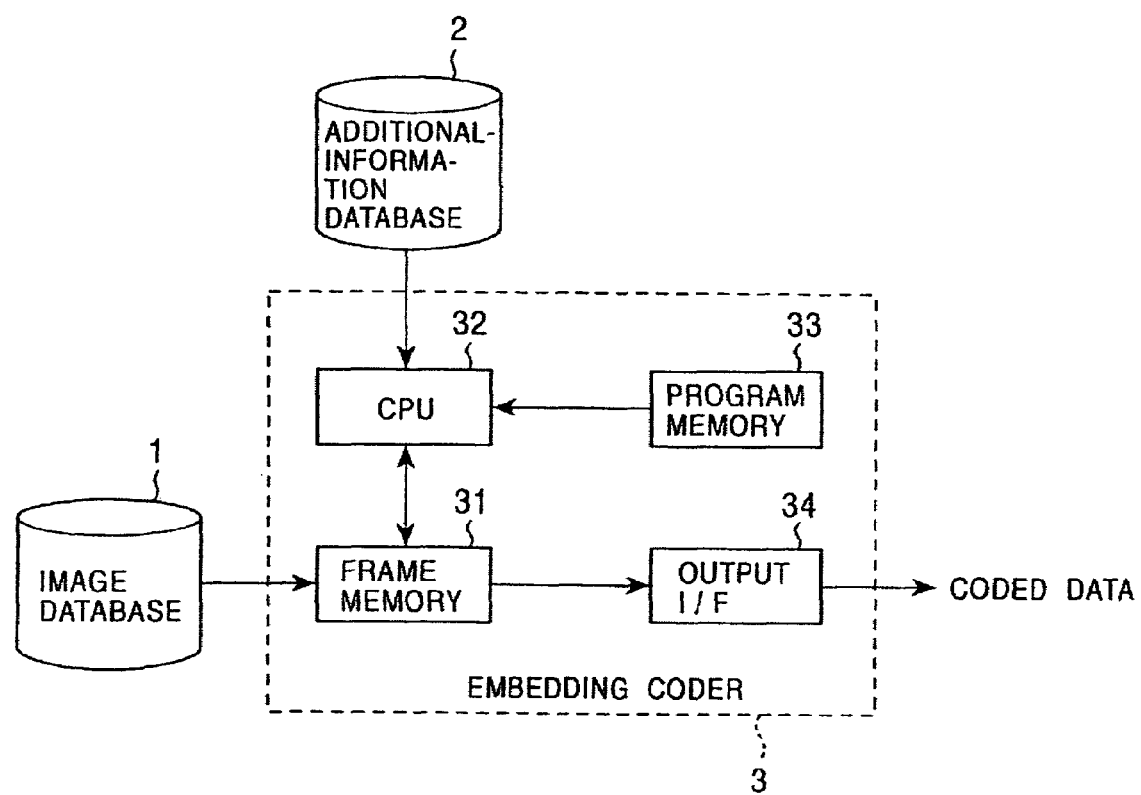
FIG. 4 is a block diagram illustrating an example of the configuration of an embedding coder 3 shown in FIG. 1.

FIG. 4 illustrates an example of the configuration of the embedding coder 3 shown in FIG. 1 that performs embedded-coding by embedding additional information in an image so that the coded image can be decoded into the original image by utilizing the correlation of the image.

Images output from the image database 1 are supplied to a frame memory 31 in which the images are temporarily stored in units of frames. A central processing unit (CPU) 32 performs embedded-coding processing, which will be described below, by executing a program stored in a program memory 33. That is, the CPU 32 receives each bit of additional information from the additional-information database 2 and embeds the one-bit additional information in the image stored in the frame memory 31. More specifically, the CPU 32 selects part of the pixels forming the image stored in the frame memory 31 and performs predetermined processing on the selected pixels according to the additional information so that the original image can be reproduced by utilizing the correlation of the image. As a result, the additional information can be embedded in the selected pixels.

The program memory 33 is formed of, for example, a read only memory (ROM) or a random access memory (RAM), and stores a computer program for enabling the CPU 32 to execute the embedded coding processing. An output interface (I/F) 34 reads an image having embedded additional information therein from the frame memory 31 and outputs it as coded data.

The frame memory 31 is formed of a plurality of banks so that a plurality of frames can be stored. By switching the banks, the frame memory 31 simultaneously stores the image supplied from the image database 1 and the pixels of the image to be processed by the CPU 32. Concurrently, the frame memory 31 also outputs the image having the embedded information therein (coded data). With this arrangement, the coded data can be output in real time even if the image supplied from the image database 1 is a moving picture.

Figure 5:
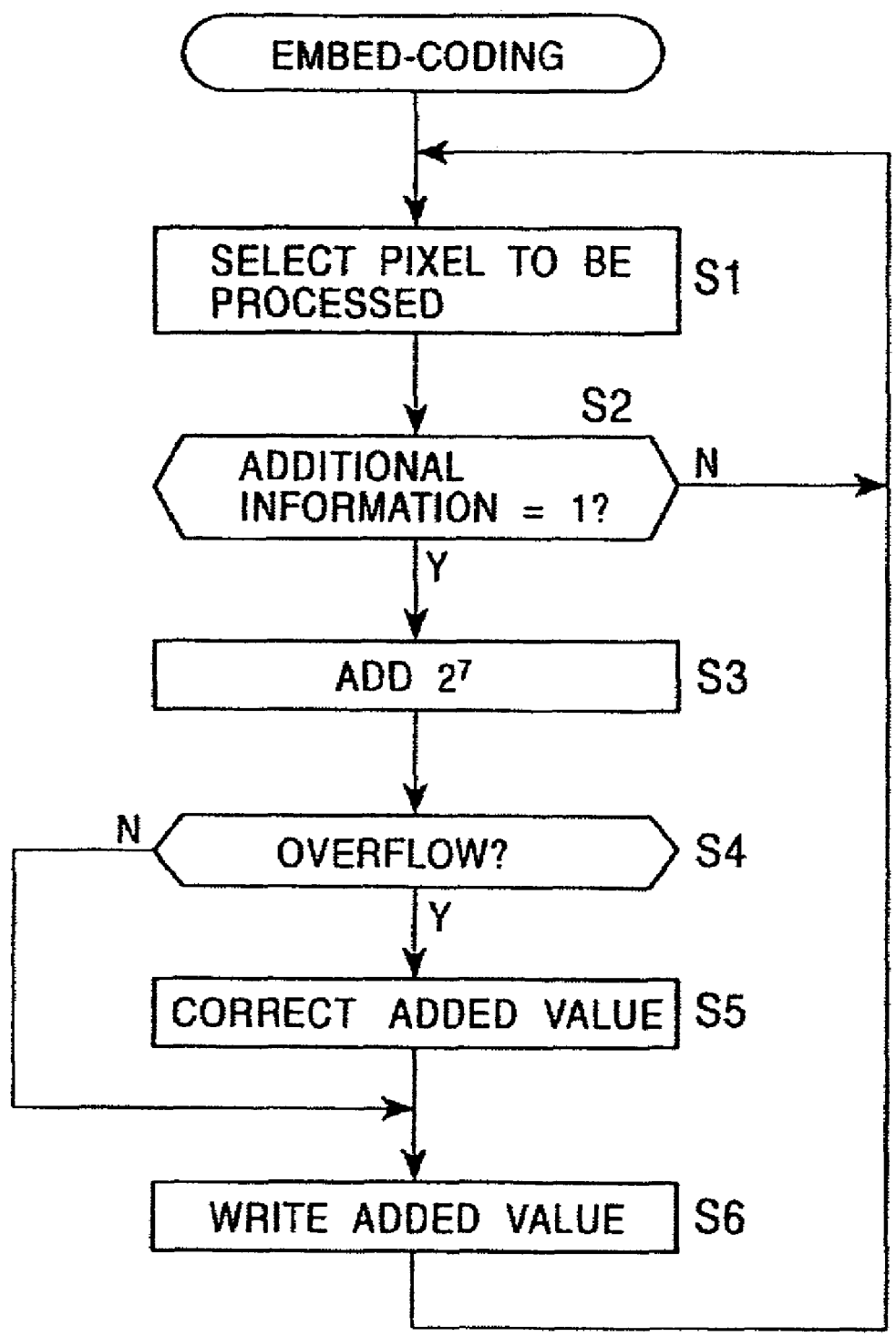
FIG. 5 is a flowchart illustrating embedded coding processing.

The embedded-coding processing performed by the embedding coder 3 is described below with reference to the flow chart of FIG. 5.

Images are read from the image database 1 and are supplied to the frame memory 31 and stored therein in units of frames. Meanwhile, the CPU 32 receives each bit of additional information from the additional-information database 2. In step S1, upon receiving one-bit additional information, the CPU 32 selects from the frame memory 31 the pixels in which the added information is to be embedded (pixels to be processed).

In this embodiment, pixels are alternately selected from the image stored in the frame memory 31 according to a checkerboard pattern, as shown in FIG. 6. That is, every time the processing of step S1 is executed, the CPU 32 sequentially selects a pixel without a hatched portion in FIG. 6, one-by-one, as a pixel to be processed according to, for example, line scanning. In FIG. 10, p(x, y) indicates the pixel positioned at the x-th column from the left and the y-th row from the top (the same applies to the pixels shown in FIG. 10).

Subsequently, in step S2, the CPU 32 determines whether the additional information received from the additional-information database 2 is 1 or 0. If it is found in step S2 that the additional information is 0, the process returns to step S1. That is, if the additional information is 0, the CPU 32 does not perform any processing on the selected pixel (adds 0 as a predetermined constant), and returns to step S1. In step S1, the CPU 32 waits for subsequent one-bit additional information supplied from the additional information database 2 and selects a pixel to be processed. Thereafter, processing similar to that discussed above is repeated.

If it is determined in step S2 that the additional information is 1, the process proceeds to step S3. In step S3, the CPU 32 performs predetermined processing on the selected pixel, more specifically, the CPU 32 adds a predetermined constant to the value of the selected pixel, such as two to the power of the value obtained by subtracting one from the number of bits assigned to the pixel. For example, if eight bits are assigned to the pixel of the image, $2^7$ is added to the value of the pixel to be processed in step S3.

If the pixel value is represented by a luminance component Y, and color components U and V, the above-described addition may be made on anyone of the components Y, U, and V. If the pixel value is indicated by components R, G, and B, the above-described addition may be performed on any one of the components R, G, and B.

In step S4, it is determined whether the value obtained in step S3 causes an overflow. If the outcome of step S4 is no, the process proceeds to step S6 in which the CPU 32 writes (overwrites) the added value into the frame memory 31 as the value of the pixel to be processed. The process then returns to step S1.

If it is found in step S4 that the added value causes an overflow, i.e., that the value is $2^8$ or greater, the process proceeds to step S5 in which the added value is corrected. That is, in step S5, the overflowed value is corrected, for example, by an amount equal to the value overflowed (to the value obtained by subtracting $2^8$ from the overflowed added value). The process then proceeds to step S6 in which the CPU 32 writes the corrected value into the frame memory 31 as the value of the pixel to be processed, and waits for a subsequent one-bit additional information supplied from the additional-information database 2.

After the image for one frame stored in the frame memory 31 has been processed, the output I/F 34 reads the one-frame image (having the additional information embedded therein) as coded data, and the CPU 32 continues to execute processing on a subsequent one-frame image stored in the frame memory 31.

As described above, part of the pixels forming the image stored in the frame memory 31 is selected, and the processing corresponding to the additional information is performed on the selected pixels so that the original image can be decoded by utilizing the correlation of the image, thereby embedding the additional information in the selected pixels. With this arrangement, the additional information can be embedded in the image with minimal loss of the image quality without increasing the amount of data.

That is, the pixels having the embedded additional information therein can be decoded (restored) into the original pixels and into the additional information without requiring the overhead by utilizing the correlation of the image, i.e., the correlation between the pixels with the additional information and the pixels without the additional information. Accordingly, the resulting decoded image (reproduced image) is basically free from the degradation of the image quality caused by embedding the additional information.

Figure 7:
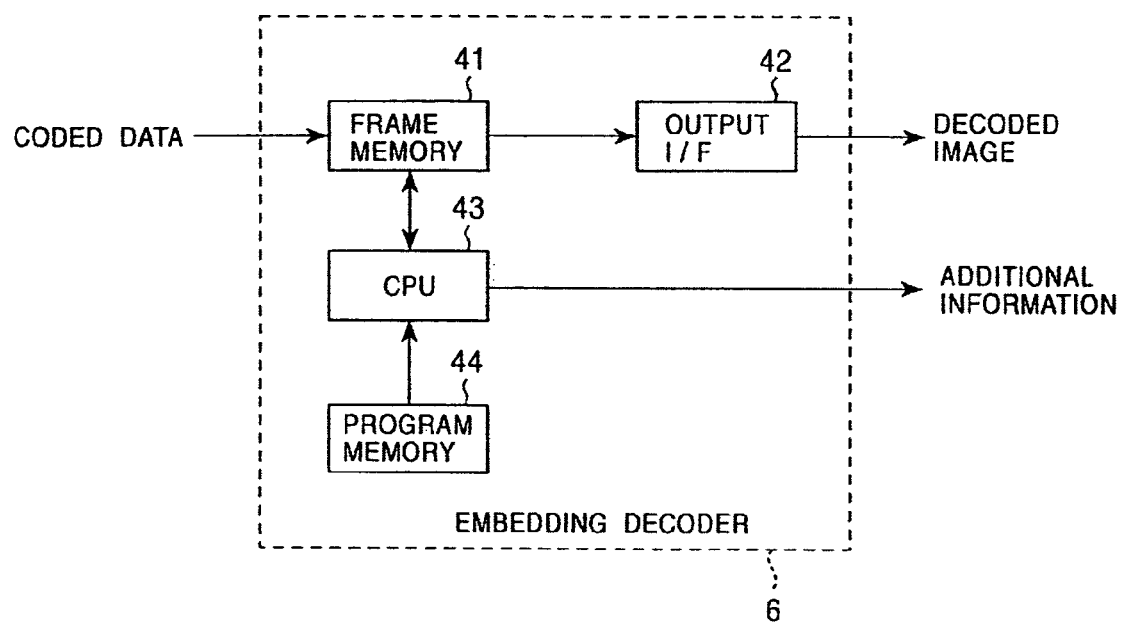
FIG. 7 is a block diagram illustrating an example of the configuration of a decoder 6 shown in FIG. 1.

FIG. 7 illustrates an example of the configuration of the decoder 6 shown in FIG. 1 that decodes the coded data output from the embedding coder 3 shown in FIG. 4 into the original image and into the additional information by utilizing the correlation of the image.

The coded data, i.e., the image having the embedded additional information (hereinafter sometimes referred to as an "embed image"), is supplied to a frame memory 41. The frame memory 41 temporarily stores therein the embedded images in units of frames. The frame memory 41 is constructed similarly to the frame memory 31 shown in FIG. 4, and by changing the banks, the embed images can be processed in real time even if the images are moving pictures. An output interface (I/F) 42 reads an image (decoded image) obtained by performing embed-decoding processing by a CPU 43, which will be discussed later, and outputs the decoded image.

Figure 8:
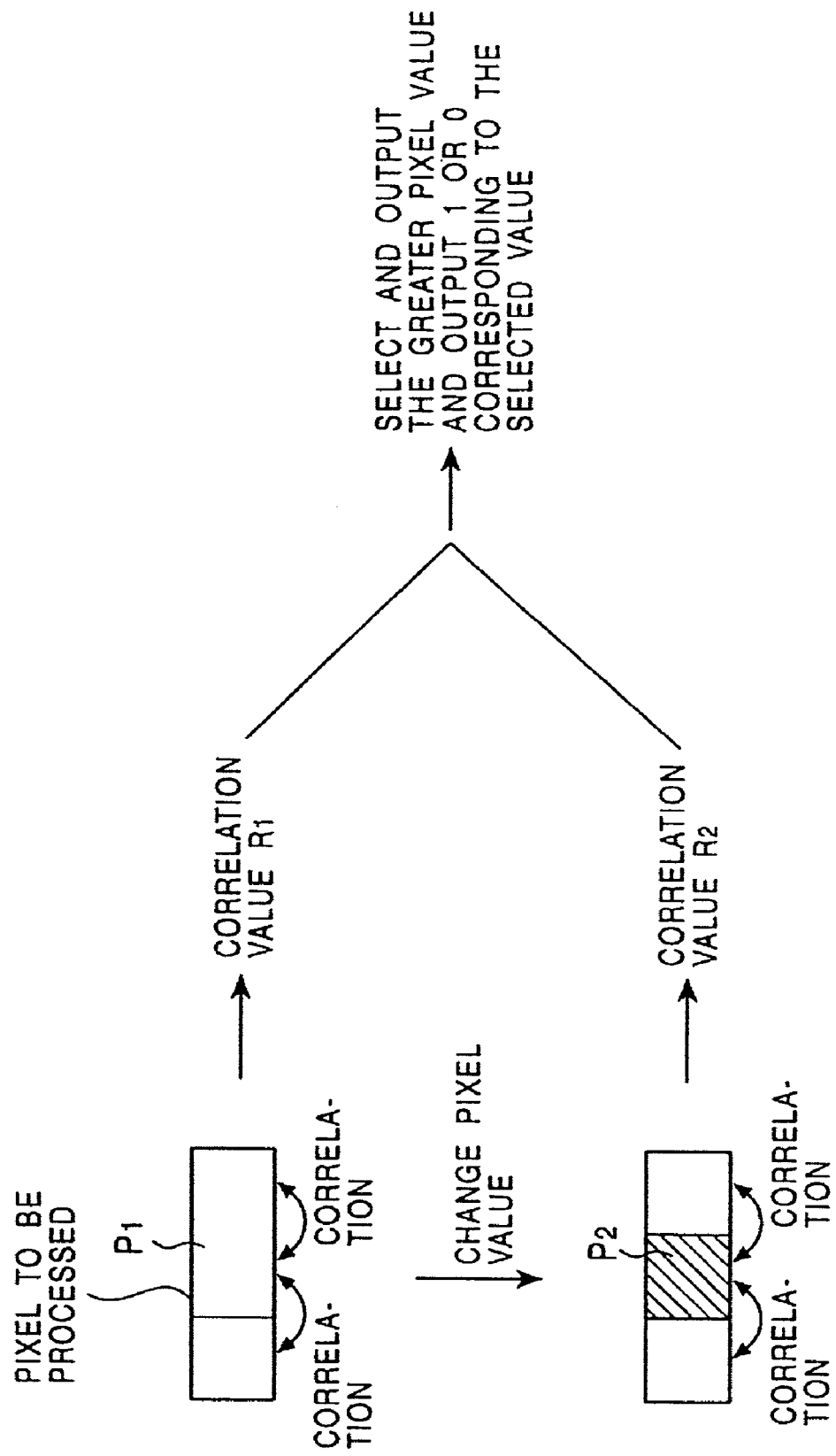
FIG. 8 illustrates the processing performed by a CPU 43 shown in FIG. 7.

The CPU 43 performs decoding processing by executing a program stored in a program memory 44. That is, the CPU 43 decodes the embed image stored in the frame memory 41 into the original image and into the additional information by utilizing the correlation of the image. More specifically, the CPU 43 selects part of the pixels forming the embed image as pixels to be processed, and performs processing opposite to the processing executed by the CPU 32 shown in FIG. 4, as illustrated in FIG. 8, on the selected pixel, thereby changing the pixel value. The CPU 32 then calculates a correlation value R1 (first correlation) between the pixel to be processed before the pixel value is changed and the peripheral pixels (which are horizontally adjacent to the pixel to be processed in the embodiment shown in FIG. 8), and also calculates a correlation value R2 (second correlation) between the pixel to be processed after the pixel value has been changed and the peripheral pixels. Then, the CPU 32 compares the correlation value R1 with the correlation value R2. Based on the comparison result, the CPU 43 selects one of the pixel values before being changed and after being changed and determines the selected value as the decoded value, and also decodes the additional information embedded in the decoded image (1 or 0).

The program memory 44 is constructed similarly to the program memory 33 shown in FIG. 4 and stores therein a computer program for enabling the CPU 43 to perform decoding processing.

Figure 9:
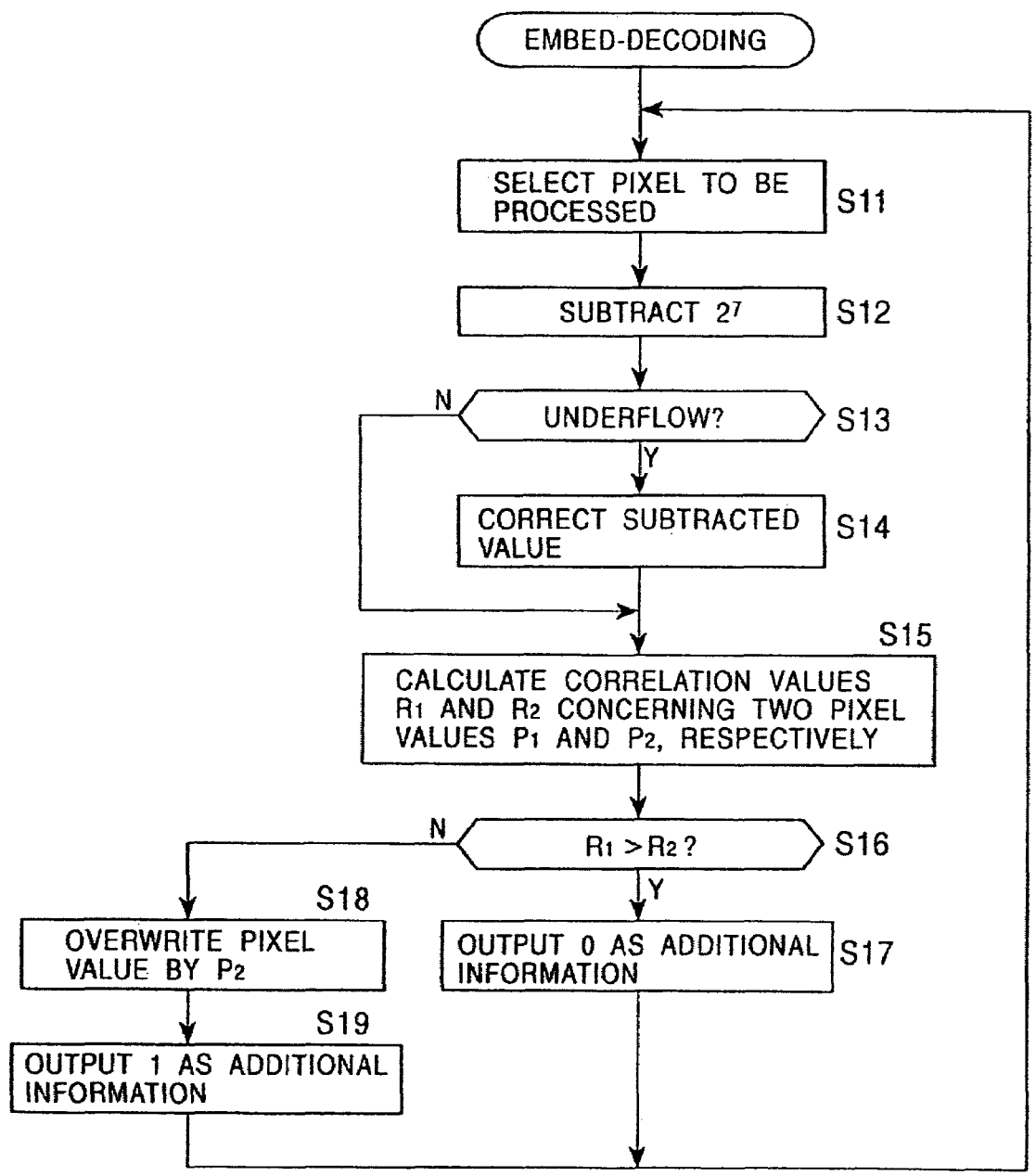
FIG. 9 is a flowchart illustrating the embedded decoding processing.

The decoding processing performed by the decoder 6 is discussed below with reference to the flow chart of FIG. 9.

Embed images are sequentially stored in units of frames in the frame memory 41. In step S11, the CPU 43 selects the pixel to be decoded (pixel to be processed) from an embed image stored in the frame memory 41.

As in the case of the CPU 32 shown in FIG. 4, the CPU 43 alternately selects pixels from the embed image stored in the frame memory 41 according to a checkerboard pattern, as illustrated in FIG. 6. That is, every time the processing of step S11 is executed, the CPU 43 sequentially selects a pixel without a hatched portion in FIG. 6, one-by-one, as a pixel to be processed, according to, for example, line scanning.

In step S12, the CPU 43 executes processing, on the pixel opposite to the processing performed by the CPU 32 shown in FIG. 4. That is, the CPU 43 subtracts a predetermined constant from the pixel value, i.e., two to the power of the value obtained by subtracting one from the number of bits assigned to the pixel of the image. For example, if eight bits are assigned to the pixel value, as stated above, $2^7$ is subtracted from the value of the pixel to be processed in step S12.

If the pixel value is represented by a luminance component Y, and color components U and V, the above-described subtraction may be made on any one of the components Y, U, and V. If the pixel value is indicated by components R, G, and B, the above-described subtraction may be performed on any one of the components R, G, and B. It is necessary, however, that the subtraction in step S12 should be made on the same type of component as that on which the addition in step S3 of FIG. 5 has been performed. More specifically, if the pixel value is represented by, for example, Y, U, and V, and the addition in step S3 of FIG. 5 has been performed on, for example, the Y component, the subtraction should also be made on the Y component in step S12.

After subtracting $2^7$ from the pixel value in step S12, the process proceeds to step S13 in which it is determined whether the subtracted value causes an underflow. If the outcome of step S13 is no, the process skips step S14 and proceeds to step S15.

On the other hand, if it is found in step S13 that the subtracted value causes an underflow, i.e., the subtracted value is less than zero, the process proceeds to step S14 in which the subtracted value is corrected. That is, in step S14, the underflowed subtracted value is corrected to, for example, the value obtained by adding $2^8$ to the subtracted value. The process then proceeds to step S15.

In step S15, the CPU 43 calculates a correlation value R1 between the pixel value P1 (the value from which $2^8$ is not subtracted in step S12, hereinafter sometimes referred to as the "first pixel value") and peripheral pixels; for example, pixels horizontally adjacent to the pixel P1. The CPU 43 also calculates a correlation value R2 between the subtracted pixel value P2 (which has been corrected in step S14, hereinafter sometimes referred to as the "second pixel value") and peripheral pixels, for example, pixels horizontally adjacent to the pixel P2.

More specifically, in step S15, an absolute value of the difference between the first pixel value P1 and each of the adjacent pixel values is calculated, and the two absolute values are added, The resulting value is then determined to be the correlation value R1 with respect to the first pixel value P1. In step S15, an absolute value of the difference between the second pixel value P2 and each of the adjacent pixel values is also calculated, and the two absolute values are added. The resulting value is then determined to be the correlation value R2 with respect to the second pixel value P2.

In step S15, the pixels used for obtaining the correlation values R1 and R2 are not restricted to the pixels horizontally adjacent to the pixel P1 or P2 and may be pixels vertically adjacent to the pixel P1 or P2 or may be pixels temporally adjacent to the pixel P1 or P2. It is not necessary that the pixels for obtaining the correlation values R1 and R2 be spatially or temporally adjacent. Yet, it is desirable that the pixels indicated by hatched portions in FIG. 6, i.e., the pixels without embedded additional information, be used for determining the correlation values R1 and R2 with respect to the pixels P1 and P2, respectively. The reason for this is as follows. Even if the correlation value between the pixel P1 or P2 and the pixels having embedded information therein is obtained, the correlation of the pixel P1 or P2 to the original image cannot be acquired, which makes it impossible to utilize the principle of the correlation of the image. It is thus difficult to correctly decode the original pixel values and the additional information from the pixels having the embedded additional information therein. Additionally, since the pixel P1 or P2 is decoded by utilizing the correlation of the image, it is preferable that the pixels used for obtaining the correlation values R1 and R2 be positioned spatially or temporally adjacent to the pixel P1 or P2.

Then, after calculating the correlation values R1 and R2, the process proceeds to step S16 in which the CPU 43 compares the correlation values R1 and R2.

If it is determined in step S16 that the correlation value R1 is greater than the correlation value R2, the process proceeds to step S17. In step S17, the CPU 43 outputs 0 as the decoded additional information, and returns to step S11. In this case, the value stored in the frame memory 41 is not overwritten, and thus, the decoded pixel value remains the same as the pixel value P1.

More specifically, it has been determined in step S16 that the correlation value R1 concerning the first pixel value P1 is greater than the correlation value R2 concerning the second pixel value P2. It is thus demonstrated that the pixel to be decoded may be more precisely represented by the pixel value P1 than the pixel value P2, and the pixel value P1 is then determined to be the decoded pixel value. Since $2^7$ is not subtracted from the pixel value P1 in step S82, it can be considered that $2^7$ has not been added in step S3 of FIG. 5. In the embed-coding processing shown in FIG. 5, it is determined that $2^7$ is not added when the additional information indicates 0. Thus, if the correlation value R1 concerning the first pixel value P1 is greater than the correlation value R2 concerning the second pixel value P2, and if it is likely that the pixel value P1 rather than the pixel value P2 is determined to be the pixel value to be decoded, the additional information embedded in the corresponding pixel is 0.

If it is determined in step S16 that the correlation value R2 is equal to or greater than the correlation value R1, the process proceeds to step S18. In step S18, the CPU 43 overwrites the pixel value stored in the frame memory 41 by the value obtained by subtracting $2^7$ from the pixel value, i.e., by the second pixel value P2. In this case, therefore, the pixel value P2 is determined to be the decoded pixel value. The process then proceeds to step S19 in which the CPU 43 outputs 1 as the decoded additional information. The process then returns to step S11.

More specifically, it has been determined in step S16 that the correlation value R2 concerning the second pixel value P2 is equal to or greater than the correlation value R1 concerning the first pixel value P1. It is thus revealed that the pixel to be decoded can be represented more precisely by the pixel value P2 than the pixel value P1. Accordingly, the pixel value P2 is determined to be the decoded pixel value. Since $2^7$ is subtracted from the pixel value P2 in step S12, it can be considered that $2^7$ has been added in step S3 of FIG. 5. In the embedded-coding processing shown in FIG. 5, it is determined that $2^7$ is added when the additional information indicates 1. Thus, if the correlation value R2 concerning the second pixel value P2 is equal to or greater than the correlation value R1 concerning the first pixel value P1, and if it is likely that the pixel value P2 is determined to be the pixel value to be decoded, the additional information embedded in the corresponding pixel is 1.

If the difference between the correlation values R1 and R2 obtained as described above is small, it is not possible to unambiguously determine which correlation value R1 or R2 can be used more precisely as the pixel value to be decoded. Accordingly, in this case, not only horizontally adjacent pixels, but also other pixels, may be used for obtaining the correlation values R1 and R2 with respect to the pixel values P1 and P2, respectively. The correlation values R1 and R2 may be then compared, thereby determining which correlation value R1 or R2 can be more precisely used as the decoded pixel.

According to the foregoing description, the coded data representing an image having embedded additional information therein is decoded into the original image and into the additional information by utilizing the correlation of the image, thereby achieving the decoding operation without requiring the overhead for decoding. Accordingly, the decoded image (reproduced image) is basically free from the degradation of the image quality caused by embedding the information into the original image.

Although in this embodiment an absolute value of the difference between the pixel to be processed and another pixel is used as a correlation value between these pixels, the correlation value is not limited to the absolute value obtained as described above.

In this embodiment, pixels are alternately selected from the image according to a checkerboard pattern, as shown in FIG. 6, and additional information is embedded in the selected pixels. However, the pixels may be selected in a pattern different from the above. As stated above, however, in decoding the pixels having the embedded additional information therein, pixels without embedded additional information are desirably selected for obtaining the correlation. The correlation between the pixels becomes smaller as the pixels are spatially or temporally farther away from each other. Accordingly, with a view to achieving precise decoding, the pixels in which additional information are to be embedded should be spatially or temporally selected sparsely. On the other hand, for the purpose of embedding a greater amount of additional information, i.e., for the increased compression ratio, the number of pixels to be selected should be increased to some degree in order to embed the additional information therein. Thus, it is desirable that the pixels for embedding additional information be selected while considering a good balance between precise decoding and a considerably high compression ratio.

In this embodiment, one-bit additional information is embedded in one pixel selected as a pixel to be processed. However, additional information having two bits or greater may be embedded in one pixel. If, for example, two-bit additional information, is embedded in one pixel, one of 0, $2^6$, $2^7$, and $2^6+2^7$ may be added to the pixel value according to the two-bit additional information.

In the foregoing embodiment, the additional information is embedded by adding 0 or $2^7$ to the pixel value (in other words, by adding $2^7$ or not adding $2^7$). The value to be added to the pixel value is not limited to $2^7$. If, however, a value which may produce an influence on only the lower bits of the pixel value is added, the resulting added pixel value does not become substantially different from the original pixel value. Accordingly, no substantial difference be observed between the correlation values R1 and R2 obtained in step S15 of FIG. 9. This decreases the precision of the decoded pixel and the decoded additional information. It is therefore desirable that the value to be added to the pixel value according to the additional information be a value which may produce an influence on the upper bits of the original pixel value.

According to the foregoing embodiment, the additional information is embedded by adding a predetermined value to the pixel value. However, the additional information may be embedded by performing an operation on the pixel value other than the addition (for example, bit inversion). As discussed above, however, with a view to maintaining the quality of the decoded pixel value and the decoded additional information, the operation should be determined so that a significant difference can be produced between the correlation value concerning the original pixel value and the correlation value concerning the pixel value obtained after performing the corresponding operation.

In the foregoing embodiment, one-bit additional information is embedded in one pixel. However, one-bit additional information may be embedded in a plurality of pixels, e.g., in four bits indicated by the circled pixels shown in FIG. 10.

More specifically, it is now assumed that one-bit additional information is embedded in the four pixels p(1, 4), p(5, 4), p(1, 8), and p(5, 8) as illustrated in FIG. 10. In the coding operation, the same operation is conducted on each of the pixels p(1, 4), p(5, 4), p(1, 8), and p(5, 8) according to the additional information, thereby embedding the one-bit additional information in the four pixels. In the decoding operation, the aforementioned correlation value R1 concerning the first pixel value P1 and the correlation value R2 concerning the second pixel value P2 are calculated with respect to each of the pixels p(1, 4), p(5, 4), p(1, 8), and p(5, 8). Then, the correlation value R1 and the correlation value R2 are compared. Upon comparison, the greater pixel values are determined to be the decoded pixel values p(1, 4), p(5, 4), p(1, 8), and p(5, 8) and the decoded additional information. Alternatively, the sum of the correlation values R1 concerning the first pixel values P1 and the sum of the correlation values R2 concerning the second pixel values P2 with respect to all the pixel values p(1, 4), p(5, 4), p(1, 8), and p(5, 8) may be obtained, and upon comparing the two sums, the greater sum may be determined to be the decoded pixel values p(1, 4), p(5, 4), p(1, 8), p(5, 8) and the decoded additional information.

If pixels are alternately selected from the image according to a checkerboard pattern, as shown in FIG. 6, and one-bit additional information is embedded in each of the selected pixels, additional information having the number of bits about one-half the number of pixels of the image can be embedded. However, when one-bit additional information is embedded in four bits, as discussed above, the number of bits of the additional information to be embedded in the selected pixels is reduced to one-eighth the number of pixels of the image.

Figure 11A:
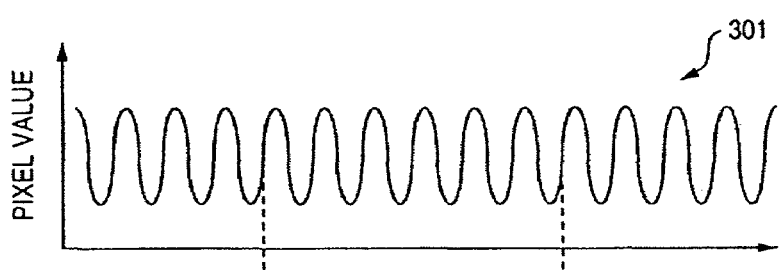
FIG. 11A is a schematic diagram illustrating an image before it is coded or after it is decoded by utilizing the continuity according to an embodiment of the present invention.

As for the continuity of information, it is now assumed that for a certain line of an image, a waveform 301 as shown in FIG. 11A is observed in which the variation patter of pixel values is continuous. In another line that is distant from the above line, a variation pattern of pixel values is observed which is different in continuity from the variation pattern of the above line; a continuity also exists. That is, when focussing attention on a certain pixel value variation pattern, the following deviation of continuity is found in which a similar pixel value variation pattern is observed in adjacent lines and the pixel value variation patterns become more different as lines are positioned farther away from each other.

For example, part of the waveform 301 shown in FIG. 4A in which the variation pattern of pixel values is continuous is substituted by a waveform 302 that is distant from the waveform 301 and has a different variation pattern of pixel values as shown in FIG. 4B.

Figure 11B:
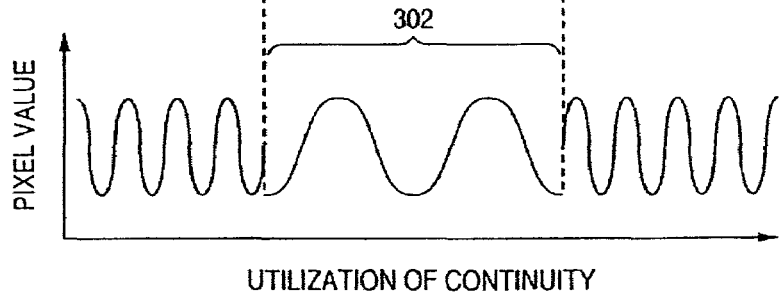
FIG. 11B is a schematic diagram illustrating an image after it is coded by utilizing the continuity according to an embodiment of the present invention.

In FIG. 4B, the above-described deviation of continuity is destroyed. However, the destroyed deviation of continuity can be restored by utilizing the deviation of continuity that portions adjacent to each other have continuous pixel value variation patterns and pixel value variation patterns become more different when pixels are more distant from each other. More specifically, in FIG. 4B, the pixel value variation pattern 302 of the part of the waveform is clearly different from, the pixel value variation patterns of the other parts, and hence the deviation of continuity of the original image can be restored by replacing the pixel value variation pattern 302 with a waveform having a pixel value variation pattern similar to the pixel value variation patterns of the other parts. The waveform shown in FIG. 11A, that is, the original waveform, can be restored from the waveform shown in FIG. 11B by performing such replacement.

In the example described above with reference to FIGS. 11A and 11B, the image coding is to replace part of the waveform with a pixel value variation pattern that is much different from adjacent pixel value variation patterns. In the coding, the embedding encoder 3 determines based on additional information, for example, what part of the waveform should be changed greatly in pixel value variation pattern and to what extent the pixel value variation pattern should be changed. The decoder 6 restores the original waveform from a coded signal, that is, a waveform having a part with a much different pixel value variation pattern by utilizing the deviation of continuity in which the pixel value variation patterns of adjacent pixels are continuous and pixel value variation patterns become more different when the pixels are more distant from each other. Further, in the decoding, the decoder 6 also restores embedded additional, information by detecting, for example, what part of the waveform was changed greatly in pixel value variation pattern and to what extent the pixel value variation pattern was changed.

Another embodiment of the present invention is now described in detail with reference to the drawings. In this embodiment, additional information is embedded into an image so that the embedded additional information can be decoded by utilizing the continuity of the image.

The configuration of an embedding coder used in this embodiment is similar to that of the embedding coder 3, and an explanation thereof will thus be omitted.

Figure 12:
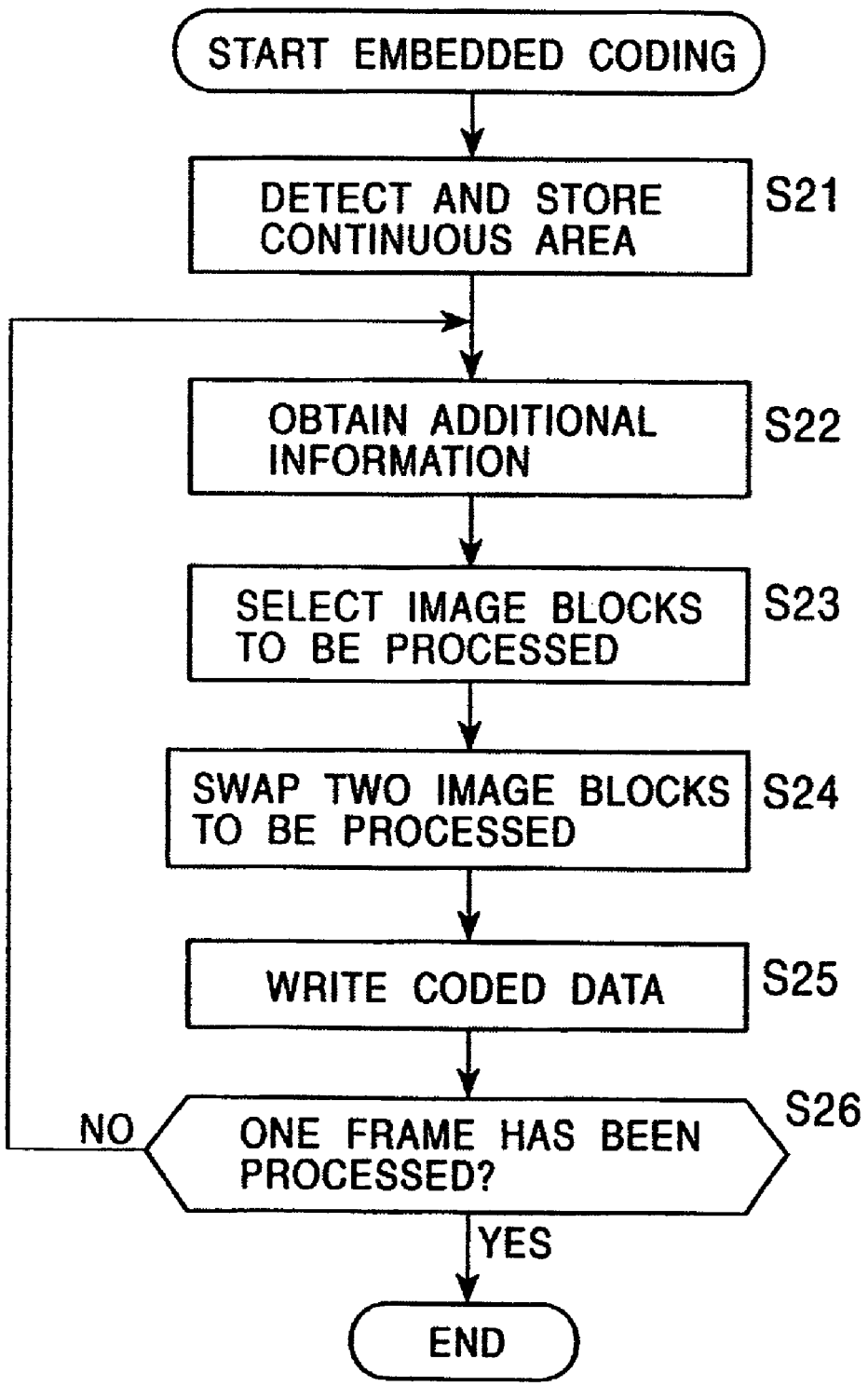
FIG. 12 is a flowchart illustrating the embedded coding processing for coding an image by utilizing the continuity according to an embodiment of the present invention.

The embedded coding operation performed by the embedding coder 3 is discussed below with reference to the flow chart of FIG. 12.

In step S21, the CPU 32 controls data of an image for one frame to be transferred from the image database 1 to the frame memory 31 and also detects a continuous area of the image data and stores the position of the continuous area in the program memory 33 as the continuous area data.

More specifically, the CPU 32 detects a continuous area of image data consisting of 224 (=7×32)×1600 pixels as shown in FIG. 13A. The image data is divided into image blocks, as shown in FIG. 13A, for example, each block consisting of 32×1 pixels, and discrete cosine transform (DCT) processing is performed on each image block so as to calculate a DCT coefficient of each image block.

The CPU 32 scans given image blocks in the order of raster scanning, and sequentially calculates a difference between the DCT coefficient of the corresponding given image block and the DCT coefficient of an image block which is positioned adjacent to the given image block on the left side, and then stores the calculated differences in the program memory 33 as the continuity evaluation values of the given image blocks. Subsequently, the CPU 32 determines that image blocks whose continuity evaluation values (differences) are not greater than a predetermined threshold are continuous areas, and stores the positions of such continuous areas in the program memory 33. In this case, some image blocks within the calculated continuous area may be determined to be a non-continuous area because of an influence of, for example, noise. Thus, after detecting the continuous area, the CPU 32 performs corrections by substituting some non-continuous image blocks with image blocks of the continuous area by enlarging or reducing the continuous area.

In step S22, the CPU 32 receives additional information from the additional-information database 2 in units of 6 bits (3 bits+3 bits).

Then, in step S23, the CPU 32 selects and extracts the first line and the 801st line shown in FIG. 13A into which the above-described 6-bit additional information is to be embedded. Simultaneously, by referring to the continuous area data stored in the program memory 33 in step S21, the CPU 32 selects and extracts only the continuous areas from the first line and the 801st line. In this embodiment, the first line and the 801st line are wholly selected, assuming that the whole areas of the first line and the 801st line are continuous areas.

In step S24, the CPU 32 embeds the additional information into the image data by swapping the image of the first line with the image of the 801st line. An embedding method is stated below with reference to FIGS. 13B, 13C, 13D, and 13E.

FIG. 13B illustrates pixel values of the image data of the first line before the additional information is embedded. FIG. 13C illustrates pixel values of the image data of the 801st line before the additional information is embedded. FIGS. 13B and 13C show that the variation pattern (frequency characteristics) of the pixel values are different between the image data of the first line and that of the 801st line.

In this embodiment, it is assumed that a total of 6 bits of additional information, i.e., the upper 3 bits=2 and the lower 3 bits=6 are embedded into the image data The CPU 32 selects block 2 of the image data shown in FIG. 13B so as to embed the upper 3 bits of the additional information, and also selects block 6 of the image data shown in FIG. 13C so as to embed the lower 3 bits of the additional information. The CPU 32 then swaps the image data of block 2 with the image data block 6, thereby coding the image data shown in FIGS. 13B and 13C into the image data shown in FIGS. 13D and 13E, respectively.

In step S25, the CPU 32 writes (overwrites) the coded first line and the coded 801st line into the frame memory 31.

The CPU 32 then determines in step S26 whether the coded image equivalent to one frame has been processed. If the outcome of step S26 is no, the process returns to step S22 in which additional information is again received. Subsequently, in step S23, the CPU 32 selects the subsequent lines, i.e., the second line and the 802nd line.

If the CPU 32 determines in step S26 that the coded image equivalent to one frame has been processed, the coded data stored in the frame memory 31 is output via the output I/F 34, and the coding operation is completed.

A detailed description is now given of decoding coded data embedded with additional information by utilizing the continuity of an image according to still another embodiment of the present invention.

Figure 14:
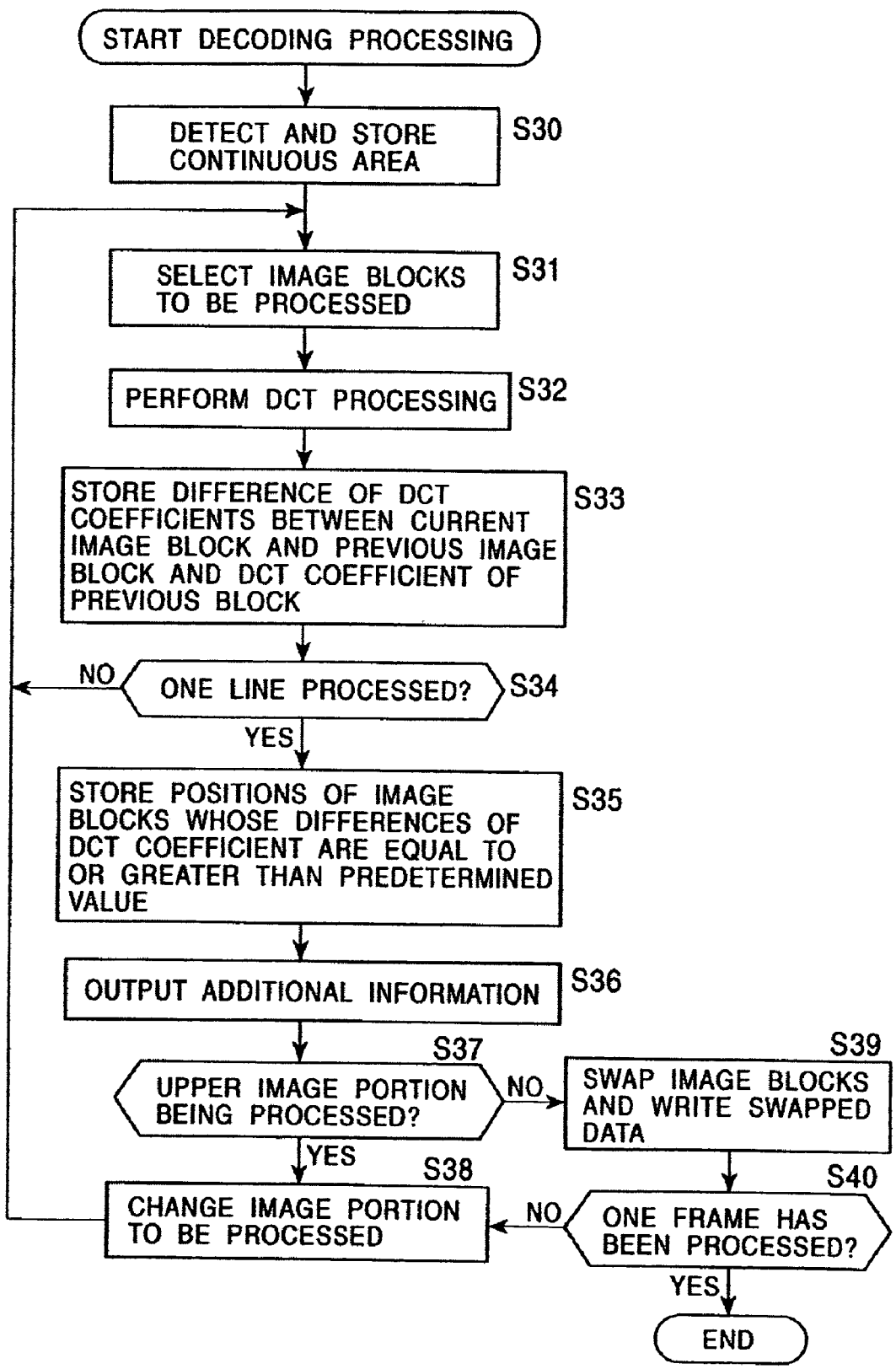
FIG. 14 is a flowchart illustrating the decoding processing for decoding coded data which is coded by utilizing the continuity according to an embodiment of the present invention.

The configuration of a decoder used in this embodiment is similar to that of the decoder 6 shown in FIG. 7, and an explanation thereof will thus be omitted. The operation of decoding the coded data performed by the decoder 6 is discussed below with reference to the flow chart of FIG. 14.

In step S30, the CPU 43 sequentially stores the coded data in units of frames in the frame memory 41. The CPU 43 then selects and extracts continuous areas of the coded data according to a technique similar to that discussed above, and stores the positions of the corresponding image blocks in the program memory 44 as continuous area data. In this embodiment, as stated above, since 3-bit data is embedded into one line, the image data can be coded by exchanging one image block in each line. Accordingly, by enlarging and reducing a continuous area while extracting it, a non-continuous image block can be transformed into a continuous image block, within a continuous area.

In step S31, the CPU 43 selects and extracts one image block shown in FIG. 13A (upper left image block in FIG. 13A) used for decoding 6-bit additional information. In this case, by referring to the continuous area data stored in the program memory 44 in step S30, the CPU 43 selects and extracts image blocks only in a continuous area. In this embodiment, the first line and the 801st line are wholly selected and extracted, assuming that the whole areas of the first line and the 801st line are continuous areas.

In step S32, the CPU 43 performs DCT processing on the image block extracted in step S31 so as to calculate the DCT coefficient.

Subsequently, in step S33, the CPU 43 calculates a difference between the DCT coefficient of the currently given image block and that of the previously given image block, and stores the calculated difference and the DCT coefficient of the currently given image block. If the DCT coefficient of the previously given image block is not stored in the program memory 44, the difference is determined to be zero.

The CPU 43 determines in step S34 whether image blocks equivalent to one line have been processed. If the outcome of step S34 is no, the process returns to step S31 in which the corresponding processing is again repeated. If the result of step S34 is yes, the process proceeds to step S35.

In step S35, the CPU 43 detects the two image blocks having greater difference among the image blocks equivalent to one line stored in the program memory 44, and stores the positions of the detected image blocks in the program memory 44.

In step S36, the CPU 43 outputs the additional information by using the detected two image blocks. When the two image blocks are adjacent to each other, the position of the left image block is stored in the program memory 44 and is also output as the additional information. In FIG. 13D, the image blocks having the greater differences are blocks 2 and 3, and since the left image block is 2, the additional information is determined to be 2. If the additional information is embedded in image block 0 or 7, it is most likely that there is only one image block whose difference is equal to or greater than a predetermined value. In this case, the CPU 43 performs specific processing at the boundaries of the image data. More specifically, when the detected image block is only block 1, the additional information is determined to be 0, and when the detected image block is only block 7, the additional information is determined to be 7. In step S37, the CPU 43 determines whether the currently given image block is contained in the upper portion of the image, i.e., in the first to 800th lines, or the lower portion of the image, i.e., in the 801st to 1600th lines. If the CPU 43 determines that the currently processed image block is contained in the upper portion of the image, the process proceeds to step S38 in which the image portion to be processed is changed from the upper portion to the lower portion. More specifically, in step S38, 800 is added to the currently processed line, for example, to the first line, and the portion to be processed is determined to be the 801st line. Thereafter, the process returns to step S31.

If the CPU 43 determines in step S37 that the currently processed image block is contained in the lower portion of the image, the process proceeds to step S39 in which the positions of the two image blocks stored in step S36 are swapped with each other and are written into the frame memory 41.

The CPU 43 then determines in step S40 whether the image data equivalent to one frame has been decoded. If the result of step S40 is no, the process returns to step S38 in which the image portion to be processed is changed from the lower portion to the upper portion. On the other hand, if the outcome of step S40 is yes, decoding processing is completed.

The image data stored in the frame memory 41 to be decoded, into the original image may be sequentially output in units of two lines, such as the first line and the 801st line, via the output I/F 42. Alternatively, the image data may be wholly output via the output I/F 42 after the decoding processing is completed.

As for the similarity of information, it is known that part of an image obtained by photographing a scene, for example, is generated by utilizing fractal, that is, self-similarity, of the image. For example, a photographed image of a sea 401 and a forest 402 shown in FIG. 15A has a deviation of similarity that the similarity between the pixel value variation pattern of a portion of the sea 401 and that of another portion of the sea 401 is high but the similarity between the pixel value variation pattern of the same portion and that of a portion in the forest 402 that is distant from the sea 401 is low. The same thing is true of the similarity of a shape itself such as an edge shape pattern of an image portion rather than a pixel value variation pattern.

Figure 15A:
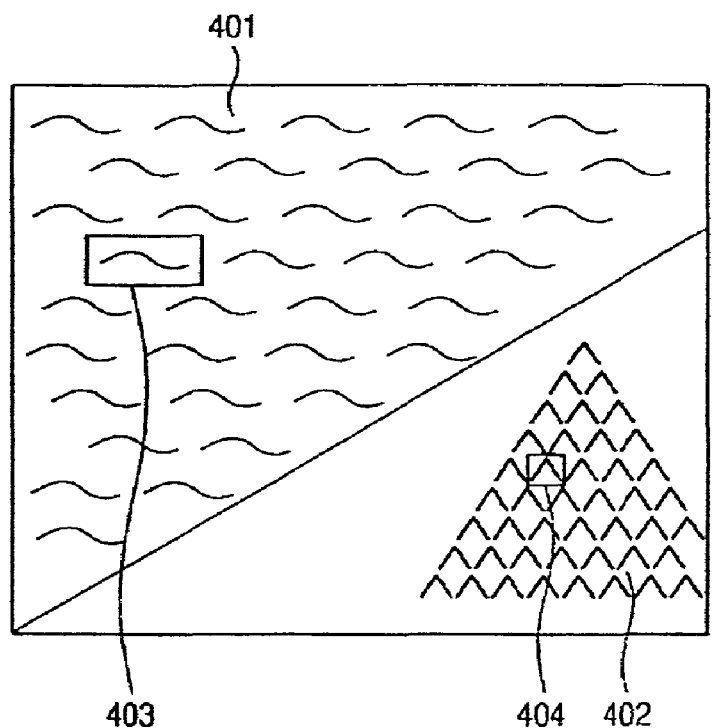
FIG. 15A illustrates an image before it is coded or after it is decoded by utilizing the similarity according to an embodiment of the present invention.
Figure 15B:
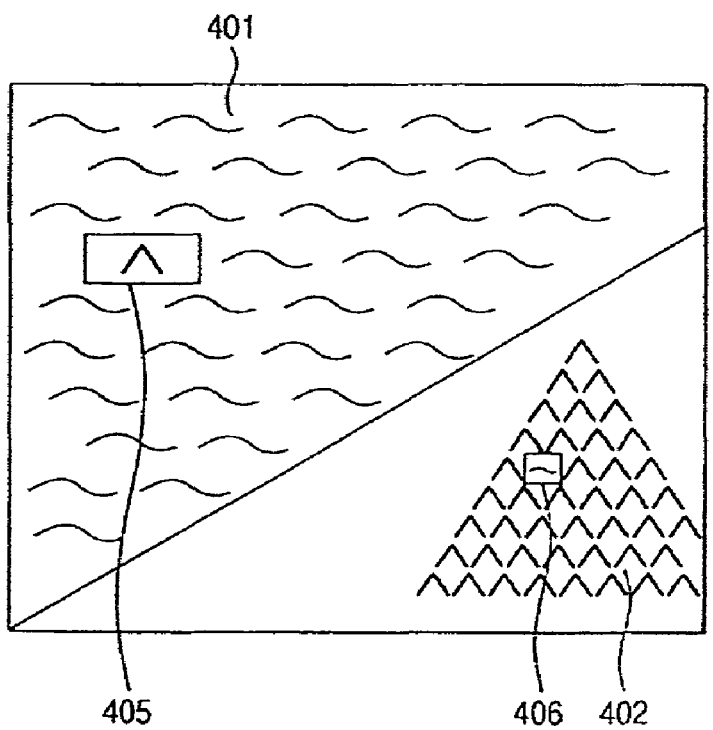
FIG. 15B illustrates an image after it is coded by utilizing the similarity according to an embodiment of the present invention.

For example, a part 403 of the sea 401 shown in FIG. 15A is substituted by a part 404 of the forest 402 as shown in FIG. 15B.

In FIG. 15B, the above-described deviation of similarity is destroyed. However, the destroyed deviation of similarity can be restored by utilizing the deviation of similarity in which the similarity of the pixel value variation patterns of adjacent pixels is high and the similarity becomes lower when pixels are more distant from each other. Specifically, in FIG. 15B in which part of image of the sea 401 is made a part 405 of the image of the forest 402, the similarity between a portion in the sea 401 and the substituted part 405 of the image of the forest 402 is clearly lower than the similarity between portions within the image of the sea 401. The deviation of similarity of the original image is restored by replacing the part 405 that is made the image of the forest 402 with an image having characteristics that are similar to those of an image of the sea 401 around that part 405, that is, a part 406 of the image of the sea 401. The image shown in FIG. 15A, that is, the original image, is restored from the image shown in FIG. 15B by performing such replacement.

In the example described above with reference to FIGS. 15A and 15B, the image coding is to replace the part 403 of the image of the sea 401 with the part 404 of the image of the forest 402. In the coding, the embedding coder 3 determines based on additional information, for example, what part (e.g., a position on the picture) of the image of the sea 401 should be replaced by the part 404 of the image of the forest 402. The decoder 6 restores the original image shown in FIG. 15A from a coded signal, that is, the image of the sea 401 having the part 405 of the image of the forest 402 by utilizing the deviation of similarity of the coded signal that the similarity of the pixel value variation patterns of adjacent pixels is high and the similarity becomes lower as pixels are distant from each other. Further, in the decoding, the decoder 6 also restores embedded additional information by, for example, detecting what part of the image of the sea 401 was replaced by part of the image of the forest 402.

A detailed description is given below, with reference to the drawings, of embedding additional information to an image so that it can be decoded by utilizing the similarity of the image according to another embodiment of the present invention.

The configuration of an embedding coder used in this embodiment is similar to that of the embedding coder 3 shown in FIG. 1, and an explanation thereof will thus be omitted.

Figure 17:
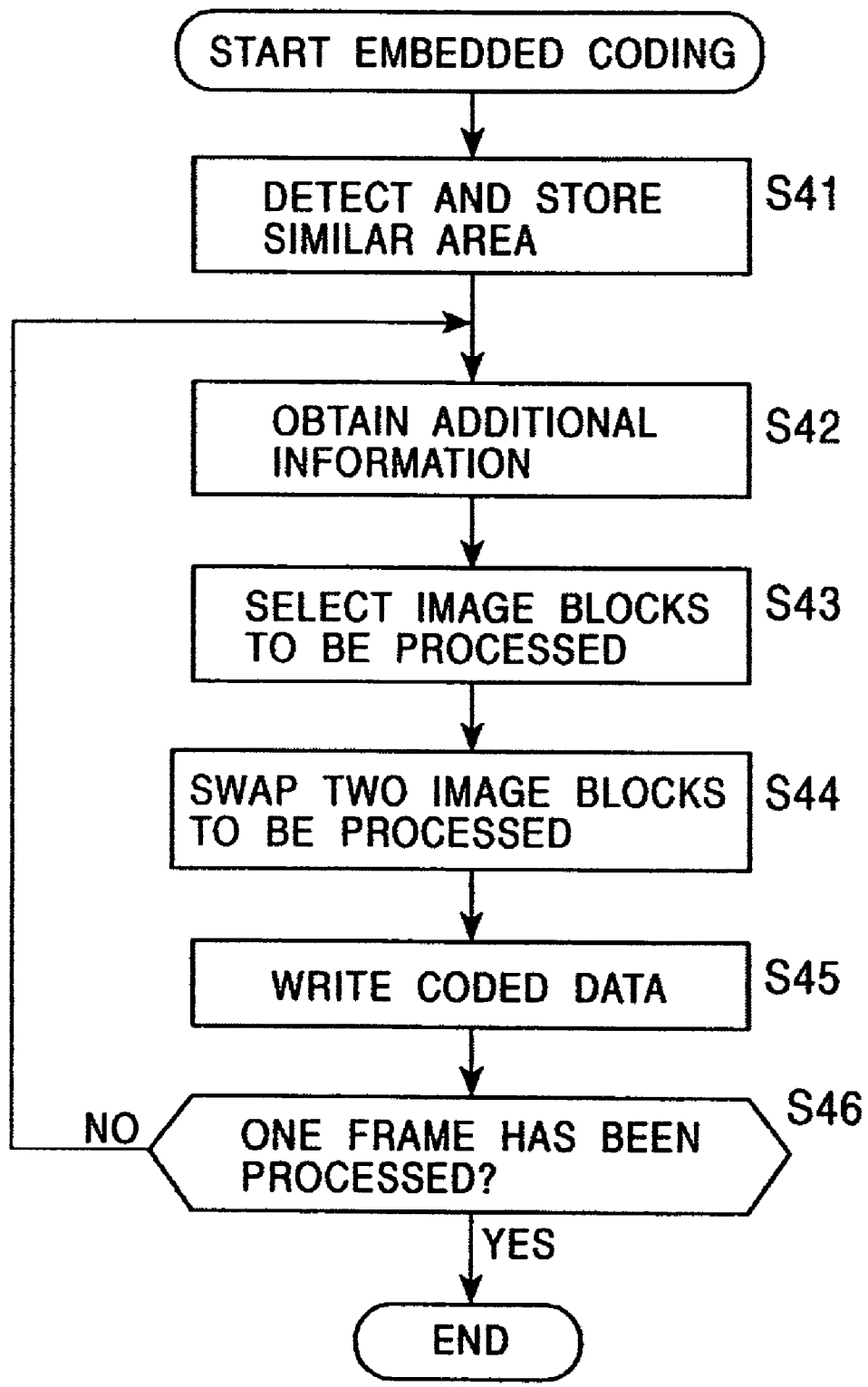
FIG. 17 is a flowchart illustrating the embedded coding processing for coding an image by utilizing the similarity according to an embodiment of the present invention.

The embedded-coding operation performed by the embedding coder 3 is discussed below with reference to the flow chart of FIG. 17.

In step S41, the CPU 32 controls image data equivalent to one frame to be transferred from the image database 1 to the frame memory 31, and also detects a similar area of the image data and stores the position of the similar area in the program memory 33 as similar area data.

Figure 18A:
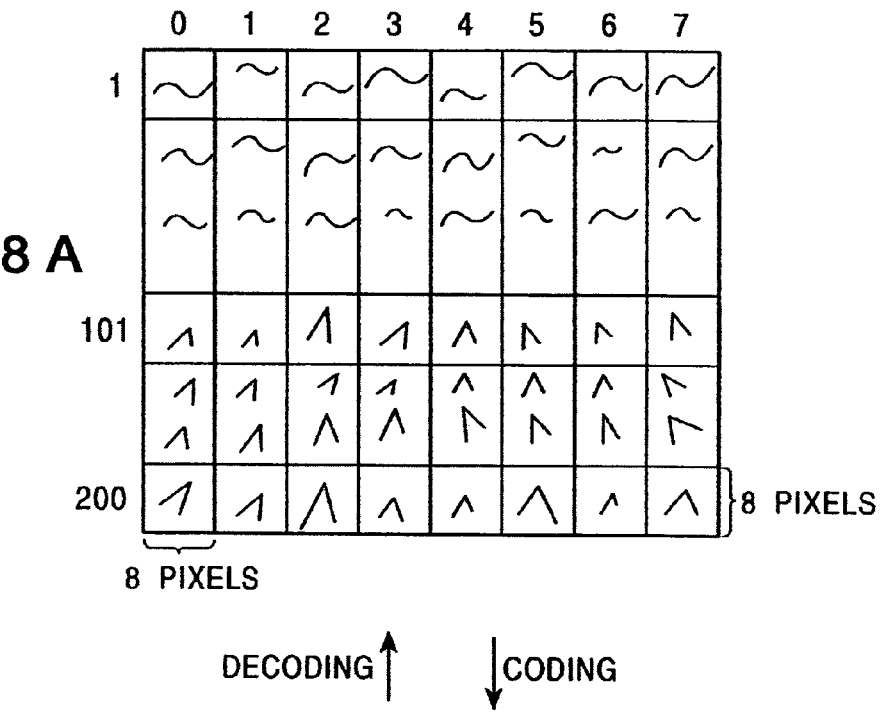
FIG. 18A illustrates image data before the embedded coding processing shown in FIG. 17 is performed or a decoding operation is performed.

More specifically, the CPU 32 detects a similar area of the image data consisting of 56(=7×8)×1600(=200×8) pixels shown in FIG. 18A. The image data is divided into image blocks, for example, each block consisting of 8×8 pixels, as shown in FIG. 18A, and the CPU 32 detects the similarity between a given image block and peripheral image blocks.

The CPU 32 scans the given image block in the order of raster scanning so as to calculate the similarity between the given image block and each of the peripheral image blocks on the left and right sides. The calculating similarity method is as follows. The CPU 32 performs matching of the given image block with each of the left and right adjacent image blocks while changing the size, position, and translation of the given image block by predetermined amounts. The degrees of matching are then normalized and averaged. The CPU 32 then stores the averaged degree of matching in the program memory 33 as a similarity evaluation value. If the leftmost image block or the rightmost image block is a given image block, one of the degrees of matching with the adjacent image blocks on the left and right sides is determined to be the degree of matching of the given image block. The CPU 32 then determines that image blocks whose similarity evaluation values (degrees of matching) are equal to or greater than a predetermined threshold are similar areas, and stores the positions of such image blocks in the program memory 33. In this case, some image blocks within the calculated similar area may be determined to be a dissimilar area because of an influence of, for example, noise. Accordingly, after detecting a similar area, the CPU 43 makes corrections by substituting some dissimilar image blocks with image blocks of a similar area by enlarging and reducing the similar area.

In step S42, the CPU 32 then receives additional information from the additional-information database 2 in units of 6 bits (3 bits+3 bits).

In step S43, the CPU 32 selects and extracts the first line and the 101st line shown in FIG. 18A into which the above-described 6 bit additional information is to be embedded. Simultaneously, by referring to the similar area data stored in the program memory 33 in step S41, the CPU 32 selects and extracts only the similar areas of the first line and the 101st line. In this embodiment, the first line and the 101st line are wholly selected and extracted, assuming that the whole areas of the first line and the 101st line are similar areas.

In step, S44, the CPU 32 embeds the additional information into the image data by swapping the image of the first line with the image of the 101st line. An embedding method is discussed below with reference to FIGS. 18A and 18B.

FIG. 18A illustrates the pixel values of the image data of the first line and those of the 101st line before the additional information is embedded. The variation pattern of the pixel values, that is, the similarity of the image within the image block, of the first line is different from that of the 101st line, as shown in FIG. 18A.

In this embodiment, it is assured that a total of 6 bits, i.e., the upper 3 bits=2 and the lower 3 bits=6, are to be embedded into the image data as the additional information. The CPU 32 selects block 2 of the first line of the image data shown in FIG. 18A so as to embed the upper 3-bit additional information, and also selects block 6 of the 101st line of the image data shown in FIG. 18A so as to embed the lower 3-bit additional information. The CPU 32 then swaps the image data of block 2 with the image data of block 6, thereby coding the image data shown in FIG. 18A into the image data shown in FIG. 18B.

Subsequently, in step S45, the CPU 32 writes (overwrites) the coded first line and the coded 101st line into the frame memory 31.

The CPU 32 determines in step S46 whether the image data equivalent to one frame has been processed. If the outcome of step S46 is no, the process returns to step S42 in which additional information is again received, and in step S43, the CPU 32 selects the subsequent lines, i.e., the second line and the 102nd line.

If the CPU 32 determines in step S46 that the image data equivalent to one frame has been processed, the coded data stored in the frame memory 31 is output via the output VF 34, and the coding processing is completed.

A detailed description is given below, with reference to the drawings, of the operation of decoding the coded data embedded with additional information by utilizing the similarity of images according to a further embodiment of the present invention.

The configuration of a decoder used in this embodiment is similar to that of the decoder 6 shown in FIG. 7, and an explanation thereof will thus be omitted.

Figure 19:
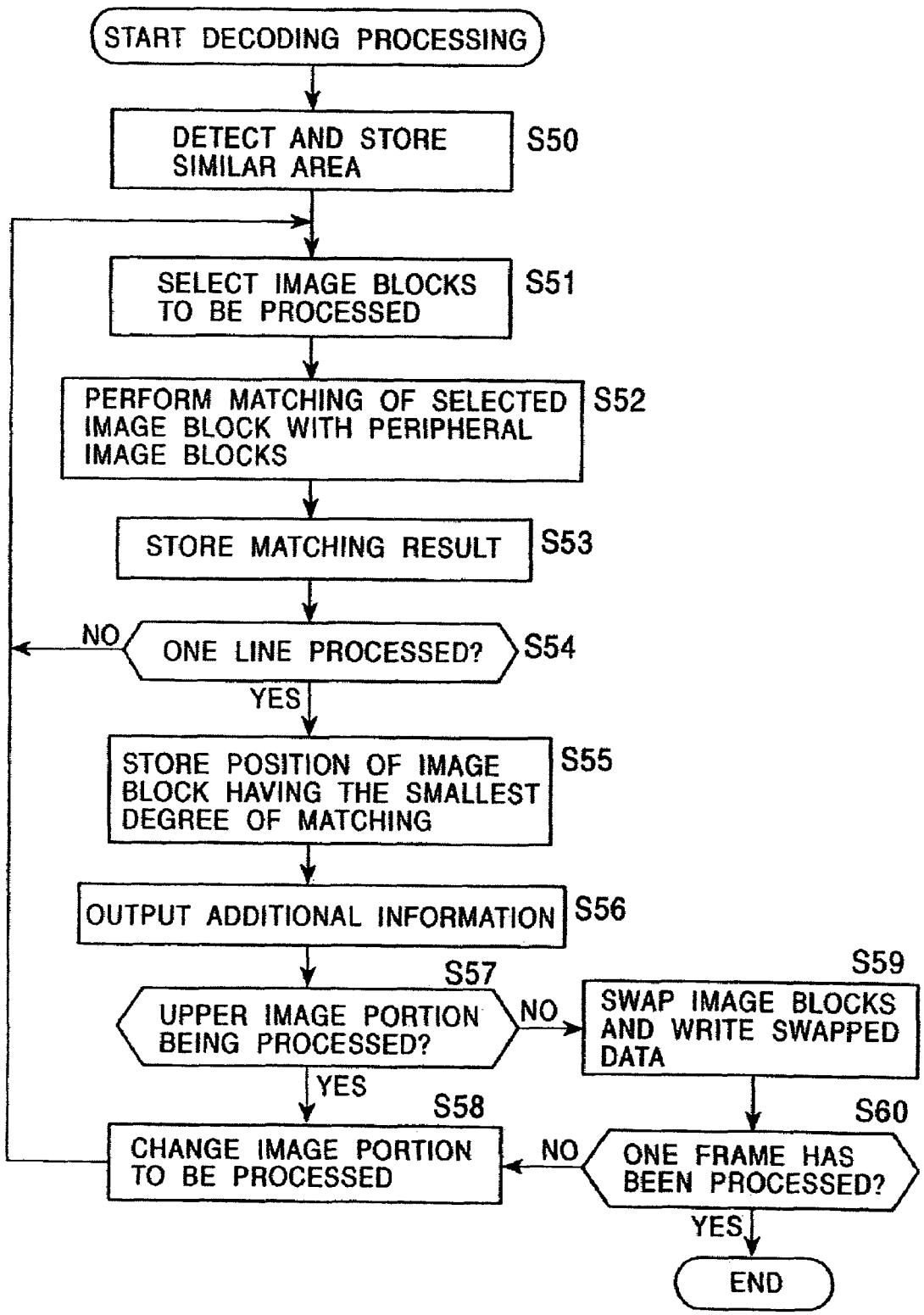
FIG. 19 is a flowchart illustrating the decoding processing for decoding coded data which is coded by utilizing the similarity according to an embodiment of the present invention.

The decoding processing for the coded data performed by the decoder 6 is stated below with reference to the flow chart of FIG. 19.

In step S50, the CPU 43 sequentially stores coded data in the frame memory 41 in units of frames. The CPU 43 also extracts similar areas from the coded data according to a technique similar to that discussed above, and stores the position of the corresponding image blocks in the program memory 44 as the similar area data. In this embodiment, as stated above, since 3 bits of data are embedded into one line consisting of 8 pixels, the image data can be coded by transforming one image block within each line. Accordingly, by enlarging and reducing a similar area while extracting it, a dissimilar image block within a similar area can be transformed into a similar image block.

In step S51, the CPU 43 selects and extracts one image block shown in FIG. 18A (upper left image block shown in FIG. 18A) used for decoding the 6-bit additional information. In this case, by referring to the similar area data stored in the program memory 44 in step S50, the CPU 43 selects and extracts the image blocks only within the similar area. In this embodiment, the first line and the 101st line are wholly selected and extracted, assuming that the whole areas of the first line and the 101st line are similar areas.

In step S52, the CPU 43 calculates the similarity between each of the image blocks extracted in step S51 as a given image block and peripheral image blocks on the left and right sides. The calculating similarity method is similar to that discussed above. More specifically, the CPU 43 performs matching of the given image block with each of the left and right adjacent image blocks while changing the size, position, and translation of the given image block by predetermined amounts. Then, the degrees of matching are normalized and averaged, and in step S53, the averaged degree of matching is stored in the program memory 44 as a similarity evaluation value. If the leftmost image block or the rightmost image block is a given image block, one of the degrees of matching with the adjacent image blocks on the left and right sides is determined to be the degree of matching of the given image block. In this embodiment, the averaged degree of matching of the given image block with the left and right adjacent image blocks is determined to be a similarity evaluation value. Alternatively, between the two degrees of matching, the smaller degree of matching may be stored.

The CPU 43 then determines in step S54 whether the image blocks of the first line has been processed. If the outcome of step S54 is no, the process returns to step S51 in which the corresponding processing is repeated. If the result of step S54 is yes, the process proceeds to step S55.

In step S55, among the degrees of matching of the individual image blocks of the first line stored in the program memory 44, the CPU 43 stores the position of the image block having the smallest degree of matching in the program memory 44.

Figure 18B:
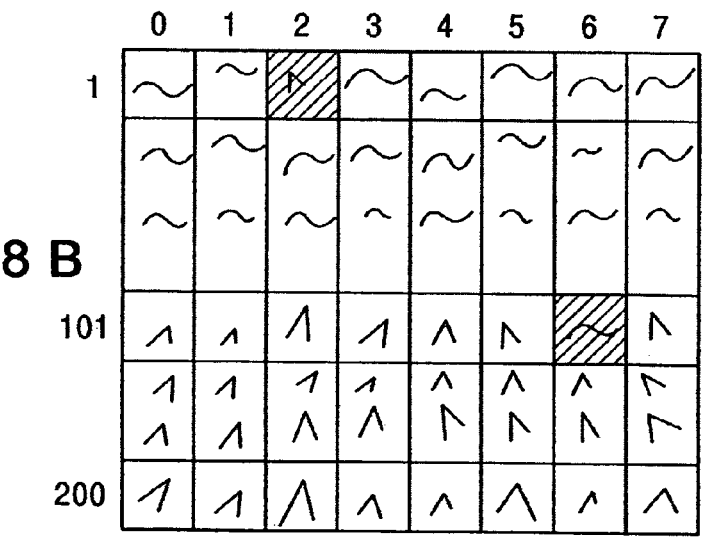
FIG. 18B illustrates coded image data after the embedded coding processing shown in FIG. 17 is performed.

In step S56, the CPU 43 outputs the additional information according to the position of the image block stored in the program memory 44 in step S55. In FIG. 18B, since the image block having the smallest degree of matching is block 2, the additional information is 2.

The CPU 43 determines in step S57 whether the currently processed image block is contained in the upper portion of the image data, i.e., in the first line to, 100th line, or in the lower portion of the image data, i.e., the 101st line to 200th line. If the CPU 43 finds that the currently processed image block is contained in the upper portion of the image, the process proceeds to step S58 in which the image portion to be processed is changed from the upper portion to the lower portion. More specifically, the CPU 43 adds 100 to the currently processed line, for example, the first line, and the 101st line is determined to be a line to be processed. Thereafter, the process returns to step S51.

If the CPU 43 determines in step S57 that the currently processed image block is contained in the lower portion of the image data, the process proceeds to step S59. In step S59, the positions of the two image blocks stored in step S56 are swapped and are written into the frame memory 41.

The CPU 43 determines in step S60 whether the image data equivalent to one frame has been decoded. If the result of step S60 is no, the process returns to step S58 in which the image portion to be processed is changed from the lower portion to the upper portion. If the outcome of step S60 is yes, the decoding processing is completed.

The image data stored in the frame memory 41 to be decoded into the original image may be sequentially output in units of two lines, such as the first line and the 101st line, via the output I/F 42. Alternatively, the image data may be wholly output via the output I/F 42 after the decoding processing is completed.

Figure 16A:
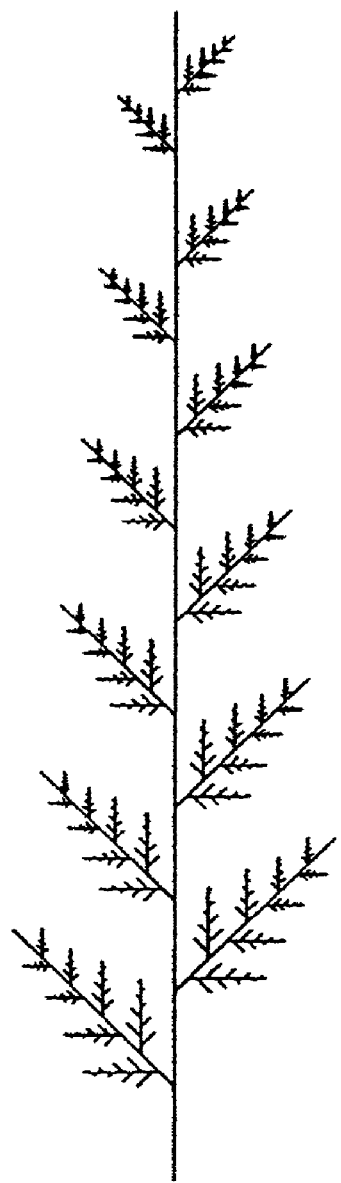
FIG. 16A illustrates an image before it is coded or after it is decoded by utilizing the similarity according to an embodiment of the present invention.
Figure 16B:
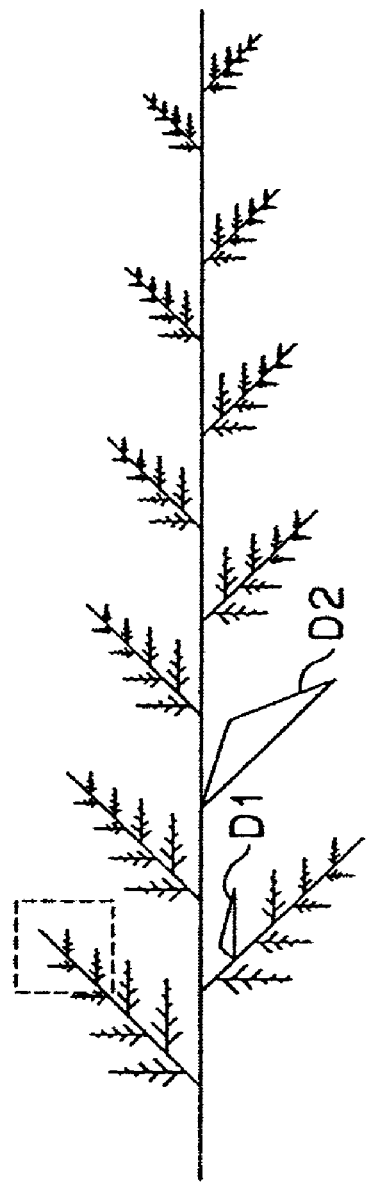
FIG. 16B illustrates an image after it is coded by utilizing the similarity according to an embodiment of the present invention.

The similarity is now explained while referring to the drawings in FIGS. 16A and 16B.

When encoding the fractal image as shown for instance in FIG. 16A, in the embedding coder 3 a portion of the fractal image is replaced with a dissimilar fractal image, according to the additional information and encoding of the fractal image is thus performed. More specifically, in the embedding coder 3, for instance, a portion of the fractal image having the shape of a tree leaf as shown in FIG. 16A is replaced with the triangular shape in FIG. 16B. In FIG. 16B, portions indicated by D1 and D2 are triangular shapes. Further, in the embedding coder 3, information such as the position of the fractal image substituted with the triangular shape and the size and quantity of triangles being substituted with the fractal images are determined according to the additional information.

In the decoder 6, the fractal image and the additional information is decoded, for example, as follows. For example, in FIG. 16B, substitution with the triangular figure is not performed on the section with a dotted line square shape. In the decoder 6 the section with the dotted line square is set as a teacher image, and a shape (in this case the triangle) which is not similar to the teacher image is then searched for. Further, in the decoder 6, the triangles which are not similar to the teacher image are substituted with the image (fractal image) generated from the reference figure of the fractal image contained in the teacher image in order to decode the original (source) fractal image shown in FIG. 16A In the case discussed above, it is necessary to detect the reference figure of the fractal image contained in the teacher image in the decoder 6, which is performed, for example, as follows. The reference figure of the fractal image of FIG. 16B is searched based on the similarity between the teacher image and portions other than the teacher image, and, self-similarity of the teacher image. Then, the figure which is able to express the portions other than the teacher image most efficiently is detected as the reference figure.

Also, in the decoder 6, the pattern for generating the original fractal image is recognized, and based on this pattern, images which should be substituted for the triangles are generated by using the reference figure. In the decoder 6, in order to generate an image which should be substituted for the triangles, the size, the position, and the translation of the reference figure are specified based on the above-described pattern. Then, the reference figure is operated according to the specified size, the position, and the translation, thereby creating the image (fractal image) which is to be substituted for the triangles As described above, the embedding coder 3 codes a coding object image in accordance with additional information so that decoding will be performed by utilizing an energy distribution of the image. The decoder 6 decodes coded data into the original image and the additional information without any overhead for decoding by utilizing an energy distribution of the image.

Since additional information is embedded into a coding object image, a resulting coded image is rendered different from the original state and unrecognizable as valuable information. That is, encryption of the coding object image without any overhead is realized.

Further, completely reversible digital watermarking is realized. For example, in the conventional digital watermarking, the lower bits of pixel values that do not much influence the image quality are simply changed to values corresponding to a digital watermark. However, it is difficult to restore the lower bits to the original values. Therefore, changing the lower bits as digital watermarking causes deterioration in the image quality of a decoded image. In the embedded coding of the invention, in the case where coded data is decoded by utilizing an energy distribution of the original image, the original image having no deterioration and additional information are obtained. Therefore, the image quality of a decoded image is not deteriorated even if the additional information is used as digital watermarking information.

Since embedded additional information is extracted by decoding coded data into an image, side information is provided without any overhead. In other words, since additional information is embedded into an image without any overhead that is usually necessary to extract the additional information, coded data that is obtained as a result of the embedding is compressed by an amount corresponding to the additional information. For example, if a half of an image is assigned to a coding object and the other half is assigned to additional information, and if the latter half of the image is embedded into the half image as the coding object, the image is simply compressed into ½ of the original image.

Since coded data is decoded by utilizing an energy distribution of the original image which is, so to speak, a statistical quantity, the error resistance is high. That is, robust coding which is coding high in robustness is realized.

Since coded data is decoded by utilizing an energy distribution of the original image, there is a possibility that more additional information is embedded when the energy distribution is more characteristic, that is, when, in the case of an image, the activity of the image is higher or its redundancy is lower. As described above, coded data obtained as a result of embedding of additional information is compressed by an amount corresponding to the additional information. That is, the compression ratio is higher when the activity of the image is higher or the redundancy of the image is lower. In contrast, in the MPEG (Moving Picture Experts Group) scheme, for example, which is a conventional coding scheme, basically the compression ratio is lower when the activity of an image is higher or the redundancy of an image is lower. The embedded coding scheme of the invention is much different from the conventional coding schemes in this respect.

An image can be provided with a voice used as a key by making an image a coding object and employing, as additional information, information of a different medium than an image, for example, a voice. More specifically, on the coding unit 10, a voice spoken by a contractor, such as "Open sesame," is embedded as additional information into an image. On the decoding unit 20, a user is instructed to speak a voice "Open sesarne" and speaker recognition is performed by comparing the voice of the user with the voice embedded in the image. As a result of speaker recognition, only when the user is recognized as a contractor, the image can be provided. A voice waveform itself, as well as what is called a feature parameter of a voice, can be used as a voice as additional information.

A voice can be provided with an image used as a key (e.g., voice response after face. recognition) by making a voice a coding object and employing, as additional information, information of a media different than a voice, for example, an image. More specifically, on the coding unit 10, an image of the face of a user is embedded into, for example, a voice as a response to the user. On the decoding unit 20, the face of a user is photographed and a voice in which a face image that matches the photographed image is embedded is output. In this manner, a voice response system that makes voice responses that are different for respective users is realized.

It is also possible to embed information of a certain medium into another information of the same medium such as embedding one voice into another voice or embedding one image into another image. Further, by embedding a voice and a face image of the contractor, what is called a double key system can be realized in which an image can be presented: only when a voice and a face image of a user coincide with those embedded in the image.

For example, it is also possible that one of an image and a voice that constitute a television broadcast signal and are, so to speak, synchronized with each other is embedded into the other. In this case, what is called a true integrated signal can be realized in which pieces of information of different media are integrated with each other.

In the embedded coding scheme of the invention, as described above, more additional information may be embedded into information when the energy distribution of the information is more characteristic. Therefore, the overall data amount is controlled by, for example, adaptively selecting one of two pieces of information having a more characteristic energy distribution and embedding the other into the selected piece of information. That is, it becomes possible to cause one of two pieces of information to absorb the information quantity of the other. Controlling the overall data amount enables information transmission using a data amount that conforms to the transmission bandwidth and the use status of a transmission line and other factors of the transmission environment (i.e., environment-adaptive network transmission).

For example, coding in which higher-layer information having a smaller information quantity than lower-layer information is generated (what is called layered coding) is realized without increasing the data amount by embedding a reduced image into the original image or by embedding a decimated voice into the original voice.

For example, by embedding an image to serve as a key for retrieving each original image into each original image, a database is realized in which an image is retrieved based on a key image.

Figure 20:
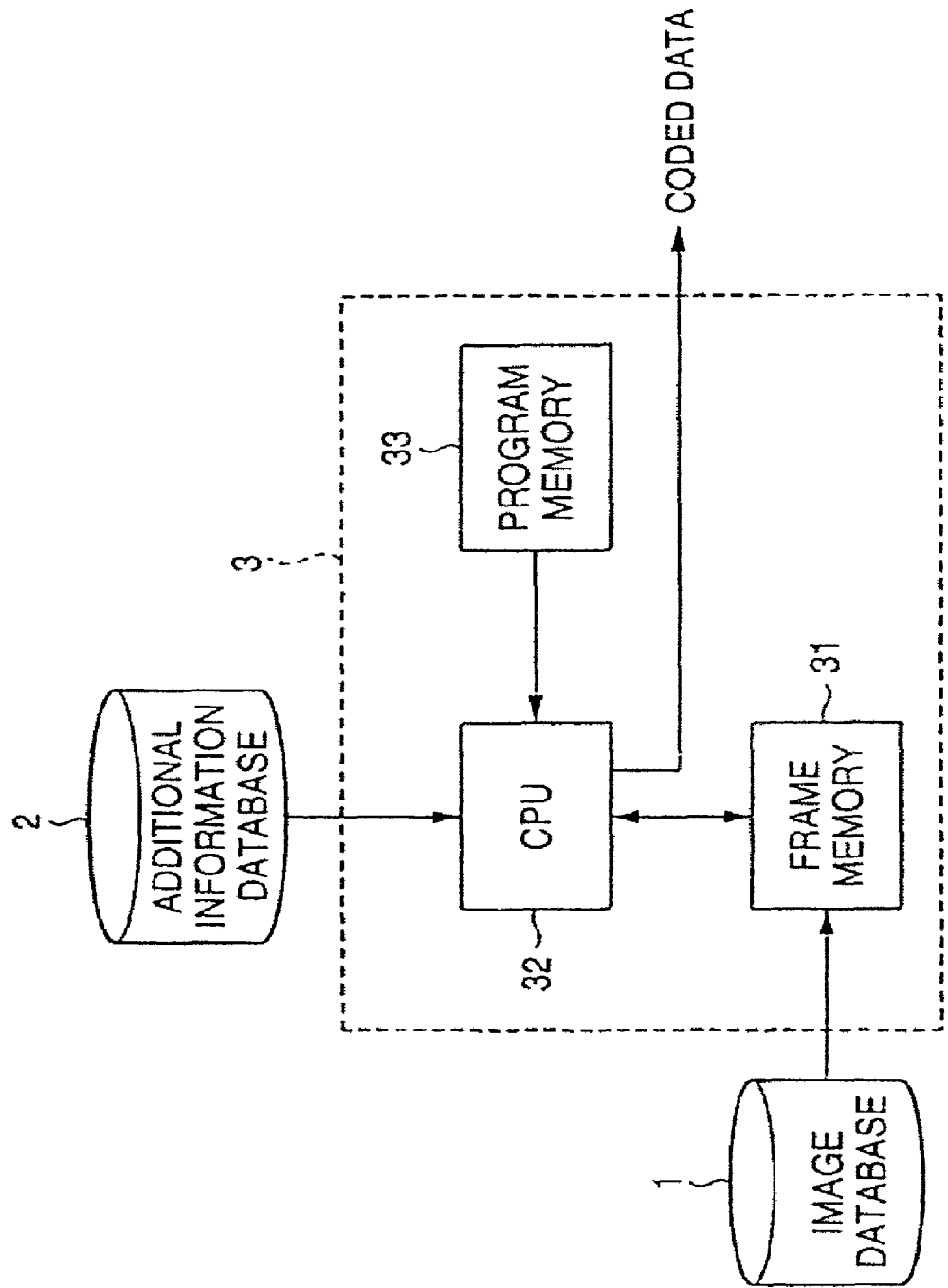
FIG. 20 is a block diagram illustrating an example of the hardware configuration of the embedding coder 3 shown in FIG. 1.

FIG. 20 shows an example of the hardware configuration of the embedding coder 3 shown in FIG. 1 which performs embedded coding in which additional information is embedded into an image so that the original image can be restored by utilizing the correlation of the image.

An image that is supplied from the image database 1 is supplied to a frame memory 31. The frame memory 31 temporarily stores, for example, on a frame-by-frame basis, the image supplied from the image database 1.

A CPU (central processing unit) 32 executes a program stored in a program memory 33 and performs controls so that an embedded coding operation (described later) is performed. That is, the CPU 32 receives additional information that is supplied from the additional information database 2 and controls the entire embedding coder 3 according to the program so that the additional information is embedded into the image stored in the frame memory 31. More specifically, the CPU 32 performs controls so that the additional information is embedded into each column by rearranging the positions of the pixels that constitute the image stored in the frame memory 31 in accordance with the additional information on a column-by-column basis, for example (column a vertical array of pixels). The CPU 32 performs a control so that an image in which the additional information is embedded is output as coded data.

The program memory 33 is formed of, for example, a ROM (read-only memory) or a RAM (random access memory), and stores a computer program for causing the CPU 32 to perform an embedded coding operation.

To be capable of storing a plurality of frames, the frame memory 31 is composed of a plurality of banks. By switching among the banks, the frame memory 31 simultaneously perform storage of an image that is supplied from the image database 1, storage of an image as an object of an embedded coding operation of the CPU 32, and output of an image produced by the embedded coding operation, that is, coded data. Coded data is output in real time even if the image supplied from the image database 1 is a moving picture.

Figure 21:
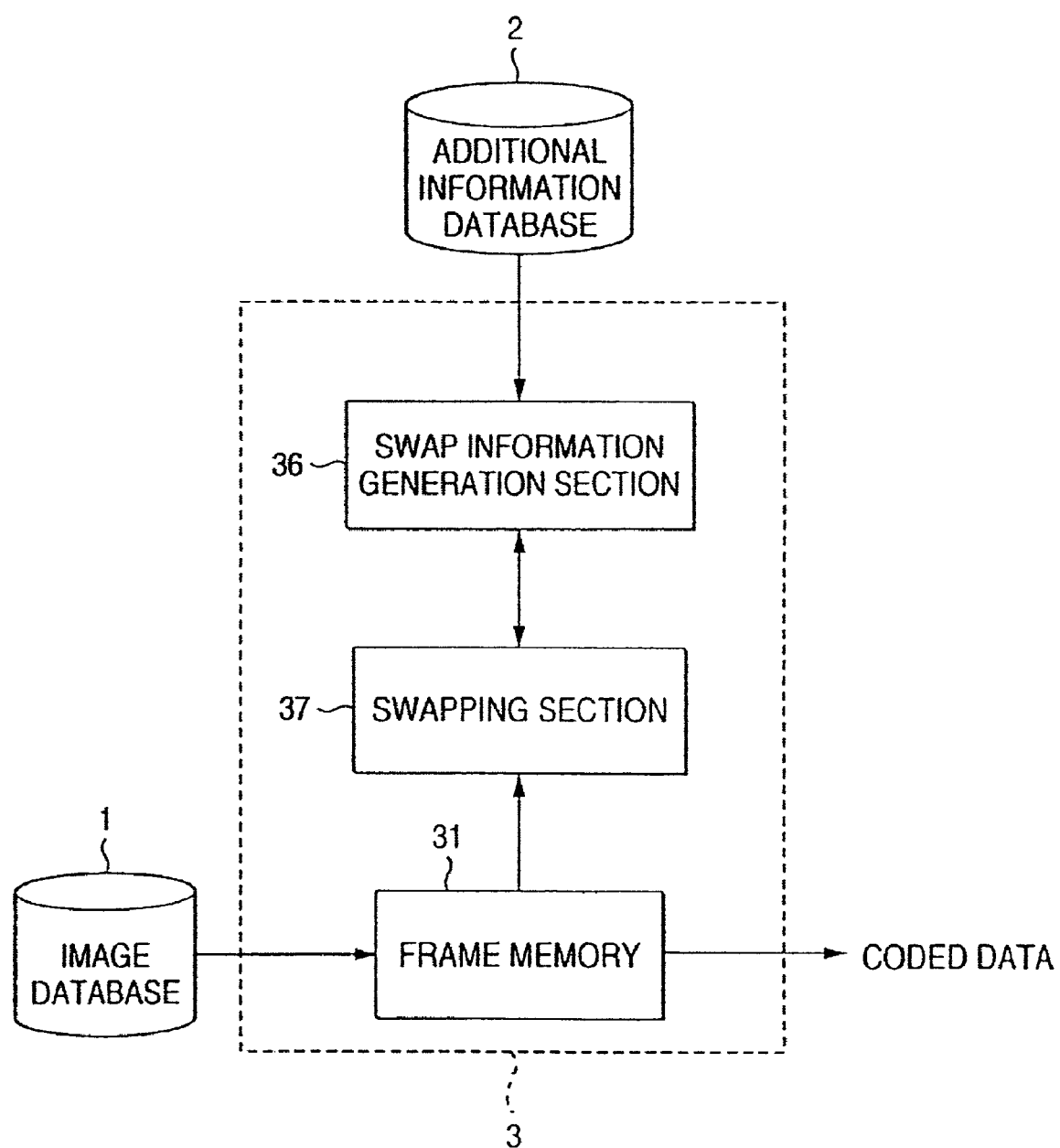
FIG. 21 is a block diagram illustrating an example of the functional configuration of the embedding coder 3 shown in FIG. 20.

FIG. 21 shows an example of the functional configuration of the embedding coder 3 of FIG. 20. The functional configuration shown in FIG. 21 is realized by the CPU 32 executing a computer program stored in the program memory 33.

As described above with reference to FIG. 20, the frame memory 31 temporarily stores an image that is supplied from the image database 1.

A swap information generation section 36 reads out additional information from the additional information database 2, and generates, based on the additional information, swap information that indicates how the positions of the respective columns of the one-frame image stored in the frame memory 31 should be rearranged. When the one-frame image stored in the frame memory 31 consists of M-row/N-column pixels, the nth column (from the left end) and the n'th column of the image are to be swapped. Then, the swap information generation section 36 generates swap information that correlates n with n', where n and n' are integers of 1 to N.

Where a one-frame image consists of N columns, there are N! ("!" means factorial) kinds of manners of rearranging the columns if all the columns are to be subjected to the rearrangement. Therefore, additional information of $\log_2(N!)$ bits is embedded in one frame.

Swap information generated by the swap information generation section 36 is supplied to a swapping section 37. The swapping section 37 rearranges the positions of the respective columns of the one-frame image stored in the frame memory 31 according to the swap information that is supplied from the swap information generation section 36.

An embedded coding process that is executed in the embedding coder 3 of FIG. 21 will be described below with reference to a flowchart of FIG. 22.

Stored images are read out from the image database 1, and are sequentially supplied to the frame memory 31 and stored therein.

In step S61, the swap information generation section 36 reads out, from the additional information database 2, additional information of a data amount that can be embedded into a one-frame image. For example, as described above, when a one-frame image consists of N columns and all the columns are to be subjected to rearrangement, additional information of a maximum of $\log_2(N!)$ bits can be embedded into one frame. Additional information of $\log_2(N!)$ bits or less is thus read out from the additional information database 2.

The process then goes to step S62, where the swap information generation section 36 generates swap information based on the addition information that was read out in step S61. More specifically, based on the additional information, the swap information generation section 36 generates swap information that indicates to which columns each of the second to Nth columns (excluding the first column), for example, among the first to Nth columns of the processing object frame that is stored in the frame memory 31 should be moved. The swap information is supplied to the swapping section 37.

When the swapping section 37 receives the swap information from the swap information generation section 36, the process goes to step S63, where the swapping section 37 rearranges the positions of the respective columns of the processing object frame that is stored in the frame memory 31 according to the swap information. A column-position-rearranged frame is read out from the frame memory 31 and output as coded data. A column-position-rearranged frame may be read out after the memory positions of the respective columns of the image stored in the frame memory 31 have been rearranged. Alternatively, the CPU 32 may perform a control so that output data will be rendered in a "data rearranged state" through changing of readout order.

In this embodiment, as described above, although the swap information includes information indicating to which columns each of the second to Nth columns should be moved it does not include information indicating to which column the first column should be moved. Therefore, while the swapping section 37 moves the second to Nth columns, it does not move the first column.

When all of the second to Nth columns of the processing object frame have been subjected to the rearrangement, the process goes to step S64, where it is judged whether the frame memory 31 stores a frame that has not been made an object of processing. If it is judged that the frame memory 31 stores such a frame, the process returns to step S61 and operations similar to the above are performed for the frame that has not been processed yet.

If it is judged in step S64 that the frame memory 31 does not store a frame that has not been made an object of processing, the embedded coding process is finished.

Figure 23A:
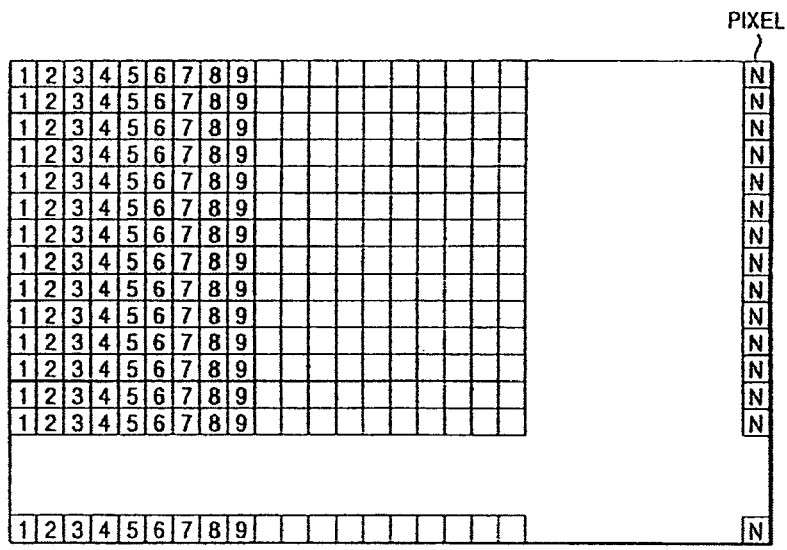
FIG. 23A illustrates an image before additional information is embedded according to the embedded coding processing shown in FIG. 22.

According to the above embedded coding process, a one-frame image is coded into coded data in the following manner For example, if the additional information corresponds to rearrangement that the second column of the processing object frame is moved to the sixth column (indicated by reference numeral 411), the third column to the ninth column 412, the fourth column to the seventh column 413, the fifth column to the third column 414, the sixth column to the eighth column 415, the seventh column to the fourth column 416, the ninth column to the second column 417, the eighth column to the fifth column 418, . . . , and the Nth column, to the Nth column, the swap information generation section 36 generates swap information indicating such rearrangement. According to the above swap information, the swapping section 37 rearranges, for example, a frame shown in FIG. 23A according to a frame shown in FIG. 23B, that is, in such a manner that the second column is moved to the sixth column (indicated by reference numeral 411), the third column to the ninth column 412, the fourth column to the seventh column 413, the fifth column to the third column 414, the sixth column to the eighth column 415, the seventh column to the fourth column 416, the ninth column to the second column 417, the eighth column to the fifth column 418, . . . , and the Nth column to the Nth column. As a result, the image of FIG. 23A is coded: into an image shown in FIG. 23C.

The relationship between the rearrangement and the embedding information will be described below briefly with reference to FIG. 23B.

As indicated by reference numeral 411, the destination of movement of the second column is determined from among the available regions of eight columns. Since there are eight kinds of choices, the embedding coder 3 can embed additional information that is any of 0, 1, 2, 3, 4, 5, 6, and 7, for example. In the example of FIG. 23B, since the second column is moved to the sixth column, that is, the fifth region, additional information "4" is embedded.

Then, as indicated by reference numeral 412, the movement destination of the third column is determined from among the available regions of seven columns. Since there are seven kinds of choices, the embedded encoder 3 can embed additional information that is any of 0, 1, 2, 3, 4, 5, and 6, for example. In the example of FIG. 23B, since the third column is moved to the ninth column, that is, the seventh region, additional information "6" is embedded.

From the next step onward, additional information is embedded into the image by operations similar to the one discussed above. In this embedding technique, the number of bits of additional information to be embedded decreases as the embedding operation proceeds.

Instead of the above rearrangement scheme in which operations of moving each column to a column that is distant from it by pixels of the same number as the value of additional information are performed sequentially, when the additional information is image data, each column may be moved according to a feature quantity of the image data such as a histogram, DR, variance.

Further, although in the above example the embedding coder 3 embeds pieces of additional information sequentially, an arrangement order pattern itself as one of arrangement order patterns of the number of kinds that is equal to factorial the number of all columns may be determined by additional information. When additional information is embedded in the form of an arrangement order pattern, all arrangement order patterns of factorial the number of all columns are checked one by one and one arrangement order pattern is determined based on the correlation between the columns, whereby the embedded image is decoded into the original image.

The swapping section 37 moves, according to additional information, the positions of the pixels of each column as a set of one or more pixels constituting the image stored in the frame memory 31. The additional information is thus embedded into each column through the rearrangement by the swapping section 37. The original image is restored by performing rearrangement that is reverse to the rearrangement performed by the swapping section 37, and information indicating what rearrangement was performed is used as additional information. Therefore, the embedding coder 3 can embed additional information into an image without deteriorating its image quality and without increasing the data amount.

Each column of a column-position-rearranged image, which is an additional-information-embedded image, can be moved to the original position without any overhead by utilizing the correlation of the image, that is, the correlation with a column that is located at the correct position as in the case of the original image. Further, additional information is restored through such rearrangement. Therefore, a decoded image is free from deterioration in image quality caused by the embedding of the additional information.

If there is no column that is located at the correct position in coded data, it takes time to restore an image and additional information by utilizing the correlation of the image in the above-described manner. In the embedded coding process of FIG. 22, the first column of each frame is not moved and output as part of coded data as it is.

Embedded coding may be performed by making all columns including the first column an object of rearrangement. An image and additional information can easily be restored since coded data includes, as overhead, information of the original position of at least one of rearranged columns.

Figure 24:
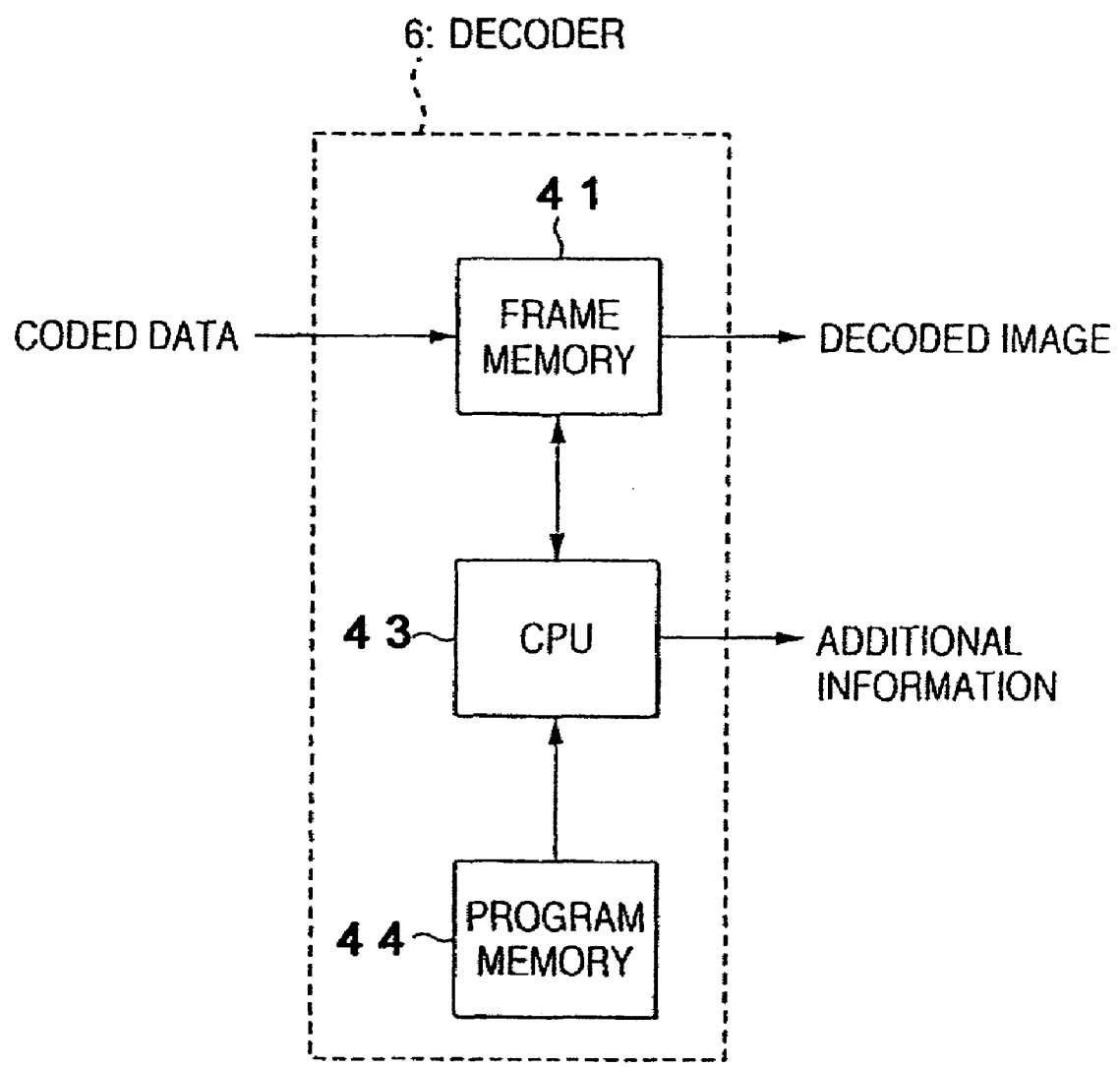
FIG. 24 is a block diagram illustrating an example of the hardware configuration of a decoder 6 shown in FIG. 1.

FIG. 24 shows an example of the hardware configuration of the decoder 6 shown in FIG. 1 which decodes coded data that is output from the embedding coder 3 of FIG. 21 into the original image and the additional information by utilizing the correlation of the image.

Coded data, that is, an additional-information-embedded image (also called an embedded image), is supplied to a frame memory 41. The frame memory 41 temporarily stores the embedded image, for example, in units of frames. The frame memory 41 is configured similarly to the frame memory 31 shown in FIG. 20, and by switching banks, an embedded image can be processed in real time even if it is a moving picture.

A CPU 43 executes a program stored in a program memory 44, and controls the decoder 6 so that a decoding operation is performed. That is, the CPU 43 controls the decoder 6 so that the embedded image stored in the frame memory 41 is decoded into the original image and the additional information by utilizing the correlation of the image. More specifically, the CPU 43 calculates correlation values between the latest decoded column and other columns among the columns constituting the embedded image. The CPU 43 performs, for every column constituting the embedded image, an operation of moving the column having the maximum correlation value with the latest decoded column to the position immediately on the right of the latest decoded column. The CPU 43 restores the original image in this manner and also restores the additional information based on the manner of rearrangement of the positions of the respective columns of the embedded image in decoding the embedded image into the original image.

The program memory 44 is configured similarly to, for example, the program memory 33 shown in FIG. 20, and stores a computer program for causing the CPU 43 to perform a decoding operation.

Figure 25:
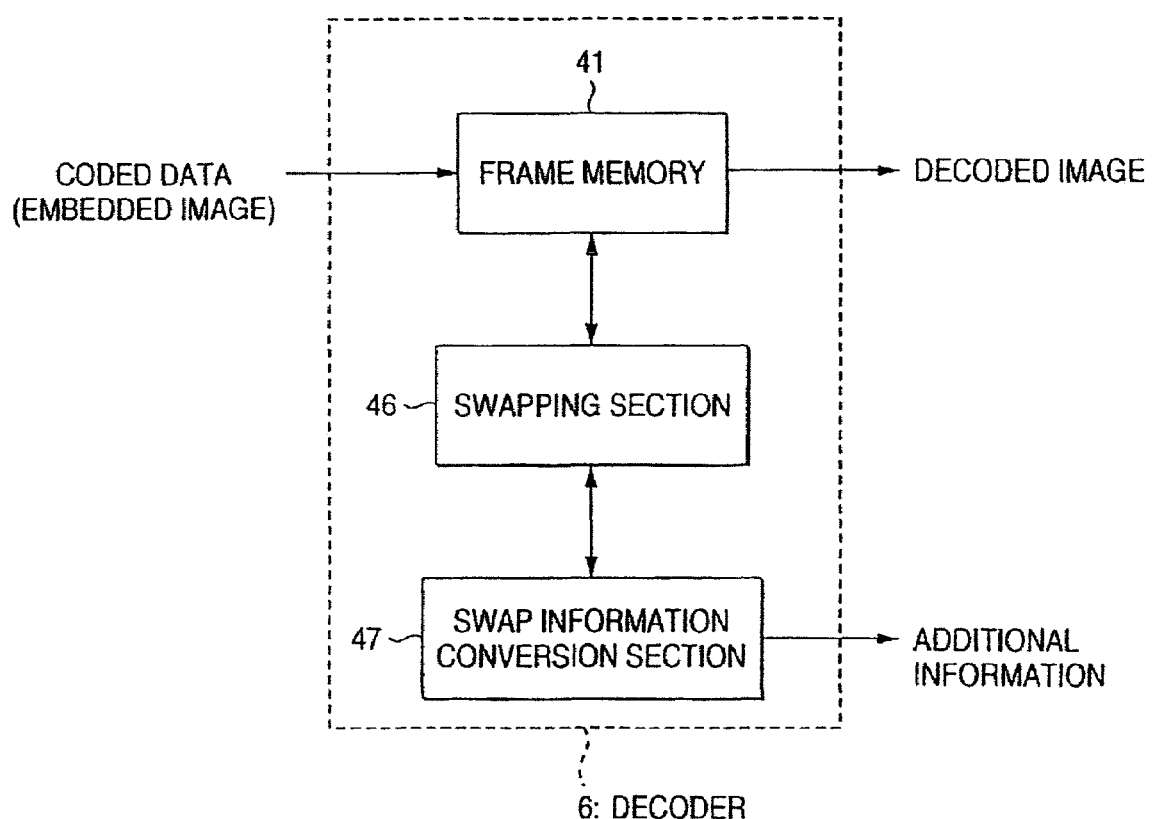
FIG. 25 is a block diagram illustrating an example of the functional configuration of the decoder 6 shown in FIG. 24.

FIG. 25 shows an example of the functional configuration of the decoder 6 of FIG. 24. The functional configuration shown in FIG. 25 is realized by the CPU 43 executing a computer program stored in the program memory 44.

As described above with reference to FIG. 24, the frame memory 41 temporarily stores an embedded image.

A swapping section 46 calculates correlation values between the latest one of the columns that have been moved to the original positions and other columns (i.e., the columns that have not been returned to their original positions) in the processing object frame stored in the frame memory 41. Based on those correlation values, the swapping section 46 rearranges the positions of the columns in the processing object frame that have not been returned to their original positions and thereby returns those columns to their original positions (i.e., restores the positions of those columns). Further, the swapping section 46 supplies a swap information conversion section 47 with swap information that represents how the columns of the frame have been rearranged.

The swap information conversion section 47 restores the additional information that is embedded in the embedded image based on the swap information that is supplied from the swapping section 46, that is, the corresponding relationship between the positions of the respective columns of the processing object frame before the rearrangement and those after the rearrangement.

A decoding process that is executed in the decoder 6 of FIG. 25 will be described below with reference to a flowchart of FIG. 26.

The frame memory 41 sequentially stores embedded images (i.e., coded data) supplied thereto, for example, in units of frames.

In step S71, in the swapping section 46, variable n for counting the number of columns of the frame is set to an initial value, for example, "1,". The process then goes to step S72, where the swapping section 46 judges whether variable n is smaller than or equal to N−1 (i.e., the number N of columns of the frame minus one).

If it is judged in step S72 that variable n is smaller than or equal to N−1, the process goes to step S73, where the swapping section 46 reads out the pixels (or the pixel sequence) of the nth column of the processing object frame stored in the frame memory 41 and generates a vector (i.e., a column vector) $v_n$ in which the pixel values of the respective pixels of the nth column are arranged as elements. In this embodiment, since each frame consists of pixels of M rows, as described above, the column vector $v_n$ is an M-dimensional vector. The same thing applies to a vector $v_k$ (described later).

In step S14, variable k for counting columns that are located on the right of the nth column is set to an initial value, that is, n+1. The process then goes to step S75, where the swapping section 46 reads out the pixels of the kth column and generates a column vector $v_k$ that has the pixel values of the kth column as elements. The process then goes to step S76.

In step S76, in the swapping section 46, a correlation value between the nth column and the kth column is calculated by using the column vectors $v_n$ and $V_k$.

That is, in the swapping section 46, the distance d(n, k) between the column vectors $v_n$ and $v_k$ is calculated according to the following equation:

$$d(n, k) = |v_n - v_k| = [\Sigma(A(m, n) - A(m, k))^2]^{1/2} \quad (1)$$

where Σ means the summation with m varied from 1 to M and A(i, j) represents the ith-row, jth-column pixel value of the frame as the processing object.

In the swapping section 46, the reciprocal 1/d(n, k) of the distance d(n, k) between the column vectors $v_n$ and $v_k$ is calculated as a correlation value between the nth column and the kth column.

After the calculation of the correlation value between the nth column and the kth column, the process goes to step S77, where it is judged whether variable k is smaller than or equal to N-1, that is, the number N of columns of the frame minus 1. If it is judged in step S77 that variable k is smaller than or equal to N-1, the process goes to step S78, where variable k is incremented by 1. The process then returns to step S75. Thereafter, steps S75 to S78 are repeatedly executed until it is judged in step S77 that variable k is not smaller than or equal to N-1. As a result, correlation values between the nth column and the columns of the embedded image on the right of the nth column are calculated.

If it is judged in step S77 that variable k is not smaller than or equal to N-1, the process goes to step S79, where the swapping section 46 determines the value k that maximizes the correlation value with the nth column. The value k that maximizes the correlation value with the nth column is represented by, for example, K In step S80, the swapping section 46 swaps the Kth column and the (n+1)th column of the processing object frame stored in the frame memory 41, that is, swaps the Kth column with the (n+1)th column that is immediately on the right of the nth column.

Variable n is incremented by 1 in step S81, and the process returns to step S72. Thereafter, steps S72 to S81 are repeatedly executed until it is judged in step S72 that variable n is not smaller than or equal to N-1.

In this embodiment, the first column of the embedded image remains the same as the first column of the original image. Therefore, when variable n is equal to the initial value "1," the column of the embedded image having the maximum correlation value with the first column is swapped with the second column that is immediately on the right of the first column. From the correlation of the image, the column having the maximum correlation value with the first column, should be the second column of the original image. Therefore, the second column of the original image that was moved to a certain column of the embedded image in the embedded coding operation is now returned to the original position, that is, the second column is decoded.

When variable n is incremented to 2, in the above-described manner the column of the embedded image having the maximum correlation value with the second column which is returned to the original position is swapped with the third column that is immediately on the right of the second column. From the correlation of the image, the column having the maximum correlation value with the second column should be the third column of the original image. Therefore, the third column of the original image that was moved to a certain column of the embedded image in the embedded coding operation is now returned to the original position.

Similarly, the embedded image that is stored in the frame memory 41 continues to be decoded into the original image.

If it is judged in step S72 that variable n is not smaller than or equal to N-1, that is, when all of the second to Nth columns constituting the embedded image have been returned to their original positions by utilizing the correlation of the image and the embedded image stored in the frame memory 41 has thereby been decoded into the original image, the process goes to step 582, where a decoded image is read out from the frame memory 41. In step S82, swap information that represents how the second to Nth columns of the embedded image were rearranged when the swapping section 46 decoded the embedded image into the original image is output to the swap information conversion section 47. The swap information conversion section 47 restores the additional information that was embedded in the embedded image based on the swap information supplied from the swapping section 46, and outputs the restored additional information.

The process then goes to step S83, where it is judged whether the frame memory 41 stores an embedded image frame that has not been processed. If it is judged that such a frame is stored, the process returns to step S71, where operations similar to the above are repeated for the embedded image frame that has not been processed.

If it is judged in step S83 that the frame memory 41 does not store a frame that has not been processed, the decoding process is finished.

As described above, the decoder 6 decodes coded data, that is, an image in which additional information is embedded, into the original image and the additional information by utilizing the correlation of the image. The decoder 6 can decode coded data into the original image and the additional information even without any overhead for decoding. Therefore, the embedding of additional information causes no deterioration in image quality in a decoded image that is produced by the decoder 6.

Figure 26:
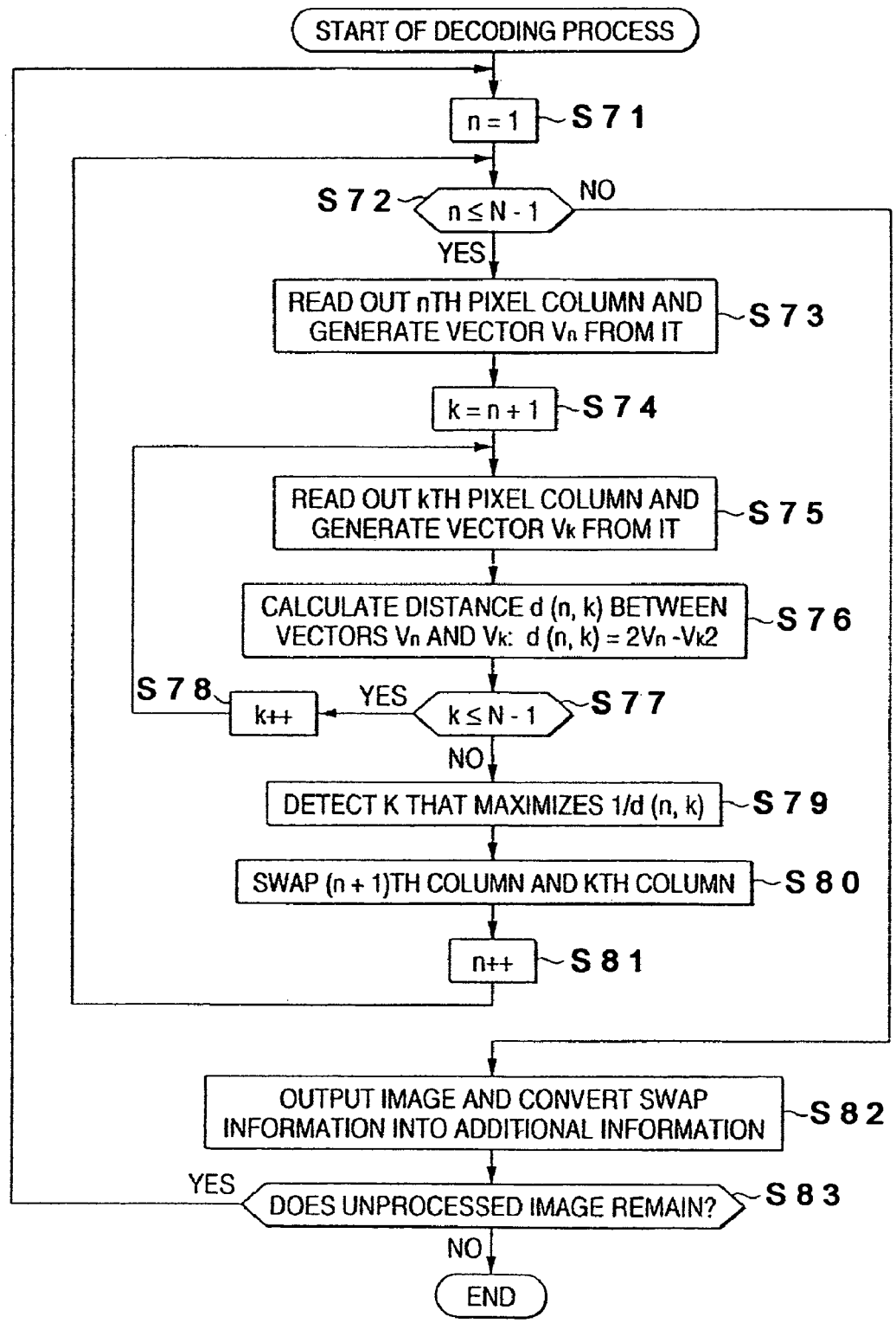
FIG. 26 is a flowchart illustrating the operation performed by the decoder 6 shown in FIG. 25.

In the decoding process of FIG. 26, the decoder 6 calculates correlation values between the latest decoded column (the first column that was not moved in embedded coding, when n=1, for example) and the columns that have not been decoded, and detects a column that should be moved to the position immediately on the right of the latest decoded column based on the calculated correlation values. The decoder 6 may detect a column that should be moved to the position immediately on the right of the latest decoded column by calculating correlation values between a plurality of columns that have been decoded and the columns that have not been decoded.

Figure 27:
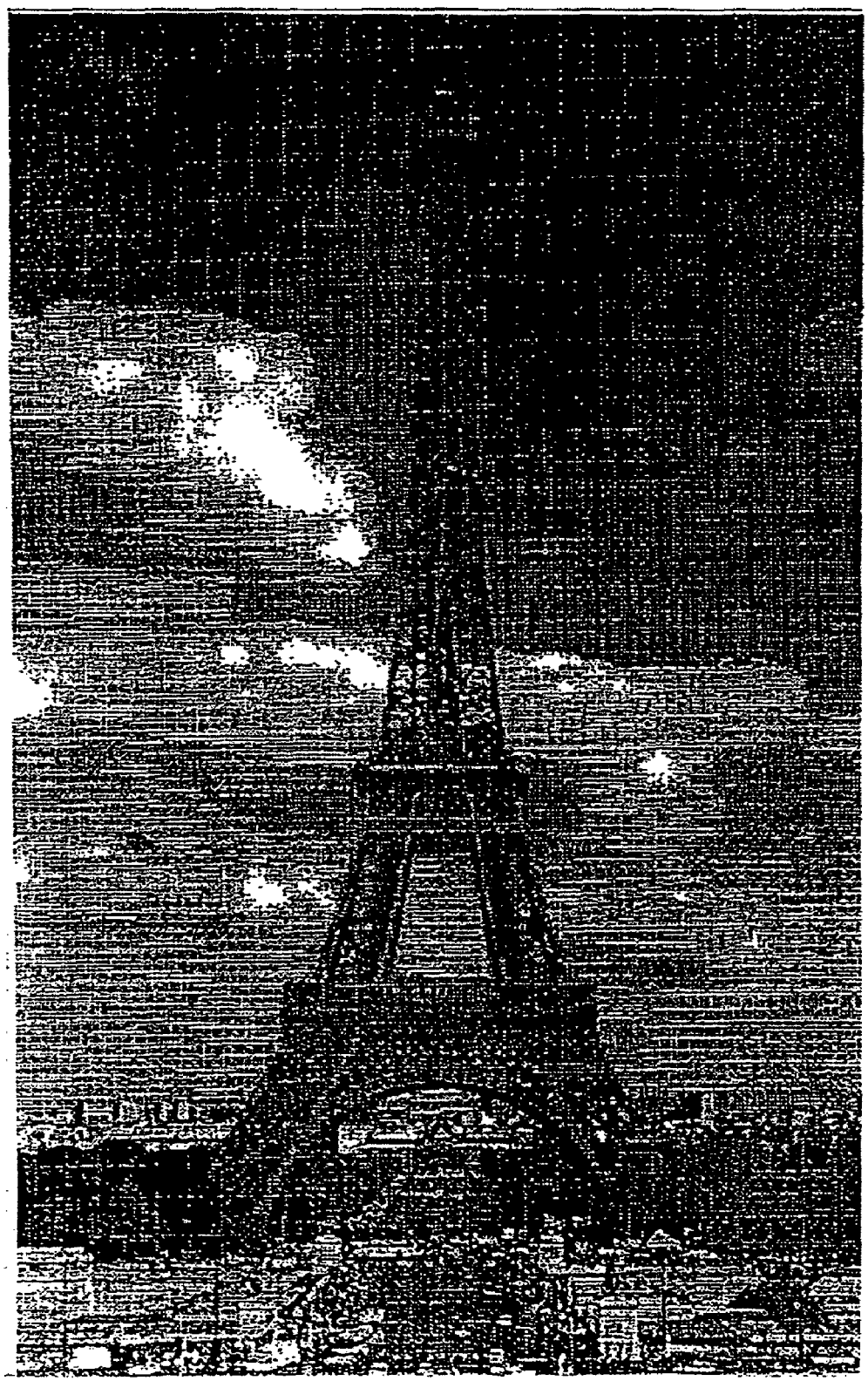
FIG. 27 is a photograph of an original image used for simulations of the embedded coding processing shown in FIG. 22.
Figure 28:
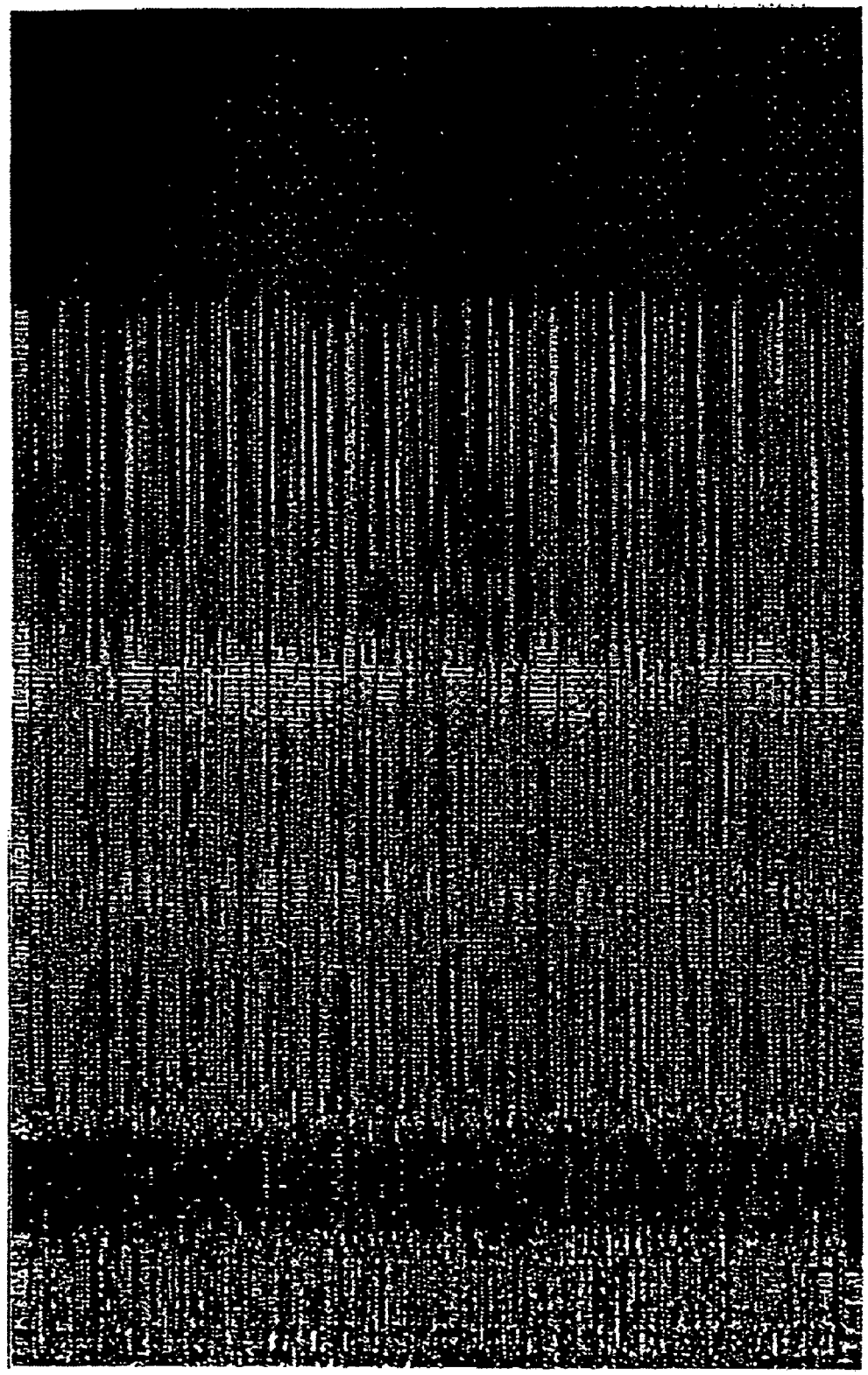
FIG. 28 is a photograph of an image after the embedded coding processing shown in FIG. 22 is simulated.
Figure 29:
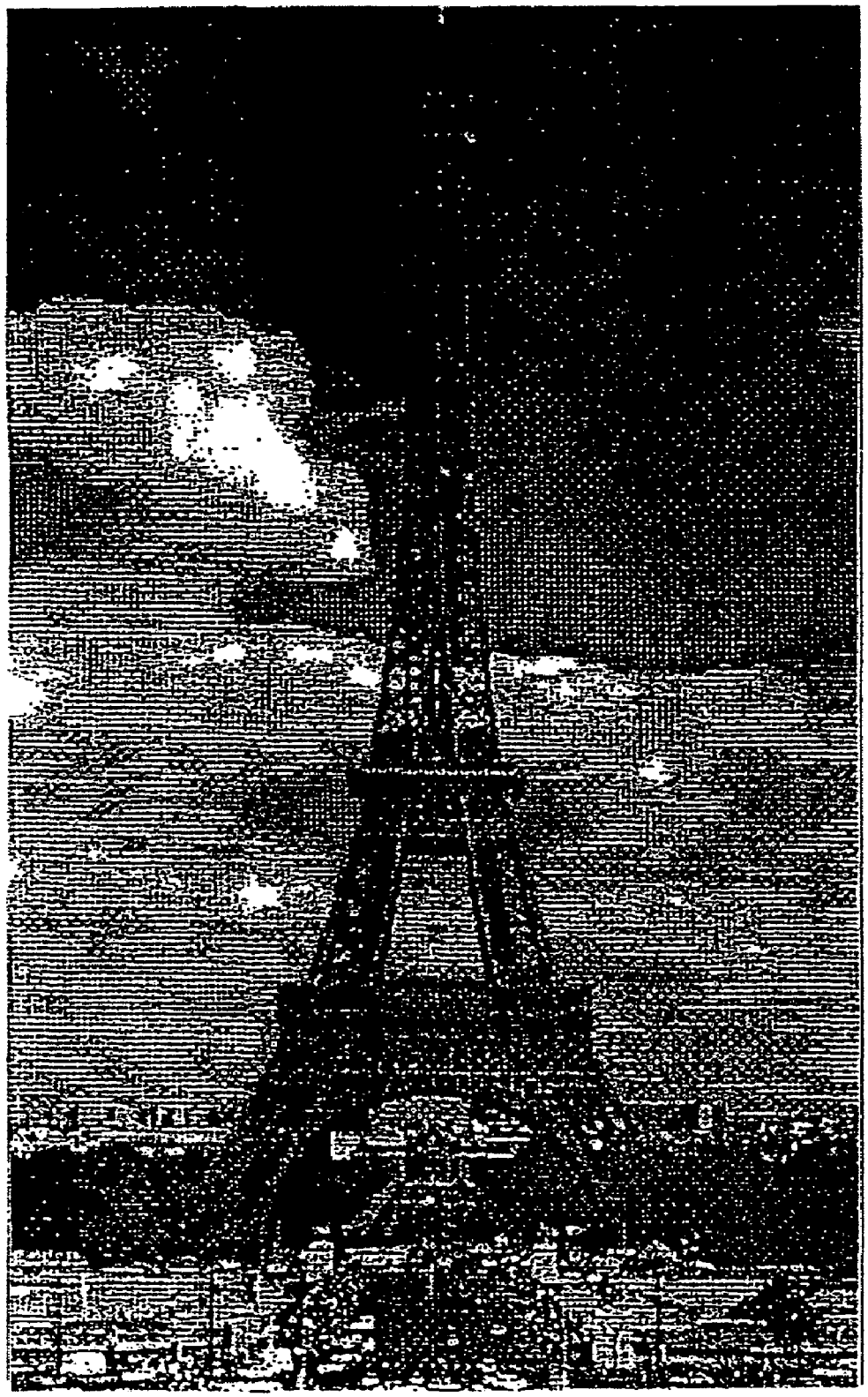
FIG. 29 is a photograph of an image after the embedded decoding processing shown in FIG. 26 is simulated.

FIGS. 27 to 29 show simulation, results of the above embedded coding process and decoding process.

FIG. 27 shows an original image that is to be subjected to an embedded coding operation and that consists of 512 (horizontal)×832 (vertical) pixels when the longitudinal direction is the vertical direction.

FIG. 28 shows a processing result of the embedded coding operation that was performed on the image of FIG. 27. Additional information of $\log_2(512!)$ bits is embedded in the coded image of FIG. 28. As is apparent from FIG. 28, as described above, the embedded coding has a function of image encryption.

FIG. 29 shows a decoded image produced by decoding the result (see FIG. 28) of the embedded coding operation by a decoding operation. A comparison between FIGS. 27 and 29 shows that the original image is restored without any deterioration in image quality. If an embedded image is correctly decoded into the original image by a decoding process, additional information can also be restored correctly based on a manner of rearrangement of the columns of the embedded image in the decoding.

Figure 30A:
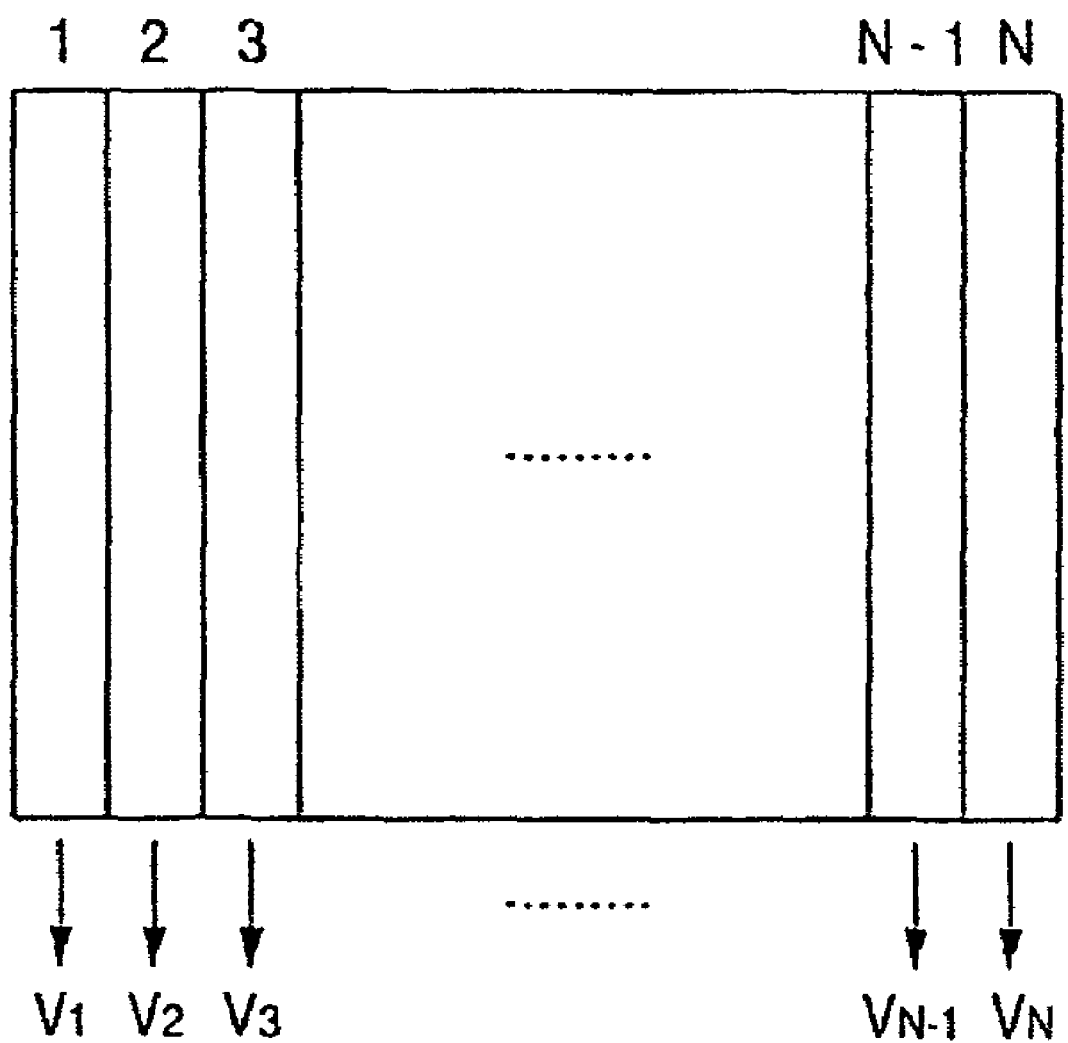
FIG. 30A illustrates column vectors to be swapped according to the flowchart of FIG. 22.
Figure 30B:
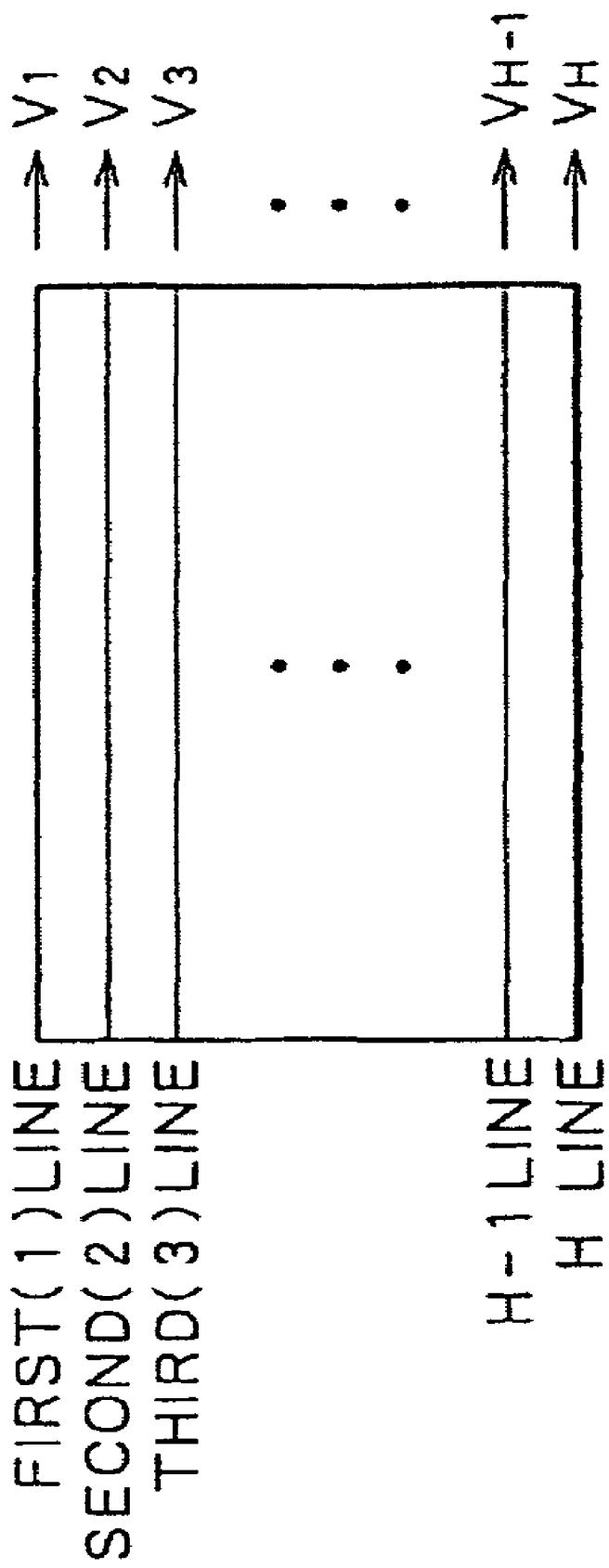
FIG. 30B illustrates row vectors to be swapped according to the flowchart of FIG. 22.

In the above example, the embedding coder 3 performs embedded coding on, for example a coding object image consisting of N columns as shown in FIG. 30A by fixing the first column and by rearranging the second to Nth columns according to additional information. Alternatively, the embedding coder 3 may perform embedded coding, as illustrated in FIG. 30B, on a coding object image consisting of H lines by fixing the first line and by rearranging the second to H-th lines according to additional information. The decoder 6 decodes a result of embedded coding into the original image and the additional information by utilizing the correlation of the image. Alternatively, the decoder 6 may decode a result of embedded coding by utilizing continuity and/or similarity of the image in addition to the correlation of the image.

That, is, in the case of FIG. 26, the reciprocal of the distance between column vectors $v_n$ each having, as elements, the pixel values of the constituent pixels of the corresponding column of the image of FIG. 30A is defined as correlation, and coded data is decoded by using only the correlation thus defined. In the decoder 6, first, the column corresponding to the column vector having the smallest distance from the column vector of the fixed first column is set as the second column. Then, in the decoder 6, the column corresponding to the column vector having the smallest distance from the column vector of the second column is set as the third column. Similar operations are repeated from the next step onward, whereby the original image is restored and the embedded additional information is restored based on how the second to Nth columns were rearranged.

Figure 31:
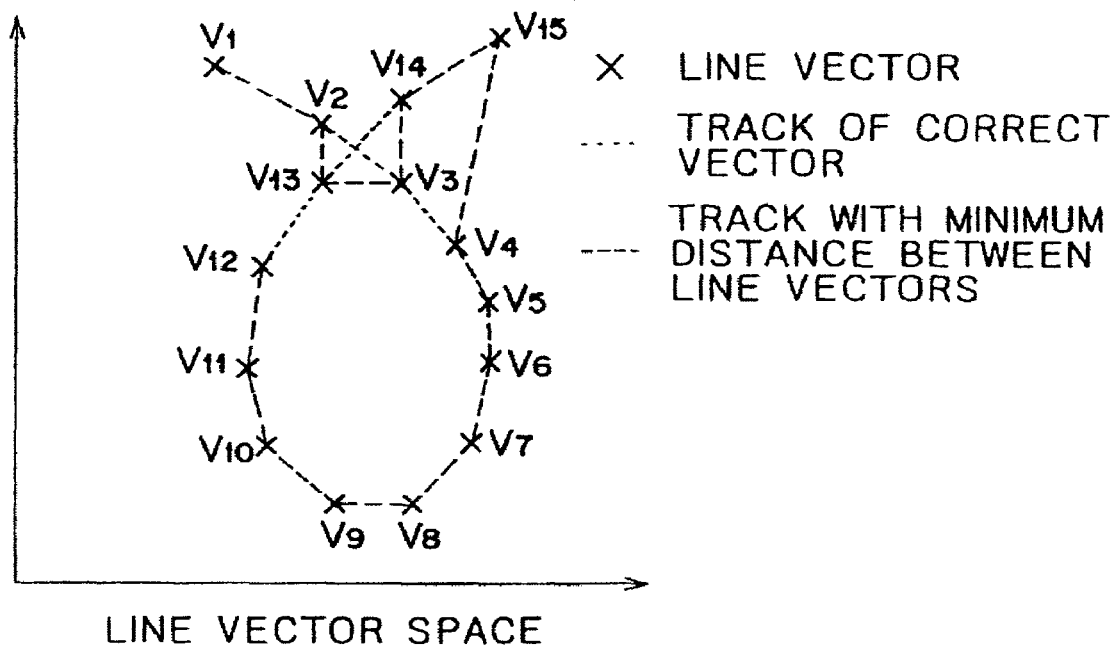
FIG. 31 is a diagram illustrating a column vector space.

Now assume that the locus, in the column vector space, of column vectors $v_1, v_2, \ldots, v_N$ of the N columns of the image of FIG. 30A is, for example, one that is indicated by a thin broken line in FIG. 31.

If in the swapping section 46 the column vectors having the smallest distances are detected in order starting from the state that the subject column is the first column in the manner described above, a locus indicated by a thick broken line in FIG. 31 is drawn. That is, column vectors are detected in order of $v_1, v_2, v_{13}, v_3, v_{14}, v_{15}, v_4, v_5, v_6, \ldots$. Therefore, in the swapping section 46, column vectors are not detected in correct order when only the correlation (in this case, the distance between column vectors) is used, and, as a result, neither the image nor the additional information can be restored correctly.

Figure 32:
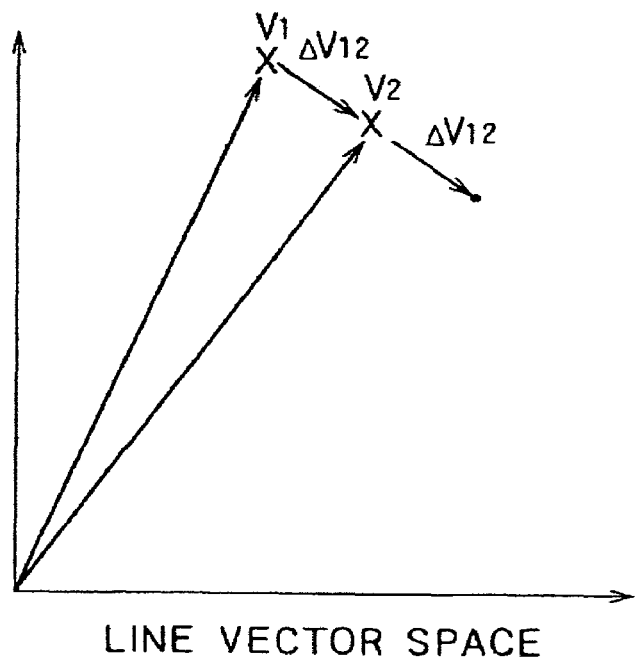
FIG. 32 is another diagram illustrating a column vector space.

To solve this problem, for example, in the swapping section 46, after the column corresponding to the column vector having the smallest distance from the column vector $v_1$ of the first column is set as the second column, a difference vector $\Delta v_{12}$ between the column vector $v_2$ of the second column and the column vector $v_1$ of the first column is calculated as shown in FIG. 32. Then, in the swapping section 46, the column corresponding to the column vector closest to point $P_{12}$ that is represented by a vector obtained by adding the difference vector $\Delta v_{12}$ to the column vector $v_2$ is set as the third column.

Further, in the swapping section 46, a difference vector between the column vector $v_3$ of the third column and the column vector $v_2$ of the second column is calculated and the column corresponding to the column vector closest to a point that is represented by a vector obtained by adding the difference vector to the column vector $v_3$ is set as the fourth column. From the next step onward, the remaining columns to the Nth column are determined in similar manners By utilizing, as described above, in the swapping section 46, not only the correlation between the nth column and the (n+1)th column but also the continuity between the column vector $v_n$ of the nth column and the column vector $v_{n+1}$ of the (n+1)th column, that is, in this case, the fact that the variation of the difference vector $v_{n+1}-v_n$ is continuous, the column vectors are detected in such correct order that a locus is drawn in the manner as indicated by the thin broken line in FIG. 31, and the image and the additional information are restored correctly.

Figure 23B:
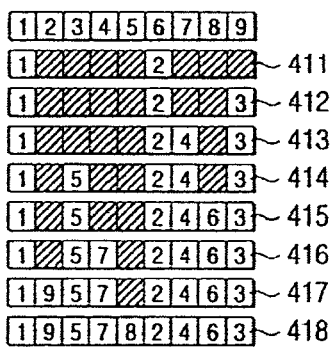
FIG. 23B illustrates the swapping of pixels in step S3 of FIG. 22.
Figure 23C:
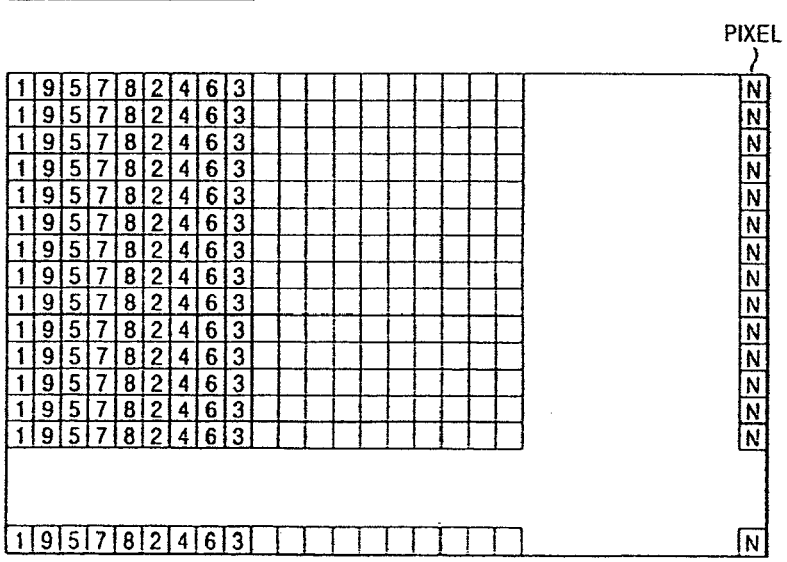
FIG. 23C illustrates an image after the pixels have been swapped in step S3 of FIG. 22.

In the embodiment of FIGS. 23A, 23B, and 23C, the pixels of the coding object image except the pixels of the first column are rearranged in units of columns based on the additional information, whereby embedding of the additional information into the image, that is, the embedded coding, is performed. The embedded coding can be performed in other ways. For example, the pixels of a coding object image may be rearranged in units of rows, or the position of a sequence of pixels, located at the same position, of a prescribed number of frames arranged in the time domain may be swapped.

Another example of the embedded coding is such that the pixels of a coding object image are rearranged in units of columns and the pixels of a resulting image are further rearranged in units of rows.

For example, the columns of an image consisting of M (vertical)×N (horizontal) pixels as shown in FIG. 33 are rearranged based on additional information by the embedding coder 3 to produce an embedded image as shown in FIG. 34A. In FIG. 34A, the first column of the image of FIG. 33 is moved to the fifth column, the second column to the Nth column, the third column to the first column, the fourth column to the second column, the fifth column to the fourth column, the sixth column to the third column, . . . , the Nth column to the sixth column.

For example, the rows of the image of FIG. 34A are rearranged based on additional information by the embedding coder 3 to produce an embedded image as shown in FIG. 34B. In FIG. 34B, the first row of the image of FIG. 34A is moved to the third row, the second row to the fifth row, the third row to the second row, the fourth row to the Mth row, the fifth row to the first row, . . . , the Mth row to the fourth row.

If a column that has not been moved exists, for example, immediately on the left of the first column, the embedded image of FIG. 34B is decoded into the original image of FIG. 33 by the decoder 6 executing the decoding process described above with reference to FIG. 26 by using that column as the new first column. That is, in the embedded image produced by the rearrangement in both of the column and row directions, the terms themselves to be added together in the summation of Equation (1) are not changed though their order is changed. Therefore, the distance d(n, k) that is calculated by Equation (1) remains the same in the case where only the columns have been rearranged and in the case where both of the columns and the rows have been rearranged as long as the image that has been subjected to the embedded coding is the same. The embedded image produced by rearranging both of the columns and the rows is also decoded into the original image and the additional information by the decoding process of FIG. 26 in the same manner as the embedded image produced by rearranging only the columns is done.

It is understood from the above discussion that when the embedding coder 3 rearranges both of the columns and rows, which of the columns and the rows are rearranged first does not influence a decoding operation. Therefore, the embedding coder 3 may first rearrange either the columns or the rows, and the decoder 6 may first rearrange either the columns or the rows. It is even possible for each of the coder 3 and the decoder 6 to alternately rearrange the columns and the rows.

Where the embedding coder 3 rearranges only the columns in an embedded coding operation, a manner of rearrangement of the columns of an embedded image when the decoder 6 decodes the embedded image into the original image becomes a decoding result of the additional information. Where the embedding coder 3 rearranges both of the rows and the columns, to what position (m', n') of a decoded image the pixel at an mth-row, nth-column position (m, n), for example, of an embedded image is moved becomes a decoding result of the additional information.

Figure 22:
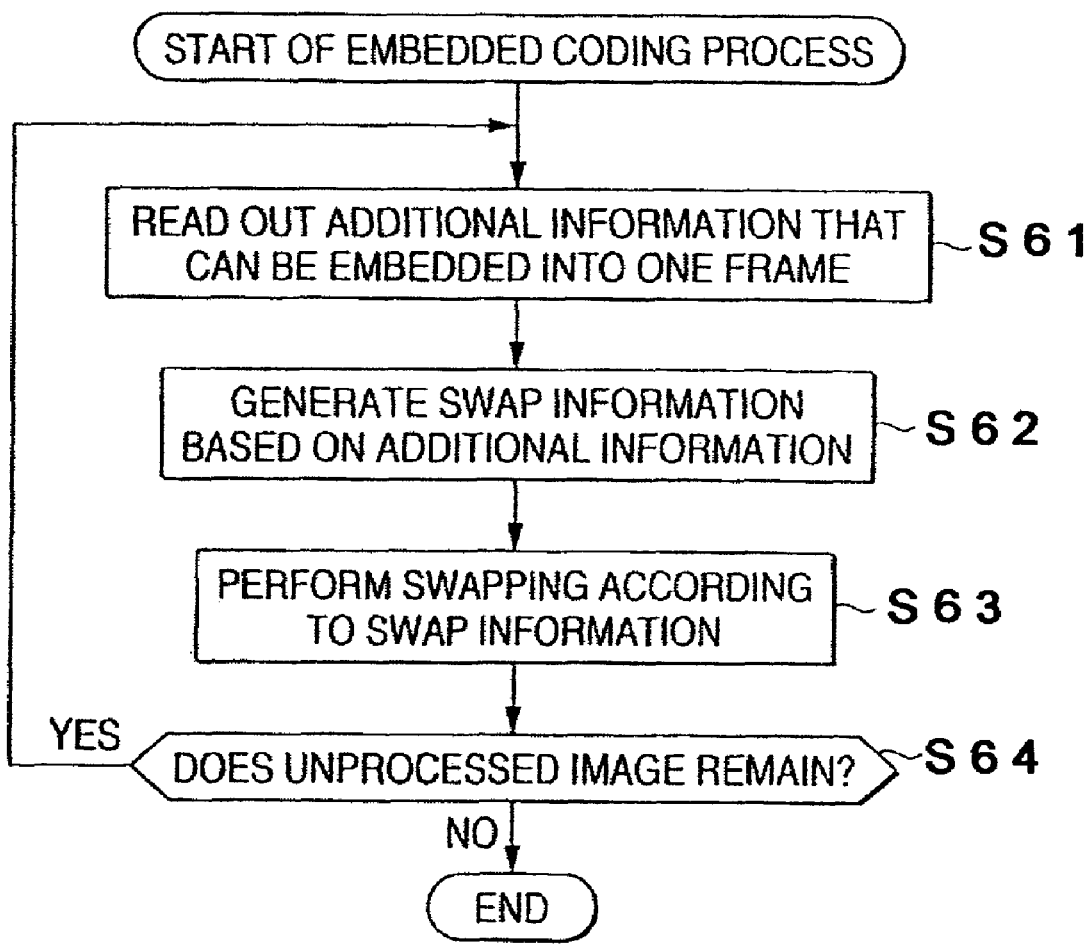
FIG. 22 is a flowchart illustrating the operation performed by the embedding coder 3 shown in FIG. 21.

In the embedding coding process of FIG. 22 only the first column of a coding object image is fixed, and the decoder 6 rearranges the other columns of an embedded image by using the first column as, so to speak, a reference of decoding. The reference of decoding is not limited to the first column, and may be the last, Nth column or any other column as long as it is set in the embedding coder 3 and the decoder 6. Further, the reference of decoding needs not always be the pixels of one column and may be, in an extreme case, one pixel.

As discussed above; the embedding coder 3 uses, for example, the first column as a reference of decoding and rearranges the other columns of an embedded image by utilizing the correlation of the image. In this case, if one column is erroneously moved, the possibility is high that an erroneous column is moved to the next column (in this embodiment, the column immediately on the right of the erroneously moved column). In this case, the decoder 6 cannot restore the original image and hence cannot restore the correct additional information.

In the embedded coding process, a plurality of columns may be left as references of decoding, that is, to exclude those columns from an object of rearrangement.

For example, where the embedding coder 3 performs rearrangement by using a set of pixels of an image arranged in the column direction as a unit of rearrangement, the embedding coder 3 may set every other column (hatched in FIG. 35) as a reference of decoding and set the remaining columns (i.e., the columns indicated by blanks in FIG. 35) an object of rearrangement.

Figure 35:
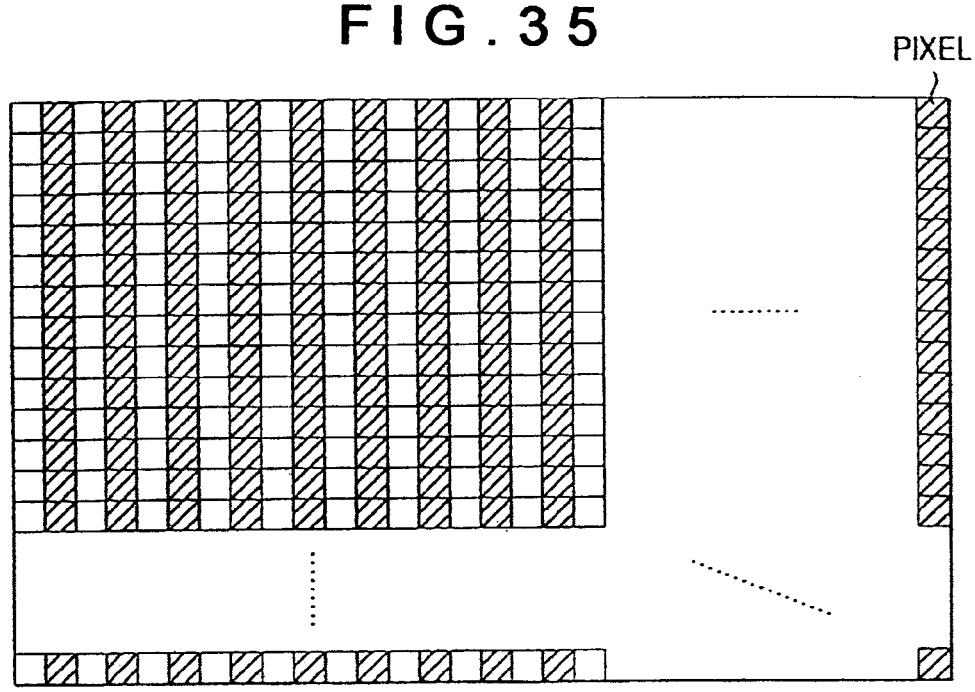
FIG. 35 illustrates a diagram illustrating pixels used as decoding references.

In the case of FIG. 35, if the image has 2N columns, the data amount of additional information that can be embedded by the embedding coder 3 amounts to $\log_2(N!)$ bits.

The embedding coder 3 may use a unit of rearrangement that is smaller than a column or a row, that is, a set of one or more pixels.

Figure 36:
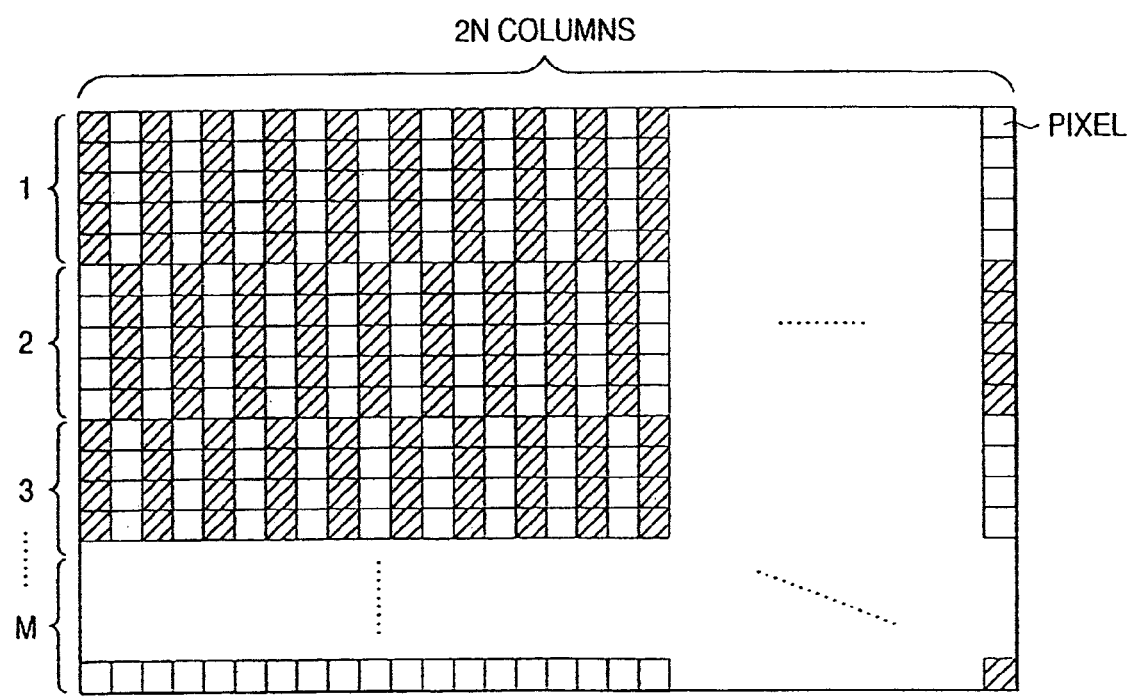
FIG. 36 is another diagram illustrating pixels used as decoding references.

For example, as shown in FIG. 36, the embedding coder 3 can perform rearrangement by dividing each column of an image into sets of one or more (e.g., five) consecutive pixels and using such a set as a unit of rearrangement. As shown in FIG. 36, the embedding coder 3 can classify the units of rearrangement into two categories in checkered pattern and can set one category (e.g., the portions indicated by blanks in FIG. 36) as an object of rearrangement and set the other (hatched in FIG. 36) as references of decoding. In this case, if the number of rows, that is, the number of pixels in the column direction, of the image is such as to accommodate M units of rearrangement and the image has 2N columns, the data amount of additional information that can be embedded by the embedding coder 3 amounts to $\log_2\{(M\times N)!\}$ bits.

Figure 37:
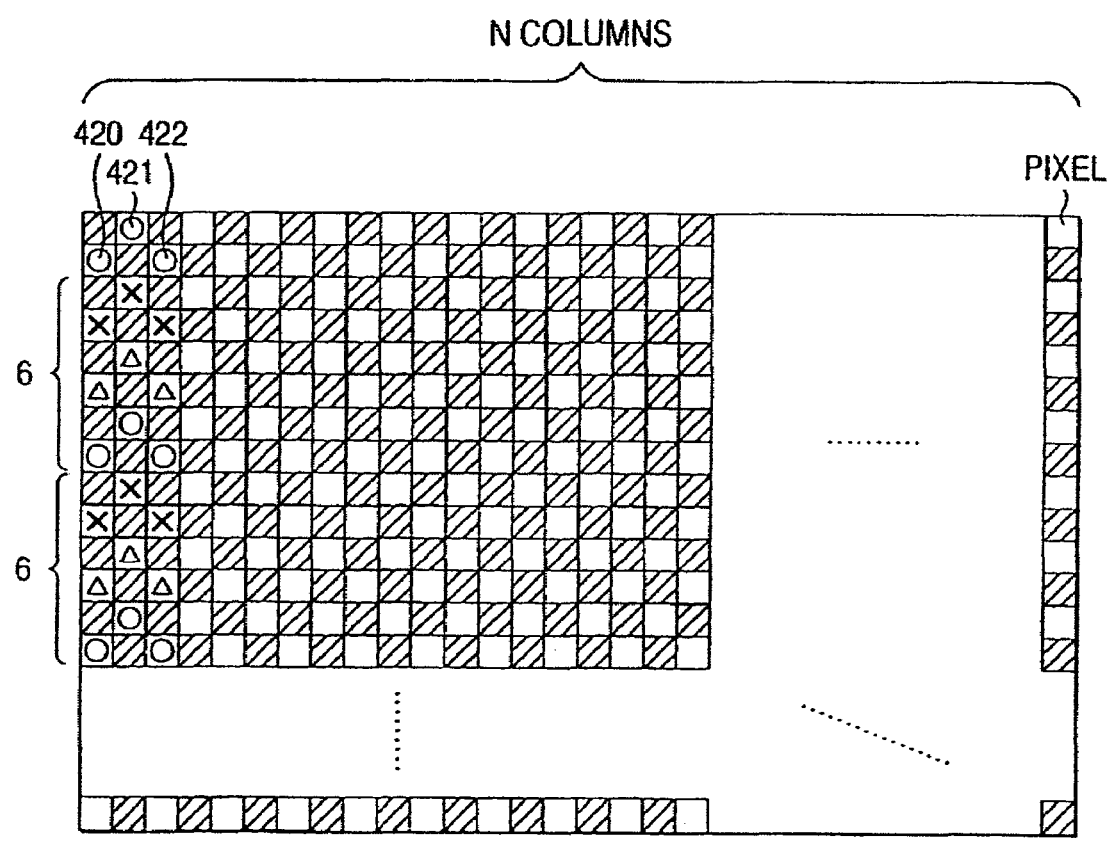
FIG. 37 is still another diagram illustrating pixels used as decoding references.

For example, as shown in FIG. 37, the embedding coder 3 can extract pixels of each column of an image by a prescribed number of pixels (e.g., six pixels) and perform rearrangement by using a set of extracted pixels (e.g., pixels indicated by "○" in FIG. 37, pixels indicated by "x", or pixels indicated by "Δ") as a unit of rearrangement. As shown in FIG. 37, the embedding coder 3 can classify the pixels constituting the image into two categories in checkered pattern, and can set one category (e.g., the portions indicated by blanks in FIG. 37) as an object of rearrangement and set the other (hatched in FIG. 37) as references of decoding. In this case, if a set of pixels obtained by extracting pixels of each column of the image by 2M pixels (six pixels in FIG. 37) is used as a unit of rearrangement and the image has N columns, the data amount of additional information that can be embedded into the image amounts to $\log_2\{(M\times N)!\}$ bits. The data amount amounts to $\log_2\{(M\times N)!\}$ because the embedding coder 3 can perform embedding in units of columns as indicated by, for example, reference numerals 421 and 422 by using the sets indicated by "○" as units of rearrangement.

In the examples of FIGS. 35 to 37, each set of pixels as an object of rearrangement (i.e., the pixels indicated by blanks in FIGS. 35 to 37) is adjacent to a plurality of references of decoding (i.e., hatched portions in FIGS. 35 to 37). In this case, for example, the decoder 6 performs decoding by using, as correlation, the reciprocal of the sum of the squares of the distances between a set of pixels as an object of rearrangement and the plurality of references of decoding.

As described above, no particular limitations are imposed on the unit of rearrangement used in the embedded coding and the decoding.

Further, no particular limitations are imposed on the set of pixels as a reference of decoding.

From the viewpoint of the decoding precision, it is preferable that a pixel as an object of rearrangement be adjacent to as many pixels, as references of decoding as possible. Therefore, the example of FIG. 37 is most desirable. From the viewpoint of the decoding precision, it is preferable that there are as many pixels as references of decoding as possible.

However, since pixels as references of decoding cannot be used as an object of rearrangement, the data amount of additional information that can be embedded into an image by the embedding coder 3 decreases as the number of pixels as references of decoding increases. The encryption effect of the embedded coding operation of the invention is less remarkable when there are many pixels as references of decoding or a pixel as an object of rearrangement is adjacent to many pixels as references of decoding.

It is desirable that the number of pixels as references of decoding and their arrangement pattern be set in accordance with the purpose of the embedded coding and the decoding in consideration of the decoding precision, the data amount of additional information to be embedded, and the encryption effect.

The encryption effect is also weakened if a certain column is moved to a nearby column or columns that are close to each other are moved while keeping their positional relationship. It is thus necessary to avoid such rearrangement. In the embedded coding operation of the embedding coder 3, it is possible to impose limitations that each column should be moved to a column that is distant from that column by more than a prescribed distance and that columns that are close to each other should be moved to columns that are distant from those columns by more than a prescribed distance.

Where an image as an object of embedded coding is a color image that consists of, for example, RGB component signals, the embedding coder 3 may move a set of RGB components to the same position or rearrange the RGB components individually. Where the embedding coder 3 moves a set of RGB components to the same position, the data amount of additional information that can be embedded is smaller but the decoding accuracy in the decoding can be higher than in the case where the embedding coder 3 moves the RGB components individually. Conversely, where the embedding coder 3 moves a set of RGB components individually, the decoding accuracy in the decoding is lowered but the data amount of additional information that can be embedded is larger than in the case where the embedding coder 3 moves a set of RGB components to the same position.

There are no particular, limitations on the type of additional information. For example, an image, a voice, text, a computer program, a control signal, and other kinds of data may be used as additional information. Where part of an image stored in the image database 1 is used as additional information and the remaining part is used as a coding object that is supplied to the frame memory 31, the former part of the image as the additional information is embedded into the latter part, thereby implementing image compression.

Although the embodiment of the invention is directed to an image, the invention may be implemented in such a manner that data sequences of a prescribed time of a voice are rearranged.

Although in the embodiment the embedded coding operation or the decoding operation is performed by executing a computer program under the control of the CPU 32 or 43, it may be performed by dedicated hardware.

Although in the embodiment a computer program to be executed under the control of the CPU 32 or 43 is stored in the program memory 33 or 44, the computer program may be provided as a signal via a recording medium such as a semiconductor memory, a magnetic tape, a magnetic disk, an optical disc, a magneto-optical disc, or a phase change disc or a transmission medium such as the Internet, ground waves, a satellite channel, a public network, or a CATV (cable television) network.

Figure 38A:
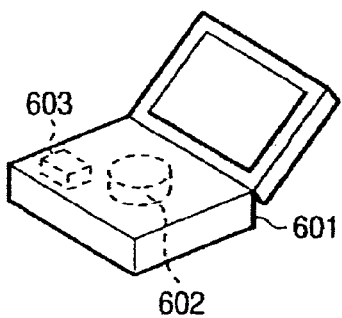
FIG. 38A illustrates a computer in which a program executing the processing of the present invention is to be installed.
Figure 38B:
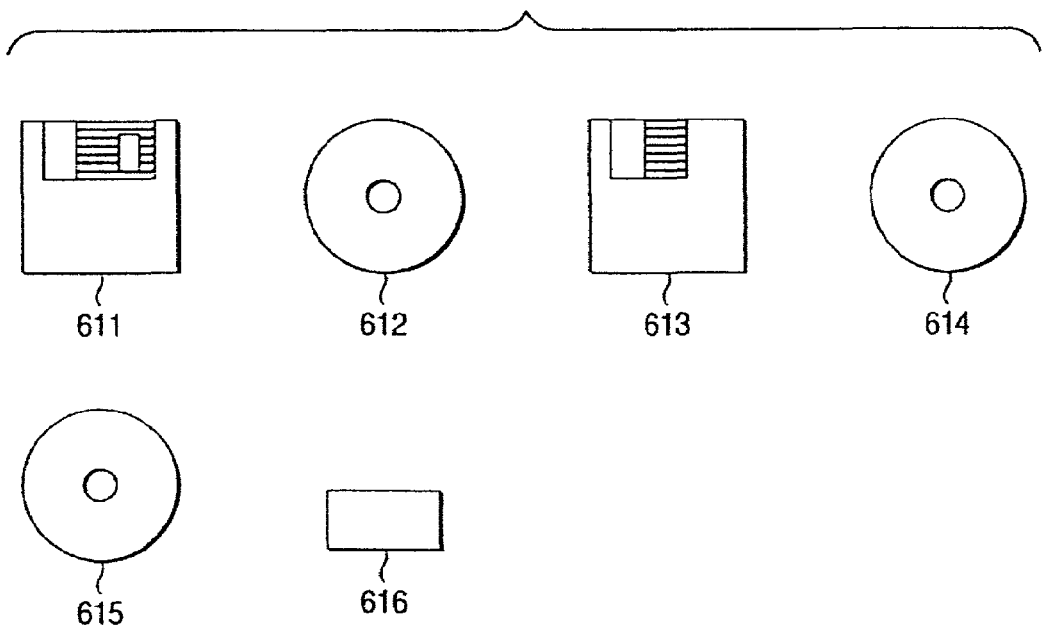
FIG. 38B illustrates examples of storage media in which a program executing the processing of the present invention is to be stored.
Figure 38C:
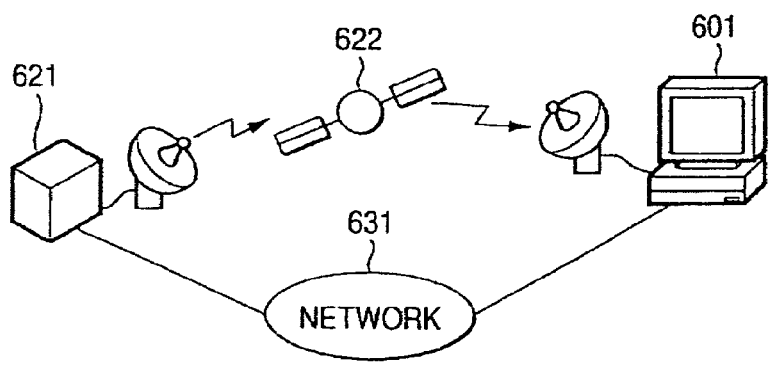
FIG. 38C schematically illustrates a program executing the processing of the present invention being distributed to a computer via a satellite or a network.

Referring to FIGS. 38A to 38C, a description will be given of a recording medium on which the above-described computer program is recorded through which the program is installed in a computer and is executed by the computer. A signal indicating the above-described program which is supplied to a computer via a transmission medium is also discussed below.

As shown in FIG. 38A, a program is recorded in advance on a hard disk 602 or a semiconductor memory 603 as a recording medium that is incorporated in a computer 601.

Alternatively, as shown in FIG. 38B, a program is recorded temporarily or permanently on a recording medium such as a floppy disk 611, a CD-ROM (compact disc read-only memory) 612, an MO (magneto-optical) disc 613, a DVD (digital versatile disc) 614, a magnetic disk 615, or a semiconductor memory 616.

In addition to a method in which a program is installed in a computer from any of the above recording media, as shown in FIG. 38C, it is possible to transfer a program by radio from a download site 621 to the computer 601 via an artificial satellite 622 for digital satellite broadcast or transfer a program by wire from the download site 621 to the computer 601 via a network 631 such as a LAN (local area network) or the Internet, and install it in the computer 601 so that it is stored in, for example, the hard disk 102 incorporated in the computer 601.

The steps described by the programs for executing various processes of the invention need not always be executed in a time-series manner in order as described in the flowcharts, and the invention includes a process in which the steps are executed in parallel or individually (e.g., a parallel process and an object process).

FIG. 39 shows an example configuration of the computer 601 shown in FIGS. 38A and 38C.

As shown in FIG. 39, the computer 601 incorporates a CPU (central processing unit) 642. An input/output interface 645 is connected to the CPU 642 via a bus 641. When receiving, via the input/output interface 645, a command that has been produced by the user operating an input section 647 such as a keyboard or a mouse, the CPU 642 executes a program that is stored in a ROM (read-only memory) 643 corresponding to the semiconductor memory 603 shown in FIG. 38A in accordance with the command. The flowcharts shown in FIGS. 5, 9, 12, 14, 17, 19, 22, and 26 are executed as this program. Alternatively, the CPU 642 loads, into a RAM (random access memory) 644, a program that is stored in the hard disk 602, a program transferred via the satellite 622 or the network 631, received by a communication section 648, and installed in the hard disk 602, or a program read out from the floppy disk 611, the CD-ROM 612, the MO disc 613, the DVD 614, the magnetic disk 615, or the semiconductor memory 616 that is mounted in a drive 649 and installed in the hard disk 602, and executes the program. For example, the CPU 642 outputs a processing result to a display section 646 such as an LID (liquid crystal display) via the input/output interface 645, when necessary.

What is claimed is:

1. A coding apparatus, comprising:
   a receiving unit configured to receive first information and second information; and
   a coding unit configured to embed the second information into the first information and producing coded data so that decoding the coded data is performed by utilizing an energy distribution possessed by the first information,
   wherein the decoding is performed by utilizing a correlation of the first information.

2. The coding apparatus according to claim 1, wherein the first and second information are information of identical or different media.

3. The coding device according to claim 1, wherein the first information is an image or audio.

4. The decoding apparatus configured to decode data obtained by coding first information according to second information, comprising:
   a receiving unit configured to receive the coded data, the coded data including the second information embedded into the first information; and
   a decoding unit configured to decode the coded data into the first information and the second information by utilizing an energy distribution possessed by the first information,
   wherein the decoding is performed by utilizing a correlation of the first information.

5. The decoding apparatus according to claim 4, wherein the first information and second information are information of identical or different media.

6. The decoding apparatus according to claim 4, wherein the first information is an image or audio.

7. A medium to provide coded data obtained by embedding second information into first information and producing coded data so that decoding the coded data is performed by utilizing an energy distribution of the first information,
   wherein the decoding is performed by utilizing a correlation of the first information.

8. The medium according to claim 7, wherein the first information and the second information are information of identical or different media.

9. The medium according to claim 7, wherein the first information is an image or audio.

* * * * *